US008374901B2

(12) United States Patent
Vianello

(10) Patent No.: US 8,374,901 B2
(45) Date of Patent: Feb. 12, 2013

(54) CAREER AND EMPLOYMENT SERVICES SYSTEM AND APPARATUS

(76) Inventor: Marc Vianello, Mission, KS (US)

( * ) Notice: Subject to any disclaimer, the term of this patent is extended or adjusted under 35 U.S.C. 154(b) by 0 days.

(21) Appl. No.: 12/846,635

(22) Filed: Jul. 29, 2010

(65) Prior Publication Data

US 2011/0231329 A1    Sep. 22, 2011

Related U.S. Application Data

(62) Division of application No. 12/059,728, filed on Mar. 31, 2008, which is a division of application No. 10/101,644, filed on Mar. 19, 2002, now Pat. No. 7,424,438.

(51) Int. Cl.
*G06F 9/46* (2006.01)
(52) U.S. Cl. ...................................... 705/7.14

(58) Field of Classification Search ............... 705/7.14
See application file for complete search history.

(56) References Cited

U.S. PATENT DOCUMENTS 6,385,620 B1 * 5/2002 Kurzius et al. ...................... 1/1
7,725,525 B2 * 5/2010 Work ............................ 709/202

* cited by examiner

*Primary Examiner* — Romain Jeanty
(74) *Attorney, Agent, or Firm* — Intellectual Property Center, LLC.; Arthur K. Shaffer

(57) ABSTRACT

Systems, methods, distributed networks, and computer-readable media are provided that relate to recruiting and employment. Background information associated with talent-capability attributes is received from talent. Job description information is received from employers. Prospective matches are identified between employers and candidates, and employers and candidates are given an opportunity to exchange information.

33 Claims, 21 Drawing Sheets

CAREER AND EMPLOYMENT SERVICES SYSTEM AND APPARATUS

CROSS REFERENCE TO RELATED PATENT APPLICATIONS

This patent application is a division of U.S. patent application Ser. No. 12/059,728 filed Mar. 31, 2008 which is a division of U.S. patent application Ser. No. 10/101,644 filed Mar. 19, 2002 now U.S. Pat. No. 7,424,438 entitled Apparatus and Methods for Providing Career Employment Services.

FIELD OF THE INVENTION

This invention relates to network connected information systems, and, more particularly, to network connected information systems providing data processing applications in connection with optimizing individuals' employment searches and career opportunities, and optimizing employers' recruiting and hiring processes and decisions.

BACKGROUND OF THE INVENTION

Finding and hiring highly qualified employees or talent for specific jobs is one of the most important objectives an employer undertakes. In furthering the employer's objective of hiring the best possible employees, an employer would ideally have access to detailed information regarding as large a pool of talent as possible and the pool of talent would include prospective employees who are highly qualified for the particular job that the employer seeks to fill. Without such information, a great deal of time and expense is often expended by employers in connection with their recruiting and screening functions, while, nevertheless, achieving unacceptable results.

Traditionally, employers have found potential talent among new school graduates through school-related job counseling resources, in response to classified advertisements for particular jobs, referrals from existing employees, and through the use of third-party recruiters ("headhunters"). Each of these alternatives is inefficient, and some are costly, as well. Furthermore, employers' articulation of the skills they seek to hire are imprecise. Typically, school-related job counseling resources, classified advertising, and word-of-mouth referrals deal in generalities.

When an employer seeks to hire an experienced employee, the pool of talent, within which a search is conducted, is often limited to individuals who have already worked in a particular job within a particular industry. Although it may be meritorious that a prospective employee has current or prior experience in a particular job within a particular industry, individuals with experience in other jobs within other industries may possess the particular skills that an employer requires for a particular job. Yet there exists no efficient means for identifying such individuals in other fields who may possess the precise skills sought by the employer. Consequently, an employer's employment recruiting and hiring processes and subsequent operations would be greatly enhanced if the employer could efficiently and cost-effectively identify highly qualified talent both within and without the industry and occupational categories of the employer.

Another employment problem faced by employers is that they often do not know when a particular employment position may become vacant. Specifically, while it is a business courtesy to provide two weeks notice of termination of at-will employment, employees occasionally terminate employment with less than two weeks notice. Additionally, it may occur that an employee may be terminated for a reason necessitating less than two-weeks notice, and injury, illness, or death may cause an employee to become unavailable to perform his or her job function. Further, even if a full two weeks is available to hire a replacement employee, frequently two weeks is not enough time to hire a person, particularly for skills that are in high demand.

Another problem faced by employers is that they may stop searching for more highly skilled employee(s) than they have, if an employment position is currently filled. Consequently, an employer's recruiting and hiring processes, and subsequent operations, would be greatly enhanced if the employer could efficiently and cost-effectively identify highly qualified talent on a continuous basis. Accordingly, there is a need in the art for a practical continuous recruiting system.

Another employment problem faced by employers is that there is no uniformity among employers in how they communicate the requirements, compensation, and benefits of their employment positions to the public. As a result, it is difficult for talent to efficiently and cost-effectively identify the universe of employment positions for which their skills may be suited. Consequently, an employer's recruiting and hiring processes, and subsequent operations, would be greatly enhanced if the employer could efficiently and cost-effectively communicate detailed information about the skills and experience they require, and the compensation and benefits they offer, in a structured manner that facilitates the search by talent for optimal employment opportunities.

At the same time that employers are encountering difficulty in identifying highly qualified employees ("talent") to fill specific employment positions, talent is struggling to find the employers and employment opportunities that best match the talent's skills and objectives.

For talent, establishing and developing a career involves finding, researching, and targeting employers. Traditionally, talent has used the same sort of inefficient means to find employment opportunities as employers have used to find talent. Talent has generally relied on school placement resources, replying to classified advertisements, and word-of-mouth referrals from persons who may already be employed by a particular employer, a process that is as inefficient for talent as it is for employers. And traditionally, talent has relied on résumés to present their qualifications, yet there is no uniformity of résumés among talent. Talent generally must "tailor" their résumés to respond to particular employment opportunities, and talent may have only a limited understanding of the skills being sought by a particular employer. As a result, résumés are often unwieldy devices for employers to consider.

Also, it may be difficult for talent to determine which employers to target for potential employment, and which potential opportunity represents the optimal use of their skills. Accordingly, talent can waste much time and energy trying to find the right position and may, nevertheless, fail to find an optimal position.

Furthermore, it is difficult for talent to identify an appropriate format for expressing his or her skills to an employer. It is also difficult for talent to know what types of information to share with a prospective employer. Consequently, it is advantageous for talent to have the ability to maintain his or her résumé, including a detailed description of training, skills, and experience in a uniformly structured manner on both a current and cumulative basis (a "talent profile").

Even when a person is employed in a desirable position, economic or other circumstances may cause the unexpected termination of his or her employment. Specifically, talent may be laid-off or terminated at an unanticipated time. Even if a talent is not terminated, economic conditions may cause his or her employer to go out of business. In some circumstances, talent will be provided with adequate notice or severance pay to allow for adequate time to seek other employment in the event of undesired termination. However, in some circumstances, there is inadequate time. Accordingly, there is a need in the job placement industry for systems that allow talent to be continually in the job market or at least ready to enter the job market on short notice.

Known methods of recruiting include the process by which a manager will prepare a job description, and send the description to a human resources ("HR") department, which may check its files of résumés to determine if a qualified applicant has previously contacted the company. The HR department may also consider qualifications of internal candidates, and finally, the HR department may place a classified ad in a newspaper or trade publication. The company may also retain the services of a professional recruiter, who may have connections with suitable talent. In addition to classified ads in printed publications, other media may be used to publish advertisements for talent.

As distributed computer networks such as the Internet have become widely used, it has become possible to provide classified employment ads to mass markets via on-line databases and publications. Most major newspapers now have on-line editions that may be used to search classified ads for job positions. For example, the employment classifieds of the Kansas City Star newspaper may be searched on line at http://www.kansascity.com.

Such on-line databases provide convenient access by employers to an audience that is potentially beyond the scope of coverage of subscribers to the printed newspaper. The on-line databases also have an advantage to talent in that talent is better able to search for jobs by geographic location or keyword. Of course, both of those features are present in regular newspaper classified advertising. Nevertheless, on-line databases of classified ads share the same major drawbacks as printed classified ads. First, both are highly unstructured and without uniformity of job parameters. Second, both solicit highly unstructured résumés without uniformity from prospective job candidates. Third, both involve the placement of advertising in exchange for an up-front payment obligation by the employer/advertiser.

Because a cost is associated with posting a classified ad, there is an economic disincentive for employers to post jobs other than those for which there is a current (or currently expected) vacancy. Furthermore, the classified advertising model employed by newspapers and existing on-line employment sites attracts almost exclusively jobs for which there are current (or currently expected) vacancies. Accordingly, many fewer jobs are advertised than actually exist, and because much of the talent that is currently employed are not continually looking, the jobs that are advertised attract a much smaller pool of highly qualified talent than actually exists. This situation is bridged at significant cost to employers by their use of headhunters who recruit currently employed persons who may be willing to change jobs for a better opportunity, but are unwilling to continuously bear the burden of the search effort.

For employers with on-going recruiting and employment problems, the inefficiencies of existing mediums of finding the best, and, in many cases, sufficient talent for a job is a serious problem that contributes to on-going operational inefficiencies. Likewise, for talent who would like to have access to the complete picture of available jobs, the economic disincentive placed on employers to provide information about all of their jobs is a serious problem that diminishes talent's ability to optimize his or her career.

For employers, the classified ad system allows a company to develop a group of résumés of persons who have responded to ads. Employers may also consider classified ads placed by talent, indicating that they are available for employment. However, there is a similar economic disincentive for talent to pay for publication of a classified ad. Further, this combined group of talent résumés is small in relation to the potential universe of talent, and it does not provide an employer with the detailed and comprehensive information necessary for employers to select an ideal candidate.

Other recruiting systems are basically improvements to the newspaper-based classified ad system. Several improvements have been proposed and implemented. Specifically the Monster.com job board, which may be found at www.monster.com, collects résumés and allows posting of classified employment ads. Systems like Monster.com represent an improvement to the traditional classified ad system, in that these types of bulletin boards collect résumés for free. Nevertheless, the posted jobs are essentially searchable classified ads, and the résumés posted on Monster.com are not searchable without payment of a significant fee. Again, this places an economic disincentive on employers to search out the best qualified candidate for a job.

The Monster.com site indicates that it is covered by U.S. Pat. No. 5,832,497 to Jeffrey C. Taylor ("the Taylor patent" or "Taylor"). The Taylor patent describes a system for managing classified employment ads, using of two databases to store information about résumés and about jobs.

Taylor discloses providing job industries, company identifiers, job disciplines and job titles. Taylor describes using a password system to specify who has access to the job records for the purposes of adding, changing, and deleting job records. Employer-users are charged for contact information on applicant users. Fees are structured as a basic subscription charge allowing a predetermined number of accesses, with a predetermined fee associated with each access above the predetermined number of accesses.

Several other on-line job sites collect information about applicants and provide this information to prospective employers in various ways; however, these systems suffer from drawbacks similar to those of the Taylor patent. Specifically, HotJobs.com, Ltd. (www.hotjobs.com) allows a user to choose a city and also to specify a corresponding metropolitan area. Using HotJobs, a user can search for a job in New York, for example, and find jobs in nearby cities, without knowing the names of the other cities.

To use the HotJobs site, a job search user first registers by providing his or her E-mail address and a password. Next the job search user is prompted to either paste in the text of an existing résumé or to answer a set of questions that will provide for the automatic generation of a résumé. In addition to asking questions pertinent to the résumé, the HotJobs system asks job search users about the types of jobs they are seeking, whether they are willing to relocate, and whether they would like their résumé to be searchable by employers and/or recruiters. If the job search user elects not to allow his or her résumé to be searchable, the résumé will only be accessible by those employers that the job search user specifies by using a process described below. An arbitrary job search user of the HotJobs web site may search all of the posted jobs. By registering and creating a résumé, the job search user can apply to any of the posted jobs.

Like Monster.com, HotJobs.com charges for posting jobs. Therefore, the same economic disincentives are placed on employers that would use the HotJobs system as is placed on employers that would the Monster system.

Accordingly, known on-line job advertising systems represent only minor improvements over the traditional newspaper-based employment classified advertising system. And the known on-line job advertising systems retain the significant economic limitation of being based on the newspaper employment classifieds paradigm. The services charge employers for posting their jobs, just as in the newspaper model, and then they charge fees for merely having the ability to search through the database of talent résumés.

Because the pay-to-post and subscribe-to-search systems impose upfront economic barriers on employers, the systems have the disadvantage of providing a disincentive for all employers to post all of their jobs. Further, when talent knows that only a subset of available jobs are posted and that employers are charged to search résumés, talent will not be optimally motivated to use the career site.

In order to avoid the economic barriers presented by traditional print and on-line media to the comprehensive posting of employment opportunities, some employers have established employer-owned Internet sites wherein they list some or all of their employment positions. Such sites, to the extent that the employer has listed all of its employment positions, can provide a prospective employee with a comprehensive view of opportunities with that employer, but not with any other employer. Therefore, while employer-owned sites avoid the economic barriers of classified advertising, they do so at another cost—the loss of broad exposure to the available pool of prospective employees, most of whom are unaware of the employer-owned sites.

While the Internet theoretically allows an unlimited number of prospective employees to visit an employer's web site to view potentially all of such employer's positions at little or no cost to the employer, that benefit is accomplished via the transfer of economic burden to the prospective employee who must search countless employer sites hoping for a comprehensive view of employment opportunities. Some people have attempted to reduce the cost-transfer defect of employer-owned sites by creating "collector" sites that electronically link to various employers' separate sites. Such collector sites are mere conduits that may attract incremental attention from prospective employees, but do little, if anything, to ultimately eliminate the economic burden that is shifted to prospective employees. This is because the employers continue to post their employment positions to their separate sites. Under such collector systems, the prospective employee must still periodically visit each site in order to acquire a comprehensive up-to-date view of the market place of employment opportunities. That burden imposes substantial economic costs on the prospective employee due to the significant time inefficiencies entailed.

Accordingly, a system is needed that does not have the limitations of existing systems, and that encourages the participation of all employers and all talent in an economically efficient, on-going process of optimizing the use of available skills.

SUMMARY OF THE INVENTION

Systems, methods, distributed networks, and computer-readable media are provided that relate to employment services. Background information associated with talent-capability attributes is received from talent in a structured format. Job description information is received from employers in a structured format. Prospective matches are identified between employers and talent, and employers and talent are given an opportunity to mutually consent to the exchange of talent contact information. In one embodiment, after such mutual consent has been granted, a financial transaction is consummated wherein the employer pays a fee to the career site operator.

In one embodiment, skills descriptions are received from talent. In one embodiment, mutual consent is indicated by a request for an interview and an acceptance of a request for an interview. In one embodiment, follow up surveys to employers and talent are used to provide feedback to career site participants.

In one embodiment, employers provide information regarding multiple divisions, including geographical and access scope information.

In one embodiment affiliate marketing arrangements are utilized to promote use of the career site. In another embodiment, wholesale marketing techniques are employed. In yet another embodiment, a multi-level retail marketing system is applied to develop employer participation in the career site.

BRIEF DESCRIPTION OF THE DRAWINGS

These and other inventive features, advantages, and objects will appear from the following Detailed Description when considered in connection with the accompanying drawings in which similar reference characters denote similar elements throughout the several views, and wherein.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
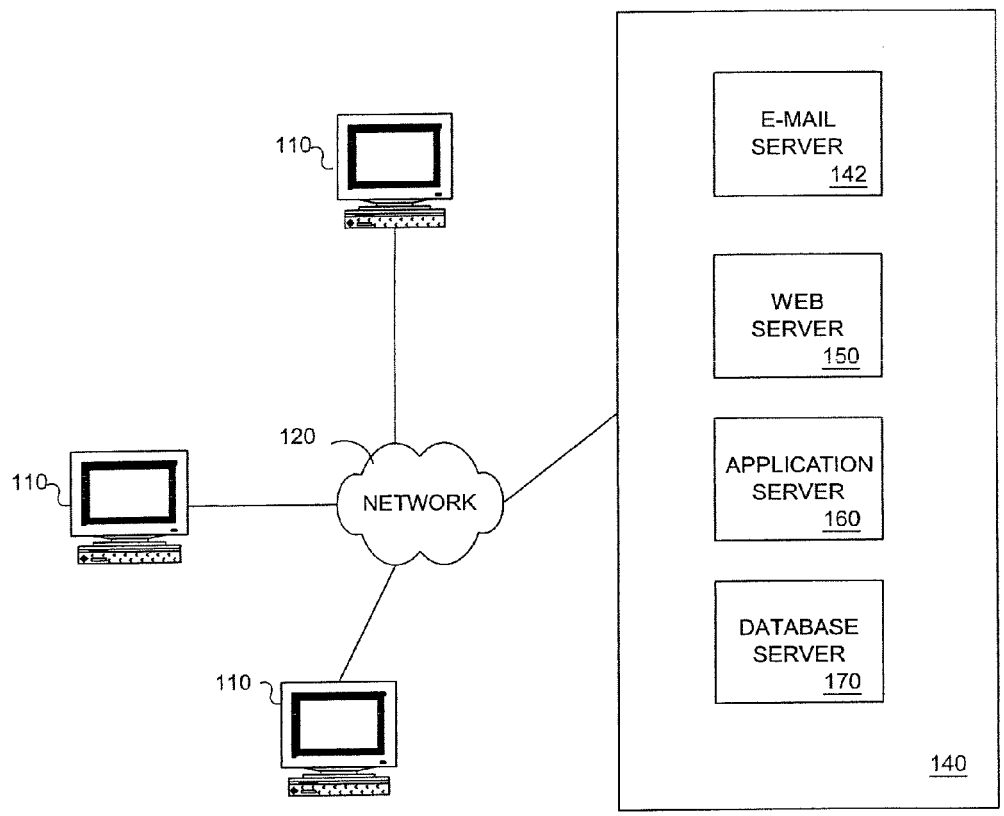
FIG. 1 shows a schematic block diagram of a network in which information systems consistent with the present invention may be practiced.

Referring to the drawings in greater detail, FIG. 1 shows a block diagram of an embodiment of a network in which information systems consistent with the present invention are practiced. Computers 110 represent client computers that are used by talent, employer-users, and other users and administrators of career systems consistent with the present invention. Client computers 110 are of any type of data processing system capable of interacting with a network based application, including conventional personal computer ("PC") type computer systems that are available from companies such as Hewlett-Packard Company and Dell Computer Corporation, employing an operating system such as, for example, the Linux operating system (which is available from companies such as Red Hat, Inc.) or the Windows operating system (which is available from the Microsoft Corporation). Alternatively, computers 110 utilize a UNIX platform such as those available from Sun Microsystems and Silicon Graphics Inc. or the type of computer sold under the trademark Macintosh™ by Apple Computer Corporation.

In alternative embodiments client computers 110 may also be implemented using other types of computing platforms including thin clients, such as, for example, network computers or using personal digital assistants ("PDA"), such as, for example, the iPAQ™ from Compaq Computer Corporation, or the Palm Pilot™ from Palm, Inc.

Network 120 represents a network, such as, for example, the Internet, which is an interconnected network of other networks, including local area networks ("LANs"), wide area networks, ("WANs"), wireless networks, the public services telephone network ("PSTN") or any other network capable of transmitting and receiving digital information.

Through the network 120, client computers 110 may interact with network applications such as career site application 140. In one embodiment, the career site application 140 comprises a web server 150 such as, the Apache web server available from the Apache Software Foundation, or the Internet Information Server ("IIS") available from the Microsoft Corporation. In one embodiment, web server 150 provides application specific information to client computers 110 based on information associated with a database server 170. Application information is structured based on business logic contained in an application server 160. E-mail server 142 operates in connection with the web server 150 to facilitate sending and receiving of E-mail messages. Alternatively, each of the E-mail server 142, the web server 150, the application server 160, and the database server 170 may be implemented in various ways, including as three separate processes running on three separate server computer systems, as processes or threads running on a single computer system, as processes running in virtual machines, and as multiple distributed processes running on multiple computer systems distributed throughout a network. In one embodiment, multiple servers corresponding to the E-mail server 142, the web server 150, the application server 160, and the database server 170 are used. In this embodiment, conventional load balancing techniques are employed to balance network load between the multiple servers.

In one embodiment, application server 160 is a ColdFusion™ application server available from Macromedia, Inc. In this embodiment, when one of client computers 110 requests a web page from web server 150, a request is transmitted through web server 150 to application server 160, where the request is processed and data requested from database server 170 as necessary. Upon processing of the request a response is prepared and returned to one of client computers 110 via web server 150.

Computer systems such as web server 150 and application server 160 include memories in which information resides. These memories may be either non-volatile, as in the case of flash electrically erasable programmable read only memory, or volatile as in the case of random access memory.

I. Career Site Overview

In one embodiment a career site is provided in connection with a web site running on a web server such as web server 150 of FIG. 1. Users wishing to search jobs or talent profiles on the career site do not have to register to gain access to a subset of features on the career site. In one embodiment, when a career site is operated as a business, a fee is generated when an employer elects to purchase contact information corresponding to a talent profile. Consistent with the invention, there is no risk to an employer by listing its jobs on the site because, unlike a typical classified ad, there is no fee associated with listing jobs on the career site. Further, a participating employer pays nothing until it identifies talent having an appropriate set of skills and experience, and the talent has expressed interest in the employer.

In one embodiment, the amount of the fee paid by an employer to the career site before obtaining contact information is related to the educational level of a particular talent. In this embodiment, the structured system of recording educational levels in the talent profile is used in connection with accounting aspects of the career site. For example, in one embodiment, the charge for talent contact info is mapped to the highest education level as follows: (i) GED costs $30; (ii) high school costs $40; (iii) vocational educational training costs $50; (iv) associate's degree costs $50; (v) bachelor's degree costs $65; (vi) master's degree costs $80; and (vii) doctorate costs $100. In another embodiment, a flat fee, such as, for example $50 is charged for all talent contact information regardless of education level or required compensation. In another embodiment, the price of contact information is related to the maximum offered compensation of the employer and is independent of educational level. In yet another embodiment a combination of factors is used in determining the cost of contact information, including for example, education level and the intersection of required and offered compensation.

Any employer that wishes to add job descriptions to the job database may do so without incurring any costs payable to the career site operator for such additions to the job database. In one embodiment, an employer that requires the assistance of the career site operator in entering its jobs in the career site databases may be required to pay fees for such assistance, but an employer's use of such assistance is at the employer's discretion. Consequently, the ability to avoid the economic barriers represented by the existing models of searching for prospective employees removes the disincentive to posting all of an employer's jobs that is found in classified advertising based systems.

Since employers may comprehensively post any number of jobs for free, the career site may be considered a continuous recruiting system. As a result, employers may efficiently, effectively, and at low cost optimize the pool of skills represented by their personnel. And the resulting comprehensive listing of jobs, encourages talent to post and maintain, throughout their career life, a talent profile that enumerates and describes talent's specific skills and qualifications in order to match as often as possible the skills defined by employers in any number of job listings. Because talent profiles are exposed on a continuous basis to comprehensive listings of jobs by a potentially comprehensive pool of employers, the career site may be considered a continuous employment search and continuous career enhancing system.

The arbitrary user of the invention may search job listings and talent profiles for free. While it is common for job seekers to be able to search advertised jobs of multiple employers for free on various commercial media, and to be able to search jobs of individual employers for free on separate employer-owned on-line sites, nowhere may job seekers search a comprehensive database of freely-listed employment opportunities that is unimpeded by the transaction cost of advertising. And employers that want to search résumés face even more hurdles. In the case of print media, résumés cannot be searched; in the case of current on-line systems, résumé searches are typically subject to subscription and other fees. Accordingly, there is a need in the art for practical and inexpensive ways for employers to search for résumés.

Consistent with the present invention, talent profile searches yield results that do not include either the talent's contact information or the name of talent's current employer. Therefore, applicants need not be concerned that their information is available to be searched. Additionally, since one of the fields in a talent profile allows an applicant-user to specify that he or she is currently content with his or her position, talent need not be concerned that posting a talent profile may place talent's current employment at risk in the unlikely event that the talent's current employer may happen upon talent's profile and recognize it. In one embodiment, talent profiles are always active. In another embodiment, talent profiles are always active unless rendered inactive for failure to respond to requests for interviews.

In an alternative embodiment, a talent is provided an opportunity to disable his or her talent profile. In this embodiment, if a particular talent profile is disabled the talent résumé will not be provided to employers, and the talent will not receive messages regarding requests for interviews.

When an employer is seeking talent and searches the talent database for a person with a predetermined level of training, skills, and experience, and finds one or more suitable talent profiles, the employer becomes the initiating party to the ensuing transactions. When a talent is seeking employment and searches the database for a desirable employment position, the talent becomes the initiating party to the ensuing transactions.

Next the system compares the parameters of the talent profile and the job listing involved in the initiating party's inquiry, including comparing the minimum required compensation of the talent with the maximum provided compensation of the job position. If the parameters do not match or overlap, the initiating party is told that the parameters (for example compensation requirements) do not match. The initiating party may then be offered an opportunity to change parameters and to try the comparison again.

In one embodiment, if talent-initiator attempts to apply for a job listing having a minimum compensation expectation that exceeds the employers maximum, a message is sent to the applicant stating that "Your minimum compensation expectation exceeds the employer's maximum, and, therefore, we have not forwarded your profile to the employer. Would you like to change your compensation expectation?" In this way, for example, if talent discovers that his or her expectations are not matched with the current set of posted jobs the talent has an opportunity to adjust compensation requirements. Similarly, an employer-initiator may become interested in a talent profile exhibiting a particular set of training, experience, and skills, but the minimum compensation expected by the talent may exceed the maximum compensation that the employer has defined for the job it seeks to fill. In such a circumstance a message is sent to the employer informing it of that fact, whereupon the employer may decide to increase the maximum salary range or to make a new inquiry pertaining to a different talent.

In one embodiment, if a talent is notified that his or her minimum required compensation is too high and declines to lower his or her minimum, the corresponding employer is notified that talent are considering the employer's job descriptions and electing not to lower their minimum requirements. In this way, employers are provided an opportunity to raise the maximum compensation, even in situations in which a talent is the initiating party.

In an employer initiated process, when an employer declines to increase its maximum compensation in response to a message that it is too low for talents' minimum requirements, the employer-identified talent are notified of the failed match and that an anonymous employer has declined to increase maximum compensation. Then, talent is provided an opportunity to lower their minimum requirements. In this way, an initial, anonymous salary negotiation can take place to facilitate employer and talent matching.

Mutual interest is the basis for facilitating the exchange of contact information between talent and an employer. Once an internal matching has occurred in response to an action by an initiating party, the non-initiating party must consent before the release of talent's contact information.

When a talent is the initiating party, the talent, by initiating the process, grants his or her consent to provide contact information in the event that the employer wishes to purchase the talent's complete talent profile. If the employer expresses interest in pursuing the recruiting opportunity, the transaction is completed, each party is notified, the talent's contact information is transmitted to the employer, and the employer contacts the talent. In one embodiment, an employer that declines a talent-initiated employment inquiry is presented with a survey requesting reasons why the employer declined. Reasons may include, for example, talent's lack of experience. Responsive e-mails or other communications are then presented to the talent about why the employer declined the talent's inquiry. In one embodiment, if the employer does not respond to the initial inquiry or to the subsequent survey, the talent is informed, "The employer corresponding to the job that you selected declined to pursue your inquiry. No reason was stated."

When an employer is the initiating party, the employer indicates its consent to purchasing the complete talent profile in the event that the talent is interested in the employer's employment opportunity. If the talent is interested in pursuing the employment opportunity, the transaction is completed, each party is notified, the talent's contact information is transmitted to the employer, and the employer contacts the talent. In one embodiment, a talent that declines interest in an employer-initiated employment opportunity is presented with a survey requesting reasons why the talent declined the employment opportunity. Reasons may include, for example, geographic location. Responsive e-mails or other communications are then presented to the employer about why the talent was not interested in the employer's employment opportunity. In one embodiment, if the talent does not respond to the initial inquiry or to the subsequent survey, the employer is informed, "The talent that you selected declined your employment opportunity. No reason was stated."

Feedback is useful for several reasons. For example, it allows talent to develop a realistic understanding of the types of skills and qualifications for which employers are looking and the compensation and benefits that employers are willing to provide; allows employers to assess the adequacy of their compensation packages and other aspects of their employment of their employment environment; and removes or reduces the uncertainty associated with rejection by the non-initiating party, or that may accompany waiting for a response from the non-initiating party when it is unclear whether the lack of a response indicates a delay in processing or a rejection.

Transmission of contact information may be carried out in various ways, including presenting the information via an authenticated web page, electronic mail, facsimile, or any other convenient medium for communicating contact information.

Job listings that are presented by employers are different from classified ads. In one embodiment, job listings are similar to the employers' internal human resources job descriptions.

Although job information may be entered manually, one embodiment consistent with the present invention allows electronic exchange of such information from separately maintained human resource databases directly into career site databases. This process is facilitated and optimized by the structured nature of the career site databases.

In one embodiment, the career site receives precise talent profile information including a uniformly described college degree, with major and minor degree programs. In one embodiment, employer job listings are associated with a database of more than 31,000 occupations. In one embodiment, the occupations database includes information that can be obtained from the U.S. Department of Labor at http://www.oalj.dol.gov/libdot.htm.

In one embodiment, some of the talent profile information, for example, talent's current employer or current compensation is not disclosed to employers unless they purchase a complete talent profile. In one embodiment, talent profile information may include information that may be disclosed to employers only under special circumstances. For example, citizenship information may be optionally collected from a talent, so that if the talent wishes to apply for a position requiring a particular citizenship status, he or she will be able to automatically provide that information. In many cases, however, it is inappropriate for an employer to consider citizenship in its hiring decisions, because such consideration may lead to discrimination on the basis of national origin. Accordingly, a career site, consistent with the present invention will provide citizenship information only in circumstances in which it would be appropriate for an employer to consider the information.

Similarly, Federal Law and Executive Order require certain employers to collect and analyze race and gender information of all applicants to ensure that impermissible discrimination is not taking place. Accordingly, career sites consistent with the present invention have the ability to optionally collect information from talent regarding race and gender information. In one embodiment, race and gender information is provided to the employer at the time the employer makes the hiring decision, but the employer agrees not to use the information to unlawfully discriminate in any way. Furthermore, after hiring decisions are made, and on a predetermined interval, such as, quarterly, race and gender information on an individual basis is provided to the employer for a fee. In this way, employers may inexpensively comply with legal requirements, have adequate information to prevent discrimination, and document that non-discriminatory practices are in fact compliant.

In one embodiment, the career site inquires about a talent's licenses and certificates, such as for example, Licensed Practical Nurse, or Certified Public Accountant. In another embodiment, the career site asks about professional accomplishments. In a further embodiment, the career site asks about a talent's English and foreign language skills. In an additional embodiment, the career site asks about a talent's professional associations. In another embodiment, the career site asks about the educational institution(s) attended by the talent, and the talent's field(s) of study, including specialties such as medical specialties. In a further embodiment, a talent is asked to classify his or her current and past employment history according to the North American Industry Classification System ("NAICS") and the Dictionary of Occupational Titles ("DOT"). These detailed questions provide a better understanding of a talent's experience than merely asking about what an applicant did in his or her prior positions. Further, the system allows input of educational and professional awards, professional recognitions, and honors that talent has received.

Additionally, in yet another embodiment, the career site is designed to receive skills information from a talent. By allowing a talent to describe skills organized in a structured manner, a talent has the ability to manage and to achieve optimal future employment by comprehensively collecting data on his or her marketable attributes. Further, the skills information provided by a talent is in a format that distinguishes itself from mere conclusory statements of skill, such as, for example, "highly skilled in Russian language." Instead, the talent is asked to (i) identify a skill among various skills set forth by the DOT that constitute analytical, communications, and mechanical skills; (ii) explain how the skill was acquired; and (iii) explain how the skill helped the talent perform his or her employment duties in a better fashion. By describing skills as identified above, it is clear how the person has acquired and utilized the particular skill, which allows an optimal evaluation of talent.

Methods, systems, and distributed networks consistent with the present invention provide a powerful cumulative database management system for talent and employers alike. For talent it is a cumulative skills management system that a talent can maintain over the talent's lifetime and that can be used to cumulatively describe: (i) educational programs, including educational institutions, levels of education, fields of study, and specialty fields of study; (ii) employment positions, including employer names and prior job descriptions that are cross-indexed to the NAICS, and the DOT; (iii) licenses and certifications; (iv) languages; (v) analytical skills that are cross-indexed to the DOT; (vi) communications skills that are cross-indexed to the DOT; (vii) mechanical skills that are cross-indexed to the DOT; (vii) professional affiliations; (ix) professional references by employment position; (x) professional accomplishments; (xi) personal references; (xii) personal accomplishments; and (xiii) other relevant cumulative items associated with the constantly evolving attributes associated with a person's actual experiences.

For employers, the management system is a cumulative human resources recruiting and management system that enables management of: (i) employer-account users corresponding to various employer human resources recruiting and management functions; (ii) the recruiting needs of divisions or business units within the enterprise; (iii) the recruiting needs of employment positions, cross-indexed to the DOT, including current open positions, and if desired all employment positions within the company; (vi) recruiting pay scales; (vii) benefits programs; (viii) self-identification and reporting requirements of race and gender of applicants to document effective non-discrimination policies of the employer; (ix) reporting of the self-identification data if required by regulators; (x) jobs requiring U.S. citizenship; (xi) the number of filled and unfilled employment positions; (xii) the skills required for each employment position; and (xiii) other human resources recruiting and management functions.

Because a talent classifies each of his or her employers by industry and dates of employment, methods, systems, and distributed networks can be configured to aggregate relevant portions of the talent's work experience in any tier of an industry using NAICS codes that are a part of the industries database consistent with the present invention. Further, because a talent classifies each of his or her employment positions by occupation and dates of employment, the talent's work experience in any tier of occupations can be aggregated using the DOT codes that are a part of occupations databases consistent with the present invention.

Additionally, by using structured data corresponding to analytical, communications, and mechanical skills that are a component part of the DOT classification system, employers have the ability to search occupational titles other than the particular occupational title associated with a particular employment position for skills similar to those required for the particular employment position. Identifying target skills found in other occupational titles may, optionally, be based on the primary analytical, communication, and mechanical skill required for each occupational title, but may include skills other than the primary skills, and in any combination.

Because the analytical, communications, and mechanical skills that the career site requests talent to describe correspond to the DOT codes, employers have the ability to search for relevant skills that a talent described in his or her talent profile.

In one embodiment, employers may search based on a closest metropolitan area. According to this embodiment, a search will match talent residing outside of a particular metropolitan area if the talent's location is nevertheless closer, in terms of cost, distance, or time, to the selected metropolitan area that to any other metropolitan area. In one embodiment, talent may search for employers based on a closest metropolitan area. In an alternative embodiment, the closest metropolitan area feature is not used in connection with U.S. metropolitan areas but is used in connection with metropolitan areas outside of the U.S.A.

A. Talent

Users may search job listings at no cost without registering with the career site. However, in order to apply for an employment position, a user must have registered as a "talent" and must have posted a talent profile to the career site's talent profile database. In order to post his or her profile to the talent profile database, a talent must (i) select a username and password to prevent unauthorized access to the talent's profile; (ii) provide all required personal information, such as, for example, name, address, phone number, and e-mail address; (iii) provide all required information with respect to at least one school that the talent has attended, such information to include, for example, the name of the school, the talent's graduation status, the talent's level of education, and the talent's primary field of study; and (iv) provide all required information with respect to at least one employment position that the talent has held (or indicate that he or she has never been employed), such information to include, for example, the name of the employer, the dates of employment, the title of the job held, the employer's industry classification according to the NAICS, the occupational classification of the employment position held according to the DOT, a description of the employment position held, and other information relevant to the employment position talent has held. Optionally, talent may enter information describing his or her special skills and abilities such as analytical skills, communications skills, mechanical skills, language skills, licenses and certifications, and professional and personal accomplishments.

In one embodiment, the talent's identity is not discernable to the arbitrary user of the career site. In another embodiment, digital certificates are employed to prevent unauthorized access to the talent's profile. Authentication and authorization may be performed for a user account using other methods, including biometrics, smart cards, and tokens.

After having created a talent profile, a talent may conduct more refined searches of the career site's jobs database, and may apply for jobs on the system.

In one embodiment, once a talent profile is established, the talent may access a message repository similar to an electronic mail box. The repository contains information about jobs sought and the status of the employers' response to the talent's inquiries. The repository also contains information regarding employer inquiries regarding the talent's profile. In each case, the information is linked to a specific job listing, and provides other information such as the current status of each inquiry, the dates of inquiry, and the response by either the employer or the talent depending upon who initiated the inquiry.

In another embodiment, potential matches are automatically suggested to talent based on comparisons with job descriptions seeking talent having attributes similar to those provided in the talent profile.

B. Employers

Users may search talent profiles without registering with the career site. However, in one embodiment, in order to obtain any talent contact information, a user must establish an account as an "employer," and must post at least one job listing to the career site's jobs database. To establish an account, the employer must register with the career site. In one embodiment, the individual establishing the account on behalf of the employer is designated as the "account manager." In one embodiment, the identity of the initial account manager is established when an employer account is created. In one embodiment, another individual may be designated as a substitute or replacement account manager. In one embodiment, the identity of account managers is not discernable to the arbitrary user of the career site.

In one embodiment, a username and password is selected by or provided to the account manager to prevent unauthorized access to an employer's account. In another embodiment, digital certificates are employed. Authentication and authorization may be performed for a user account using other methods, including biometrics, smart cards, and tokens.

Some employers, especially large enterprises, may wish to allow multiple persons to have access to their account ("account users") to maintain job listings on the career site. Some employers, especially large enterprises, may wish to create multiple divisions of their account to categorize job listings pursuant to the employers' operational divisions. Some employers may wish to allow multiple account users for various divisions, and/or to assign multiple divisions to one or more account users. Accordingly, in one embodiment, the employer-user is asked whether the employer has multiple divisions. If the answer to the multiple divisions question is "No" then all posted jobs for the employer go to a single listing for the employer. If the answer is "Yes" then the employer may designate separate divisions, which correspond to the employer's separate business units, facilities, offices, departments, etc., and which may be separate legal entities such as subsidiaries. In this way an employer more effectively manages its jobs by location, division, or business unit.

In one embodiment, employer division information is structured in a hierarchical manner, beginning with the parent company, which is the employer in whose name the employer account is established. Each subsequent division is categorized, for example, according to Statements of Financial Accounting Standards No. 141 and 142, as: (i) a subsidiary company, which typically corresponds to legal entities at least partially owned by the parent company; (ii) an operating division, which corresponds to plants, product lines, or other constructs identified by an employer as a "division"; (iii) a reporting unit, which is an employer identified segment of an operating division; and (iv) a department, which is an employer identified, and separately tracked, segment of a reporting unit. Any number of divisions of any category may be associated with an employer account.

In another embodiment, the employer is asked whether it wants to allow multiple users to have limited access to the employer's account. If the answer is "No," then only the account manager may use the account. If the answer is "Yes," then the account manager may identify multiple account users. In another embodiment, account managers may grant account users access to conduct administrative and recruiting functions for some divisions, and restrict access to other divisions. Further, in one embodiment, employers may grant account users access to conduct administrative and recruiting functions for some job listings, and restrict access to other job listings within the same division. In one embodiment, to accommodate these features, the account manager establishes a username and password for each account user. Ordinarily an employer account manager will have the authority to grant and restrict access to account users.

Once an employer is authenticated, the employer's account manager may access a message repository similar to an electronic mail box. Account users may access message repositories established for them that correspond to the account users' division and job listing assignments. Such repositories contain information about talent sought and the status of such talents' responses to the employer. The repositories also contain information about talent inquiries regarding the employer's job listings. The talent sought and talent inquiries sections of the repositories contain records having information including: (i) employer division(s); (ii) account user(s); (iii) linked job title(s), which provide a connection to the posted job(s), (iv) linked talent profile identifier(s), which provide a connection to blind or complete talent profile(s); (v) dates of inquiry and response; and (vi) current status.

In one embodiment, when the employer initially creates or later modifies its employer profile, the system asks the employer to classify itself using an industry classification. When an employer indicates that it has multiple locations, divisions, or business units above, the employer is prompted for an industry classification for each of its sub-entities.

In one embodiment, the billing contact for the employer defaults to the first account manager of the employer account. However, the default billing contact may provide information about a different billing contact by clicking on a check box. User interfaces other than the check box may be used to provide instant access to entering an additional billing contact. Billing contacts may be done for the entire enterprise, or assigned on a sub-entity basis.

In another embodiment, when a job listing is created, the employer is asked to (i) classify the job according to the DOT; (ii) describe the various skills required for the job such as educational level, field of study, specialty, and language skills, etc. using the career site's databases; (iii) provide a narrative description of the job; and (iv) provide other information pertinent to the career site's functionality, such as the maximum compensation that the employer has assigned for the job listing, and any regulatory criteria.

C. Data Controls

The career site employs a number of internal controls to insure the integrity of its data. In one embodiment, when a user of the career site inputs a city, the city is checked against a database of geographical information, and if the city is not found, the user is provided with an indication that the city was not present in a comprehensive database of cities. In one embodiment, a city is selected from existing choices by way of a multi-level hierarchical data structure, in which the levels include, for example, country, state or province, county or parish, and city.

Additionally the data input system is advantageously constructed so that all input data is checked for upper and lower limits, and that all data is otherwise in conformance with the restrictions of the career site's systems. For example, in one embodiment, postal codes preferably include the appropriate number of digits for the applicable country; geographic areas are cross-checked against the comprehensive database; U.S. phone numbers must be ten digits; foreign phone numbers preferably include an indication that they are not domestic, e.g. by starting with a "+" sign for example; names (such as, for example, city, employer, school, and other types of names existing in the career site databases) are checked against existing names in the various databases; industry classifications, occupational classifications, fields of study, languages, and various licenses and certifications learned by the system are checked against existing data; and information pertaining to analytical skills, communications skills, mechanical skills, and professional and personal accomplishments are collected in a comprehensively structured manner. All of these steps are designed to insure that talent and employers are guided to provide the fullest extent of relevant information, and to insure the uniformity and integrity of data to the fullest extent possible.

In one embodiment, telephone numbers are received in an unstructured manner, without restriction. In this embodiment, application server 160 determines if an international or domestic number has been entered, based on the number of total digits entered. In this embodiment, special characters (i.e. +) are not stored with the phone number field. Special characters may be removed in various places within career site application 140, e.g. in a browser associated with client computer 110 or in web server 150 or in application server 160.

II. Databases

Figure 2:
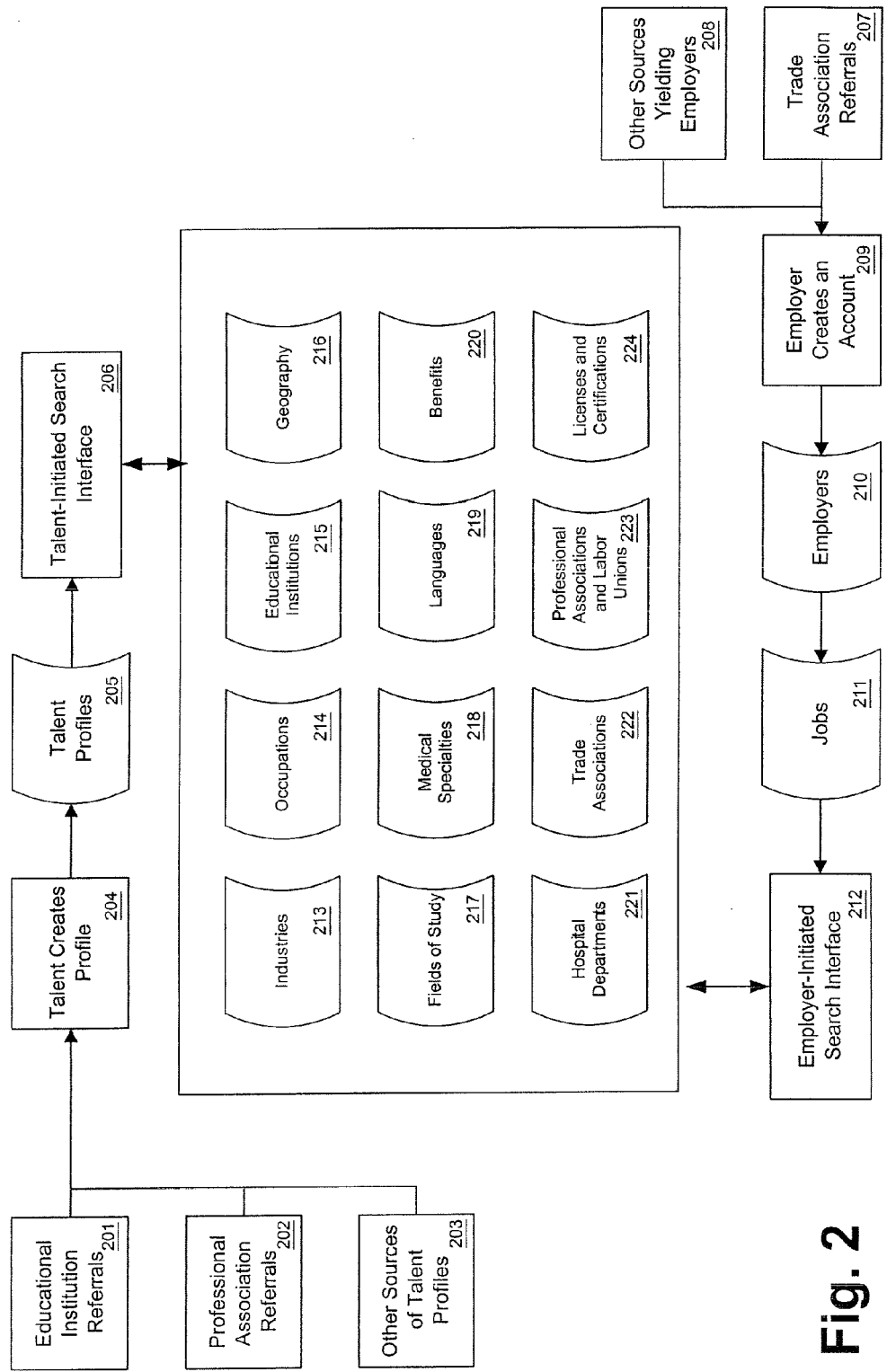
FIG. 2 is a schematic block diagram representing interrelationships between databases consistent with the present invention.

FIG. 2 is a block diagram representing interrelationships between data sources consistent with the present invention. In one embodiment, a relational database management system ("RDBMS") may be employed, such as, for example, Oracle9i from Oracle Corporation or SQL Server from Microsoft Corporation. In one embodiment, in connection with an RDBMS, data structures known as tables are used to represent the databases described in connection with the present invention. Data structures other than those used in connection with an RDBMS may be employed. The term database is used herein to merely describe a collection of information.

In one embodiment, information is intentionally structured to minimize variation between data entries. When allowing members of the public to provide information to a computer system, it is advantageous to maintain data in a consistent format. Accordingly, entries representing the same thing are written in exactly the same way, i.e. "New York City" is always "New York City" and not occasionally "NYC." This is because, when categorizing and cross-referencing employers and talent based on certain parameters, having an inconsistent data format will cause the employers and talent to be incorrectly categorized.

Accordingly, it is advantageous to have a comprehensive database of parameters, such as, for example, "fields of study." In one embodiment, a comprehensive set of fields of study is obtained in advance of operating the career site by examining the degree programs of several representative universities. In one embodiment, additional fields of study may be learned by providing a user with an opportunity to enter a different degree under an "other" category, and then auditing the entered degrees to make sure they are not merely a variation of an existing degree. If the degree is found to be legitimate, it is added to fields of study database 217 preserving data consistency for the next person searching or entering such a field of study. The employers 210, educational institutions 215, geography 216, fields of medical specialties 218, languages 219, hospital departments 221, trade associations 222, professional associations and labor unions 223, and licenses and certifications 224 databases are updated in a similar manner.

In one embodiment, benefits database 220 is fixed, in that it does not learn new benefits, but may be modified from time-to-time by the career site operator. However, employers may supplement benefits database 220 with special benefits programs they may have devised, which programs may be designated as applicable to all of the employer's jobs, or limited to specific employer divisions, or limited to specific jobs within specific divisions.

In this way, data integrity is ensured and variations in data entry style are minimized. Data consistency facilitates matches in searching. In one embodiment, it is not necessary to manually type in a category when searching. If a category is not in a drop down list for searching, the category is not in the database of categories.

In one embodiment, data integrity is imposed on industries database 213 by providing a multi-level hierarchical industry tree consistent with the NAICS, which is maintained by the U.S. Census Bureau. As the NAICS is modified by the Census Bureau, the classifications in industries database 213 are updated.

In one embodiment data integrity is imposed on job descriptions in occupations database 214 by providing a multi-level hierarchical job-tree consistent with the DOT, which is maintained by the U.S. Department of Labor. Levels may include, for example, industry classification, occupational category, occupational division, occupational group, and job title. Such a database may be constructed using a relational database model or other types of database models including multi-dimensional database models. As the DOT is modified by the Department of Labor, the classifications in occupations database 214 are updated.

In one embodiment, industries database 213 and occupations database 214 are associated with each other.

A. Industries Database

NAICS, the North American Industry Classification System, is a system for classifying businesses by industry. NAICS is a classification system that is constructed based on economic principles. In NAICS, economic units that use like processes to produce goods or services are grouped together. NAICS is a replacement for the Standard Industrial Classification ("SIC"), which had been used in various versions since the 1930s. NAICS is a six-digit system that provides for increased flexibility over the old SIC codes.

Consistent with the present invention, coded, labeled, and described industry and sub-industry entries are structured into five tiers. For example, code 488111 is for "Air Traffic Control" and is a 4th subpart of the Transportation and Warehousing industry. For example:

> Transportation and Warehousing
> Support Activities for Transportation
> Support Activities for Air Transportation
> Airport Operations
> Air Traffic Control In one embodiment, industries database 213 is searchable by each of 5 tiers. In one embodiment, each entry in the coded, labeled, and described industry listings, within industries database 213, is accompanied by an English language description of the entry that talent and/or employers may access for additional consideration of the classification choice they make. Talent are asked to classify each employment position they have held by the employer's industry. Employers are asked to classify themselves as a whole (for example, "conglomerate"), and to classify each division that they may set up in the career site system. Divisions may have a different classification than the employer as a whole.

In one embodiment, industries database 213 is intended to allow a precise classification of the industry or industries in which a particular talent has worked and the industry in which an employer's particular job listing participates. The precise classifications facilitate highly refined searches by talent for jobs and by employers for talent, which searches can be done by any industry tier in industry database 213.

In one embodiment, industries database 213 will be updated to correspond with updates to NAICS. Industries database 213 searches may be carried out in combination with searches performed on other databases, such as, for example, those represented in FIG. 2.

In one embodiment, the number of years of experience that talent has in a particular industry tier is calculated by the career site operator to facilitate matching the industry experience offered by the talent to the industry experience required by employers. In one embodiment, industries database 213 is updated as the NAICS is updated from time-to-time by the U.S. Census Bureau. Industries database 213 may be searched in combination with any other databases of the career site, such as, for example those represented in FIG. 2.

B. Occupations Database

In one embodiment, occupation database 214 uses information from the Dictionary of Occupational Titles—Fourth Edition, Revised 1991, published by the U.S. Department of Labor. DOT is a system for classifying jobs and the skills required for each job. Occupations database 214 includes over 31,000 separately identified occupations or "occupational titles" that are assigned to successively broader groups. In one embodiment, the structure of occupations database 214 consists of coded, labeled, and described occupational and sub-occupational entries consisting of 4 tiers, including:

| |
|---|
| Occupational Category |
| Occupational Division |
| Occupational Group |
| Occupational Title |

For example, the occupation of Artificial-Breeding Technician is the Occupational Title of the following Category, Division, and Group:

| |
|---|
| Agricultural, Fishery and Forestry Occupations |
| Animal Farming |
| Animal Services |
| Artificial-Breeding Technician |

Each occupational title is matched to a three-part combination of coded, labeled, and described primary job skills associated therewith. Skill categories include:
1. Data and Analytical Skills
2. Communications and People Skills
3. Mechanical Skills The three categories of skills are further broken down into subparts for which there are corresponding codes. The subparts include:
Data and Analytical Skills
    Synthesizing
    Coordinating
    Analyzing
    Compiling
    Computing
    Copying
    Comparing
Communications and People Skills
    Mentoring
    Negotiating
    Instructing
    Supervising
    Diverting
    Persuading
    Speaking—Signaling
    Serving
    Taking Instructions—Helping
Mechanical Skills
    Setting Up
    Precision Working
    Operating—Controlling
    Driving—Operating
    Manipulating
    Tending
    Feeding—Offbearing
    Handling In a systematic manner, talent is asked to describe their skills in each subcategory of data/analytical, communications/people, and mechanical skills. In addition, each occupational title is assigned to a particular industry. For example, the occupational title of Artificial-Breeding Technician is assigned to the Agriculture industry. In one embodiment, occupations database 214 includes a written description or definition of occupational titles that talent and/or employers may access for additional consideration of the classification choice they make.

A talent is asked to classify each employment position they have held by occupational title, when the employment position is added to his or her talent profile. Employers are asked to classify each job listing they post to the career site by occupational title. Occupations database 214 allows precise classification of talent's current or past employment positions and a precise classification of each employer's individual job listings.

Talent may use occupations database 214 to search for jobs in any occupational category, division, group, or title. Employers may use occupations database 214 to search for talent that have worked in any occupational category, division, group, or title. Employers may also use occupation database 214 to search for talent that has described specific data/analytical, communications/people, and mechanical skills compatible with the employer's requirements and expectations for the job. Occupation database 214 may be searched in combination with any other databases of the career site such as, for example, those represented in FIG. 2.

In one embodiment, selections from occupations database 214 are presented to talent and employers after a keyword search of the occupational titles. In addition to the occupational titles, the corresponding occupational group and industry are presented to assist talent and employers in the selection of a specific occupational title. The results of the keyword search may be sorted alphabetically by occupational group, title, or industry to assist talent and employers in the selection of a specific Occupational Title. If additional assistance is required for classifying an employment position or job listing, a narrative description may be accessed for each occupational title.

In one embodiment, the number of years of experience that talent has in any Occupational Category, Division, Group, or Title is calculated by the career site operator to facilitate matching the experience offered by the talent in a particular occupation to the occupational experience required by employers.

C. Hospital Departments Database

Hospital departments database 221 contains information gathered from hospitals and other sources to prepare a list of functional departments within hospitals. Hospital departments database 221 is used to further classify talent's hospital employment position(s), if any, and an employer hospital's employment positions. This feature is important because, for example, registered nurses may hold many different positions within a hospital. Accordingly, talent and employers may conduct searches based on designated hospital departments. Hospital departments database 221 may be searched in combination with any other databases of the career site, such as, for example, those represented in FIG. 2.

D. Employers Database

In one embodiment, employers database 210 contains information regarding employers that have provided employer information, and the names of employers provided by talent for whom no employer account has yet been established. Therefore, in one embodiment, talent may add an employer name, location, and industry classification to employers database 210 if said database does not already contain such information. If an employer account is later established, the information provided directly by the employer will be used by the career site operator to replace any information that may have been provided by talent.

Employers database 210 includes information comprising an employer's (i) name; (ii) address; (iii) phone number; (iv) NAICS code(s), (v) account users and e-mail addresses, and other identifying information, including, for example, a number of divisions or business units of an employer and associations between an employer's account users, divisions, and job listings. In one embodiment, employers database 210 is updated as each employer establishes or registers an employer account with a particular career system operator.

In one embodiment, a talent may use the employer name portion of the employers database 210 to identify the employer precisely. Employers may conduct searches for talent based on employers' names in order to identify talent who have worked for a particular employer in the past. This functionality serves as an alternative industry search and may identify talent who misclassified the industry and/or occupational title of their previous employment.

In one embodiment, logic used in connection with employers database 210 includes a routine to safeguard against employers establishing duplicate employer accounts for a single employer. In this embodiment, when a new employer account is established, it is compared to existing employers using a soundex name comparison and for example a comparison of address and industry codes.

In one embodiment, talent and unauthenticated users may use employers database 210 to search for jobs listed by particular employers using as broad or as refined a set of criteria as the talent chooses to use. Searches of employers database 210 may be made in combination with any other databases such as, for example, those represented in FIG. 2. Talent may search job listings using any available data field supplied by employers, or by use of key words, except that talent may not search employers database 210 using employers' confidential information, including, for example, the names and addresses of the account manager or account users.

In one embodiment, personally identifying information regarding persons associated with employers in employers database 210 and maximum compensation allocation may not be viewed by anyone other than the account manager and account users associated with a particular employer, and authorized personnel associated with the career site operator.

E. Talent Profiles

Talent profiles database 205 contains biographical information about talent that would be useful for an employer or recruiter to determine if the talent has suitable skills, training, and experience to be considered for a particular job. Talent profiles database 205 includes information received from talent. In one embodiment talent information is received and stored in a structured format. The talent information includes information selected by talent from lists of information such as, for example, information contained in industries database 213, fields of study database 217, educational institution database 215, occupations database 214, employers database 210, hospital departments database 221, medical specialties database 218, geography database 216, languages database 219, professional associations and labor unions database 223, trade associations database 222, and licenses and certifications database 224. Talent information may also include other data supplied by talent from their own sources. In one embodiment, personally identifiable information is not available for searching or viewing by anyone other than the particular talent and authorized personnel of the career site provider.

Employers may use talent profile database 205 to search for talent using as broad or as refined a set of criteria as the particular employer chooses to use. Employers may search talent profiles database 205 using any available data field supplied by talent, or by use of key words, except that employers may not search talent profiles database 205 using talent's confidential information. When an employer searches talent profiles, the employer does not receive certain information designated as confidential, including, for example the talent's name, home address, telephone number, E-mail address, minimum compensation requirements, and current employer's name. Nevertheless, a match would not have occurred between a talent profile and a job listing if there were not overlap between the maximum compensation parameter in the job description and the minimum compensation requirement associated with particular talent. In one embodiment, when an employer purchases talent contact information, the employer is provided with the talent's name, home address, telephone number, E-mail address, and current employer's name but is not provided the talent's minimum compensation requirements.

In one embodiment, a talent creates his or her profile directly as indicated in block 204. Alternatively, talent profile information may be added to talent profiles database 205 from existing data sources of talent profile information. In either case educational institution referrals 201, professional association referrals 202, and other sources of talent profiles 203 may be used to provide talent profile information.

F. Jobs Database

Jobs database 211 includes information gathered from employers in a structured format. It includes information provided by employers from industries database 213, field of study database 217, educational institution database 215, occupations database 214, employers database 210, hospital departments database 221, medical specialties database 218, geography database 216, languages database 219, professional associations and labor unions database 223, trade associations database 222, and licenses and certifications database 224. Jobs database 211 may also include other information supplied by employers from independent sources.

Personally identifiable information such as the names and other information of account managers, billing contacts, account users, and other confidential information such as maximum compensation allowed for a job, may be accessed only by an account manager associated with the employer or by authorized personnel of the career site operator.

Talent uses jobs database 211 to search for jobs on as broad or as refined a set of criteria as they choose to provide. Talent may search job listings using any available data field supplied by employers, except that talent may not search jobs listings using the confidential and personally identifiable information of employers' account managers, billing contacts, account users, and maximum compensation specified for the particular job listing. Nevertheless, a match would not have occurred between talent and an employer if there were not overlap between the maximum compensation parameter in the job description and the minimum compensation requirement associated with particular talent.

In one embodiment, employers are encouraged to list every job they have or intend to have. In this embodiment, such listings are maintained indefinitely by the career site operator, and the listings are expanded, contracted, or edited by each employer, either by individual manual entry, or by automatic electronic exchange with an employer's enterprise database application, as the employer's recruiting and operational needs change.

G. Geography Database

In one embodiment, geography database 216 is used in connection with talent profile database 205, employers database 210, and jobs database 211 to precisely locate talent, employers, and jobs. Geography database 216 may be used to measure the proximity of talent to employers or jobs. In one embodiment, a database of postal codes may be acquired by continued operation of the career system. As users enter the names of their cities, the associated postal codes are stored in a database with an association to a town. If a particular user mistypes or incorrectly specifies a town or a postal code, repeated use will provide an ability to identify the incorrect associations by checking for consistency with other records and other sources, such as databases that are commercially available. Political sub-entities may include entities such as, for example, cities, towns, or villages; counties, or parishes; and states, provinces, or regions.

In one embodiment, a commercial database containing associations between political sub-entities and postal codes is used directly. In an additional embodiment of the present invention, the association between political sub-entities and postal codes may optionally learn city and postal code associations by aggregate analysis of data that is entered into the system by users.

Other convenient geographical units exist. For example, the U.S. Census Bureau has provided the public with metropolitan area ("MA") population estimates. These MA population estimates are associated with county and sub-county population estimates, which are based on censuses conducted by the U.S. Census Bureau. MAs are further designated as Metropolitan Statistical Areas ("MSA") or Consolidated Metropolitan Statistical Areas ("CMSA"). Within an MA, a "central city" is designated based on the city with the largest population in each MSA or CMSA.

MAs include MSAs, CMSAs, and primary metropolitan statistical areas ("PMSA"). An area that qualifies as an MSA and has a population of one million or more may be recognized as a CMSA if separate component areas that demonstrate strong internal, social, and economic ties, including availability of transportation, can be identified within the entire area and local opinion supports the component areas. Component areas, if recognized, are designated PMSAs. If no PMSAs are designated within the area, then the area remains an MSA.

In one embodiment, a user may conduct a geographical search by county, because some rural counties are not part of an MSA, and accordingly a user, whether applicant or employer will not be excluded from a search on the basis that a particular location is not part of an MSA.

In this way, methods and systems consistent with the present invention provide optimal geographic choice in searching for jobs and candidates. This is particularly useful for employers that would like to consider persons with close geographical ties to the area in which a particular job is located.

H. Associations Databases

Trade associations database 222 and professional associations and labor unions database 223 include the vast majority of established trade and professional associations in the world. In one embodiment, there are approximately 7,649 trade and professional associations in trade associations database 222 and professional associations and labor unions database 223. Talent and employers use trade associations database 222 and professional associations and labor unions database 223 to make a precise designation of such organizations with which they associated. Employers use professional associations and labor unions database 223 to refine their searches for certain skills possessed by talent who belong to particular associations.

In one embodiment of the present invention, commissions may be paid to professional associations that are affiliated with talent who are using the career site, and to trade associations that are affiliated with employers that are using the career site.

I. Fields of Study and Educational Institutions Databases

When talent provide talent profile information to talent profile database 205, they are asked to provide specific, structured background information, including information about training and experience. To facilitate collection of structured data, fields of study database 217, medical specialties database 218, and educational institution database 215 are provided.

Fields of study database 217 includes information collected from various representative educational institutions to prepare a list of educational emphasis that is intended to enumerate the vast majority of possible fields of study. In one embodiment, fields of study database 217 identifies narrower fields of study that exist within broader fields. For example, "Pharmacy" may be broken down into the following subparts:

Clinical Sciences
Doctor of Pharmacy
General
Medicinal Chemistry
Pharmaceutical Chemistry
Pharmaceutics
Pharmacy Administrative and Social Sciences Talent are asked to designate their field(s) of study by selecting from an enumerated list obtained from a data source, such as, for example fields of study database 217. If fields of study database 217 does not include a talent's particular field of study, then the talent is asked to type in his or her particular degree. The database will be updated as previously unlisted degrees are identified and optionally audited for duplication and correctness.

Medical specialties database 218 includes information collected from various educational institutions in order to prepare a list of specialties within the various medical fields of study, and is intended to enumerate the vast majority of possible medical specialties. In one embodiment, medical specialties database 218 identifies narrower fields of study that exist within a broader medical field of study. For example, a specialty within the "medical—surgery" field of study might be "hand surgery."

Field of study database 217 is intended to allow a precise classification of talent's major and minor areas of educational emphasis. Medical specialty database 218 is intended to allow a further refinement of classification with respect to the educational and occupational emphasis of licensed health care providers, such as doctors, nurses, and therapists. It will be apparent to the casual observer that other occupations offer specialization, such as, for example, the legal profession. An embodiment of the present invention is the expansion of the specialty database concept to occupations other than medical occupations.

Precise classifications facilitate highly refined searches by talent for jobs requiring appropriate education and by employers for talent with particular education.

Educational institutions database 215 contains information about educational institutions. Educational institution database 215 is intended to include the vast majority of all colleges, universities, and vocational schools in the world. Based on the enumerated list, talent are asked to precisely designate the schools of higher education they have attended. If educational institution database 215 does not include the school from which a talent graduated or attended, the talent is asked to provide the name of the school.

Employers may use the educational institution database 215 information to search for talent who graduated or attended specific institutions. In one embodiment, educational institution database 215 will be updated as new schools are identified by talent or employers, or as colleges, universities, or vocational schools establish accounts with the career services provider consistent with the present invention.

J. Languages Database

When talent provide talent profile information to talent profiles database 205, they are asked to identify their language skills. To facilitate collection of this information in a structured manner, languages database 219 is provided. Languages database 219 is intended to enumerate the vast majority of the world's languages. In one embodiment, languages database 219 will be updated as additional languages are identified by talent, employers, or other sources available to the career site.

K. Benefits Database

In one embodiment, benefits database 220 is associated with employers and job descriptions. The benefits database includes a standardized listing of benefits that may be associated with a particular employer or job. Some examples of standard benefits include incentive pay, health insurance, including an identification of health care providers, 401-K, dental insurance, continuing education, signing bonus, pension, on-site daycare, flex-time, free parking, relocation, paid vacation, and differential shift pay. Because benefits information is recorded and stored in this way, it becomes searchable by talent. In one embodiment, when talent searches for jobs, icons are displayed that represent the particular standardized benefits that the employer offers with the particular job. The benefits database may, at the option of each employer, also include benefits that are unique to the employer.

IV. Searches for Talent and Jobs

Searches of an arbitrary career site databases may be conducted in conjunction with any or all of the other career site databases. These criteria may be used in connection with self-searches (whereby the user conducts a search at his or her prompting), and with automatic searches (whereby the user specifies at least one set of search parameters that are saved by the career site operator in order to conduct periodic searches) of the career site to facilitate matching talent with the type of position talent is seeking.

In one embodiment, a talent is asked to identify every country in which he or she may lawfully work. Such information facilitates searches conducted by employers. In one embodiment, employers and talent have the ability to conduct either or both of "domestic" and "foreign" searches. For employers, a domestic search identifies the talent profiles of talent who live in and are lawfully eligible to be employed in a designated country, which may or may not be specified as the U.S. Employers may also conduct a foreign search to identify the talent profiles of talent who live outside of a designated country, but who are lawfully eligible to work in the designated country, which again may or may not be specified as the U.S.

In one embodiment, talent may conduct a domestic search to identify jobs located within a designated country, which may or may not be specified as the U.S. For talent, a foreign search identifies jobs located outside of a designated country, which again may or may not be specified as the U.S.

Searching may be performed by way of search interfaces 206 and 212. Potential search capabilities include both searching jobs database 211 and talent profiles database 205. In one embodiment, the process of searching domestic job descriptions includes selecting a geographical region. In one embodiment an applicant may search for jobs by any available geographic designation, which includes country; state, province, region or similar designation; county, parish, township or similar designation; city, town, village, or similar designation; zip or postal code.

In one embodiment, a user of the site may search for talent profiles or jobs that are aggregated within a designated geographic area. If some or all of the designated area encompasses an MSA, then two levels of results are presented. The first level presents the results that are within the designated geographic area; the second level presents the results that are within the corresponding MSA and, if applicable, CMSA.

In one embodiment, the user of the site may broaden or narrow the search. For instance, the user may broaden his or her search from a designated city or MSA within a state to the entire state. Or the user may narrow from a CMSA, such as, for example, the Baltimore/Washington CMSA, to a PMSA or a component of a PMSA, such as, for example, limiting the search to the District of Columbia or to a specific zip code. A search may be broadened or narrowed to any of the available geographical divisions in geography database 216.

In one embodiment, geography database 216 includes searchable listings of every country in the world, and each country's states, provinces, or other political subdivision, cities, and postal codes gathered as part of the data collection in connection with talent profiles database 205, employers database 210, and jobs database 211. In one embodiment, for countries other than the U.S., employers and talent are asked to select from a list or directly provide a metropolitan area, or fractional portion thereof, closest to their place of residence. If a city is not listed, then it is not in the database, and the closest metropolitan area should be selected.

In one embodiment, employers directly create accounts as shown in connection with block 209. Additionally, trade associations 207 and other sources yielding employers 208 may be used to refer employers to the career site and to provide information to employers database 209. Alternatively, employer data sources may provide employer data directly, such as, for example in the case of a trade association providing employer information about its employer members.

In one embodiment of the present invention, the results of talent-initiated searches for jobs are presented to the talent ranked by the maximum compensation offered by the employer for the particular job; the job offering the highest compensation is listed first and the job offering the lowest compensation is listed last. Nevertheless, the actual compensation ranges specified by employers are not disclosed to anyone. In one embodiment, the results of employer-initiated searches for talent are presented to employers on a scoring system (discussed later in this patent application) consistent with this invention; the talent profile evidencing the most favorable score is listed first and the talent profile with the least favorable score is listed last. Nevertheless, the score calculated by the career site operator is not disclosed to anyone, and is merely used to determine the order of presentation.

At the election of the user, one or more search parameters devised by the user will be saved by the career site operator for such user's future use within the career site. At the election of the user, the results of searches conducted by the user will be saved for such user's future use within the career site.

V. Talent-Initiated Processes

Figure 3:
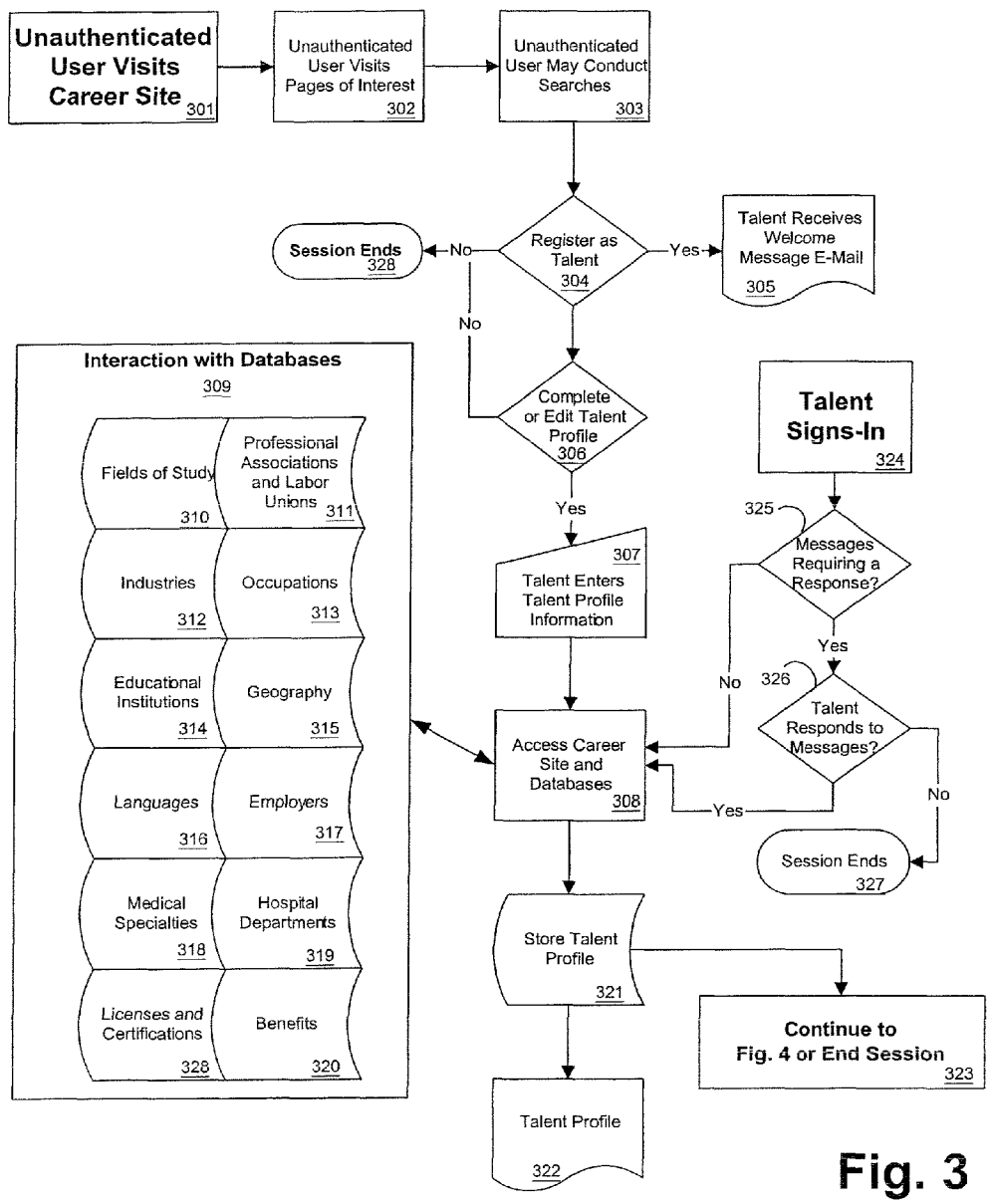
FIG. 3 is a flow diagram representing an unauthenticated user or interacting with a career site consistent with the present invention, and a talent interacting with a career site consistent with the present invention.

FIG. 3 is a flow diagram representing a process performed in connection with an unauthenticated user and a talent (i.e. a user that has registered as a talent) interacting with a career site consistent with the present invention. First, an unauthenticated user visits the career site (stage 301). In one embodiment, the career site provides users with access to a web page. A user could alternatively access an application in forms other than a web page, such as, for example, by way of a speech recognition interface. Next, the unauthenticated user visits pages of interest in the application (stage 302). The pages or content of interest may include (a) searching (i) talent profiles, (ii) job listings, (iii) articles; and (b) viewing advertisements, or other content in the career site. The unauthenticated user may search jobs and talent profiles, but may not apply for jobs or purchase talent contact information (stage 303).

While accessing the site, a first-time user has an ongoing opportunity to register with the site (stage 304). Users must register as either "talent" or "employers." If a user decides not to register and has no more pages or content of interest to him or her, then the session ends (stage 328). If an authenticated user intends to register as a talent, then he or she continues with the process described in FIG. 3 (stage 304, et seq.). If an authenticated user intends to register as an employer, then he or she continues with the process described at FIG. 8 (stage 804).

Authentication is the process of identifying an individual, usually based on a username and password or credentials. Other methods of authentication may be employed without departing from the scope of the present invention, including digital certificates, token cards, and biometrics. An authenticated user is a user that has provided adequate credentials to an authentication system, based on a predetermined standard for adequacy of credentials. In connection with the present invention, "predetermined" means to be determined prior to any attempted access.

In one embodiment, an unauthenticated user of a career site application may access only a subset of the available features of the career site application. Areas to which access is allowed to unauthenticated users in this embodiment include: (i) a home page associated with the career site; (ii) a talent section that provides information to talent about registering with the system and about how to use the system; (iii) an employer section that provides information to employers about registering with the system and how to use the system; (iv) "quick search" of the job description, talent profile, and employer databases; (v) a "storefront" section where the user may learn more about specific employers that are using the career site for recruiting purposes; (vi) an industry news section where users may access news articles pertaining to one or more industries or employers that the talent has identified, and/or in which talent has expressed interest as evidenced by talent's most recent job search and/or employment application; (vii) a section that describes commercially available reports prepared by the career site operator; (viii) an "affiliate" section that describes the career site's affiliate marketing programs; (ix) an "about us" section that provides information about the career site operator, including information such as, for example, contact information for the site operator; (x) a privacy statement regarding information that is collected; and (xi) terms of use of the career site.

In one embodiment, "quick search" is a function designed to search the career site's databases in a manner that is less specific than the "full search" function, which is capable of searching all data fields in the career site's databases.

In one embodiment, an unauthenticated user is not allowed to perform the functions of (i) "full search" function; (ii) create or modify a talent profile; (iii) create or modify an employer account; (iv) create or modify a job listing; (v) apply for a job; (vi) convey an employment opportunity to talent; or (vii) create or modify storefronts.

In one embodiment, registering with the career site involves choosing to register as either "talent" or as "employer." The remainder of this section generally pertains only to users who have registered as "talent."

Registering as talent involves providing several discrete pieces of information. In this embodiment, required information includes, for example, first name, last name, residence address, e-mail address, telephone number, a unique user-ID and password, birth date, and the answer to one question chosen by the talent from among several questions presented that is used for identification purposes if the talent ever forgets the user-ID or password. The discrete pieces of information required for registration may be expanded or contracted without departing from the scope of the present invention.

If the user elects to register with the site as talent, the talent will receive a welcome message via e-mail (stage 305). The talent then also has full site access (stage 306, et seq.). Next the talent has an opportunity to complete a talent profile (stage 307). In one embodiment, talent is encouraged to complete a talent profile, because it will increase the likelihood that an employer will be motivated to contact the talent with an employment opportunity. In one embodiment, a talent is encouraged to complete the talent profile, because the talent may not apply for a job listed in the jobs database unless talent's profile includes the minimum required information.

In one embodiment, once a talent registers and authenticates with the site, the talent may access a career site message repository that resembles an electronic mail box. The message repository contains information about the positions or job listings for which talent has applied and the status of each such application, including employer name, linked job title, dates of inquiry and response, whether the employer has accepted or declined to proceed, and the reason employer declined. The message repository also contains information about employers' inquiries submitted to the talent, including employer name, linked job title, dates of inquiry and response, and whether the talent has accepted or declined to proceed, and the reason that the talent declined, if applicable.

Consistent with the present invention, talent profiles are received and stored in the talent profiles database 205 for any talent that wishes to store a talent profile in the system. Even talent who are not currently seeking employment may develop and maintain their talent profiles including an extensive set of skill descriptions. Consequently, talent profiles are continuously available for consideration for new employment opportunities, thus enhancing the talent's ability to optimize his or her career opportunities.

Talent profiles are made available to the public for searching and browsing without any contact information, and without the talent's current employer's name. Accordingly, a talent's current employment position is not jeopardized. In any event, since the present invention contemplates continuous job search by all talent and continuous recruiting by all employers, it is anticipated that the arbitrary talent will elect to display his or her talent profile continuously. In the event that a talent does not want to continuously display his or her talent profile, then the talent may elect to make his or her entire talent profile "invisible" to others until the talent reverses that election.

In completing an employment profile, a talent is guided through a detailed, multi-step process during which talent provides information, such as, for example: (i) personal contact information; (ii) educational history; (iii) employment history; (iv) special skills and qualifications; (v) professional affiliations; (vi) optionally, race and gender information for use in programs, such as, for example, affirmative action programs and (vii) optionally, citizenship information for use in programs, such as, for example, government contracting programs. If a talent chooses not to complete an employment profile, he or she will not have full access to the site and will not be able to apply for jobs until the minimum requirements for a talent profile are satisfied. If the talent elects to complete a talent profile, the results are saved for searching, analytical, and reporting purposes (stage 321). Based on the saved information, a fully disclosed talent profile 322 is available for inspection by the talent, and a limited disclosure talent profile (i.e., one lacking contact information) is available for public inspection (stage 323).

FIG. 3 also includes a process for already registered talent to "sign in." First, if the talent is not already signed-in, then he or she must "sign in" using his or her previously selected user-ID and password (stage 324). Next, the talent is presented with all employer-initiated and certain talent-initiated inquiries (e.g., for example, the results of automatic searches) that have occurred since talent's last visit to the site or another time period determined by the career site operator (stage 325). If any of the listed inquiries require a response from the talent, then he or she must respond to each such inquiry before conducting additional searches or applying for additional employment positions (stage 326), or the session ends (stage 327). After responding to the necessary messages, the talent may access the career site and its databases (stage 308).

Figure 4:
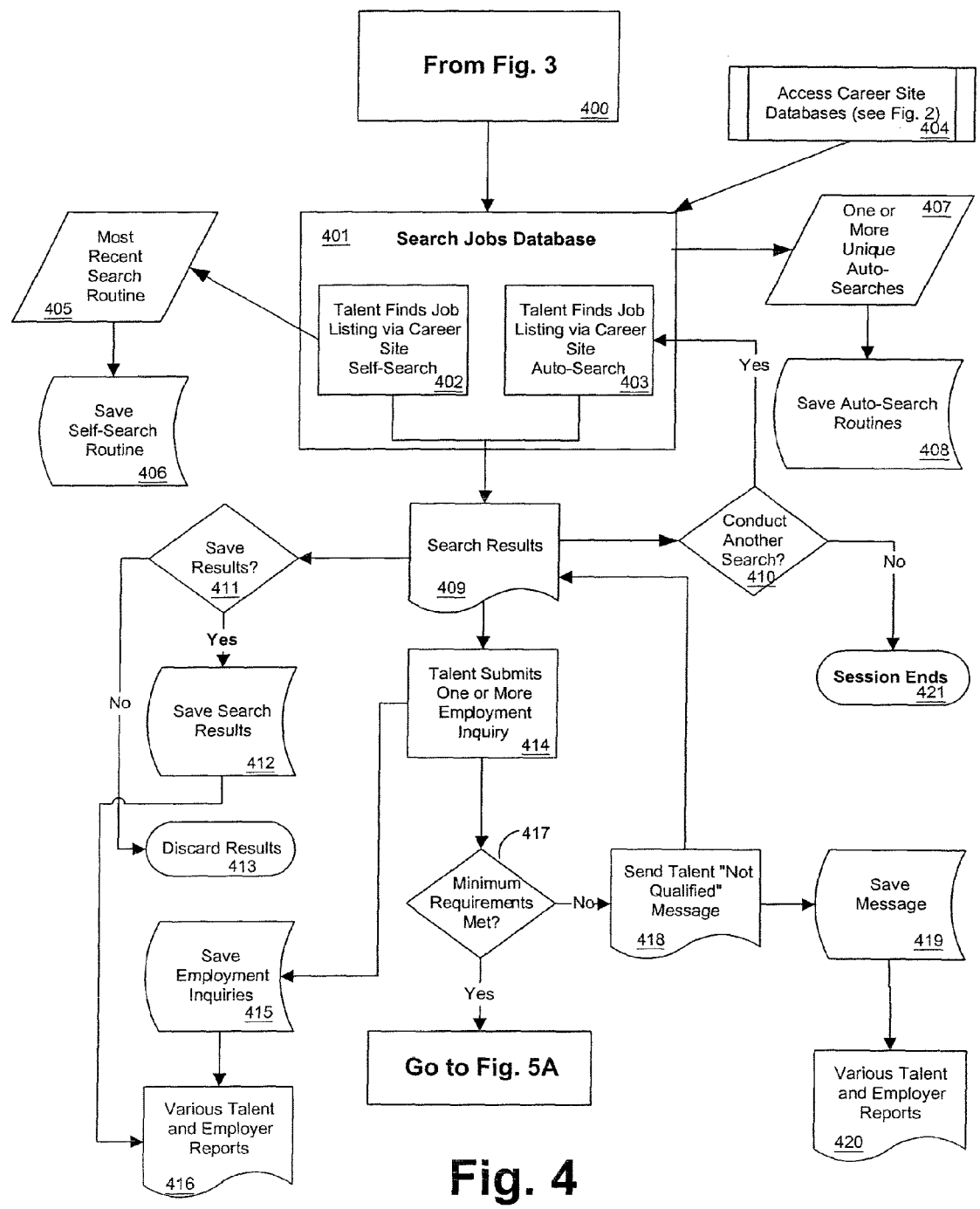
FIG. 4 is a flow diagram representing a process whereby talent searches for and selects jobs and whereby it is determined if talent has the minimum qualifications established and required by the employers for the job(s) that talent has selected, the processes being performed in connection with talent interacting with a career site in operating in a manner consistent with the present invention.

FIG. 4 is a flow diagram representing a process for conducting searches of job listings consistent with the present invention. As indicated in block 400 this process is performed in connection with a process such as the one described in connection with FIG. 3. To search a jobs database as indicated in block 401, a talent may identify a job listing by way of self-search (stage 402) or may specify an automatic search (stage 403). In performing a self-search, talent uses a search form to perform individual, custom searches of the employers database. Automatic searches are conducted on a recurring basis, such as daily, by the career site operator based on the search parameters that the employed has specified for each of its job listings. To conduct a search, whether self-search or automatic search, employers must specify a geographic point of reference and at least one of several non-geographic search parameters, such as industry, occupation, license, or language.

In one embodiment, a talent may initiate a search by specifying the search either as a domestic search or as a foreign search as described earlier in this patent application, and by selecting a geographic point of reference such as a country, state, county, city, or zip code. In this embodiment, a talent may indicate his or her selection from a drop-down list of choices corresponding to the level of geographic area of interest to talent. For example, if a talent is interested in searching for any job of a certain type within a country, then the talent will select a country from a predetermined list of countries. In this embodiment, if a talent specifies only a country, e.g. "United States of America" then all jobs in the U.S. that match the talent's other search parameters will be reported in order of highest to lowest maximum compensation specified by each employer. Other methods may be employed to order the presentation of jobs. In one embodiment, the career site operator may limit the number of jobs reported to a maximum number, for example, 25. The number jobs reported to talent by the career site operator may vary from all jobs or a predetermined number. In this embodiment, employers' maximum compensation figures are not disclosed in the ranking, and job descriptions having the same maximum compensation figure are ordered alphabetically by employer name.

A talent may optionally provide cumulatively more restrictive search parameters by choosing from progressively smaller geographic subdivisions, such as: (i) state, province, or region within a particular country; (ii) county or parish within a particular state, province or region; and (iii) city, town, or village within a particular county or parish. In one embodiment, a preexisting geographical database facilitates collection of structured data by providing the talent with an enumerated list of possible selections for each step. That is to say that if a talent wishes to specify a city, he or she selects a country from the list of possible countries, then selects a state, province, or region from a list of the same from within the selected country, and, finally, selects a city from a list of cities and towns within the selected state, province, or region. Some countries may not have state, provinces, regions, counties, or parishes, or the same may be unknown to the career site operator, in which event, the talent may select directly from the available list of cities, towns, or villages within the particular country. In one embodiment, a talent may by-pass certain geographical subdivisions such as counties or parishes within U.S. states or within the states, provinces, or regions of other countries, and directly select a city, town, or village within a particular state, province, or region.

In one embodiment, if a talent elected to search for jobs by postal code, the talent selects a country from a list of countries. Next, the talent provides a postal code corresponding to the selected country, and the talent need identify no other geographic subdivision of the selected country.

In one embodiment, a predetermined number of jobs will be reported to a talent who selects only search by city or search by zip code. However, in one embodiment, additional search parameters may be provided. In one embodiment, if a talent specifies a geographic subdivision of a country, e.g. the State of Missouri, then all jobs in the specified subdivision that match the talent's other search parameters will be reported. In one embodiment, if a talent specifies a postal code of a country, e.g., 66202 in the U.S., then all jobs in the specified postal code that match the talent's other search parameters will be reported. In either embodiment, the reported jobs may be ranked in order of highest to lowest maximum compensation specified by each employer. However, in one embodiment, the career site operator may limit the number of jobs reported to a maximum number, for example, 25. In this embodiment, employers' maximum compensation figures are not disclosed in the ranking, and job descriptions having the same maximum compensation figure are ordered alphabetically by employer name.

In one embodiment, at least one of a group of additional optional search steps must be specified. In one embodiment, the group of search steps includes, accessing the career site databases (stage 404), for example: (i) industry search; (ii) occupation search; (iii) education search, including any combination of (a) level of education, (b) field of study, (c) specialty, and (d) educational institution; (iv) employer name search; (v) licenses and certifications keyword search; and (vi) languages search; (vii) analytical skills search; (viii) communications skills search; (ix) mechanical skills search; (x) hospital department; and (xi) other keyword search. In this embodiment, each additional search step may be specified as cumulative (i.e., A and B) or alternative (i.e., A or B). For example, a talent may formulate a search as follows: all jobs in a particular city requiring a predetermined level of education and a predetermined license. A talent may also formulate a search in the alternative: i.e. all jobs in a particular postal code requiring either a predetermined level of education or a predetermined certification.

In this embodiment, an optional industry search makes use of an underlying industry database to facilitate collection of structured data. In one embodiment, the industry database contains five tiers of industry specificity. A talent specifies only the first tier of industry specificity, resulting in a broad search. Alternatively, a talent specifies an industry at a more detailed level, resulting in a more focused search. In this embodiment, a talent can also specify a number of years of experience in the specified industry. By providing a number of years of experience, a talent has the ability to filter out those job listings that require more industry experience than the talent specified.

If a talent elects to provide occupation search parameters, the talent is requested to provide an occupational division. To facilitate a more detailed search, the talent may optionally provide occupational group, or occupational title. In one embodiment, a talent may additionally provide a department, for example, in the case of searching hospital job descriptions. A talent may also search by specialty, for example, in the case of licensed health care professionals. In connection with occupation search parameters, a talent may also specify a number of years of experience in the specified occupational division, group, or title. The number of years of experience may be used to filter out those job listings that require more occupational experience than the talent specified.

If a talent elects to provide education search parameters, he or she provides an educational level, i.e. general equivalency diploma ("GED"), high school, vocational school, college—associate, college—bachelor, college—master, or college—doctorate. A talent may further specify a field of study, i.e. "mathematics." A talent may also further specify a specialty, e.g. a medical specialty of "Plastic Surgery."

A talent may also elect to provide a search step that searches job listings by at least one employer name. Additional keyword search steps include searching by at least one license or certification keyword, i.e. "professional engineer" or "certified nurse anesthetist." Other keyword search steps may be provided, corresponding to which the text of any searchable parameter of a job description will be matched for the purpose of the search.

In one embodiment, search results are provided in a structured format, in which job descriptions are provided only if they satisfy all of the criteria as set forth in connection with talent-provided job search parameters.

In one embodiment, for search reporting purposes, job descriptions are separated into two groups: (i) the matching jobs that are located within the specified point of geographic reference, such as a city or postal code; and (ii) the matching jobs that are located within the MSA/PMSA and CMSA that encompasses the selected point of geographic reference. In connection with group (ii), a distance is optionally provided between the location of each job and the talent-specified location in the search.

In one embodiment, the jobs presented to the talent are ordered in descending order based on the maximum compensation that the employer has defined for the particular job listing. In this embodiment, the employers' maximum compensation figures are not disclosed in the ranking, and job descriptions having the same maximum compensation figure are ordered alphabetically by employer name.

In one embodiment, an automatic search is performed based on talent specifications similar to that provided in connection with a self-search. In an automatic search, the career site performs an automatically recurring periodic search against all job listings. In one embodiment, if a talent specifies an automatic search, the system stores a predetermined number of unique automatic searches, such as, for example, 10 (stages 407 and 408), which are used to automatically search job listings using different parameters. In this embodiment, search results are presented pursuant to each talent-specified search routine in the fashion previously described for self-searches. If, alternatively, a talent identified an employer via a self-search, in one embodiment the system may save only the most recent search (stages 405 and 406). In alternative embodiments, an arbitrary number of self-searches may be stored to facilitate repeating self-searches at later times.

A talent-initiated match is a match that occurs because of an initial action taken by a talent. When a talent-initiated match occurs, it is because of one of several reasons including: (i) the talent has located a job description through self-search; and/or (ii) the talent has received notice of a match from the career application by way of an automatic search. The talent may save the search results (stages 411 and 412), discard the results (stage 413), process the results as employment inquiries (stage 414), or conduct another search (stage 410). By submitting an employment inquiry, the talent granted permission to the career site to provide his or her contact information to that employer, if the employer is interested in the talent. Employment inquiries are saved and made available in various reports (stages 415 and 416).

If the talent elects to process the search results as employment inquiries, the next step is to determine whether talent's qualifications and compensation requirements meet the minimum requirements specified by the employer (stage 417). At this stage, the talent's qualifications are compared to the job listing, including non-public aspects of the job description such as for example, maximum compensation value, or the lawful ability to work in a particular country. If the listing employer has identified any qualifications as mandatory, the talent must possess the minimum amount of the corresponding skill in order to be considered for the position. If the talent does not have appropriate experience, education, or other minimum qualification, talent is contemporaneously sent a "not qualified" message, indicating an incompatibility between the job listing and the talent's profile (stage 418). Next, the message is saved and made available in connection with various reports (stages 419 and 420).

If minimum requirements are not met, the talent decides whether to process an employment inquiry for another job listing (stage 409), or to conduct another search (stage 410). If the talent decides not to conduct another search, the session ends (stage 421). Alternatively, if the talent wishes to conduct another search, the process proceeds back to the search stage (stage 401).

Figure 5A:
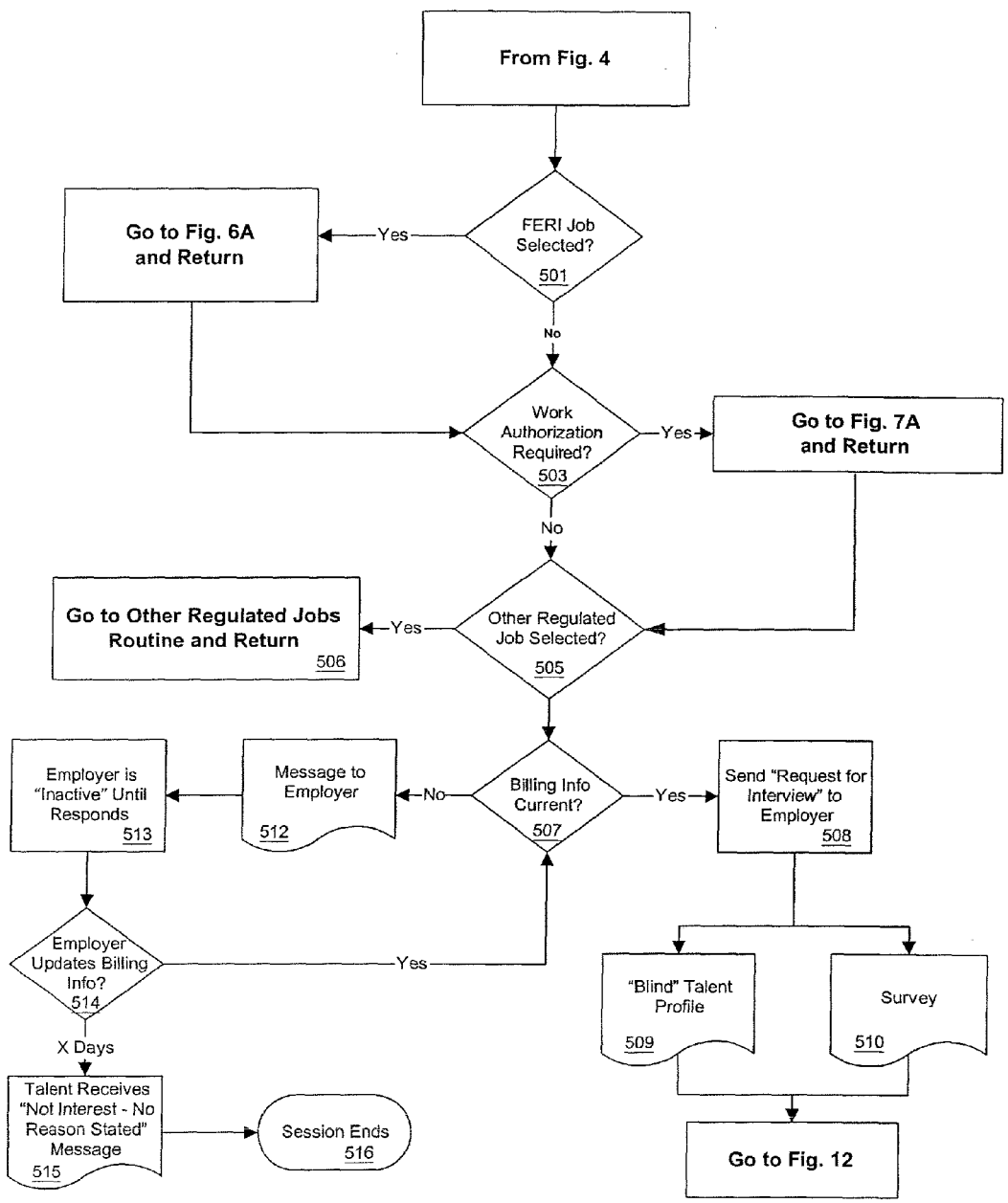
FIG. 5A is a flow diagram representing a series of talent-initiated processes for gathering governmentally regulated information about a talent in a manner consistent with the present invention.

If the minimum requirements for the selected job listing are met, then processing advances to FIG. 5A, which is a flow diagram representing a series of talent-initiated process for gathering governmentally regulated information about a talent. First, the career site determines whether the employer has requested that talent applying for the particular job provide information pertaining to their race and gender (i.e., Federal Employment Records Information, "FERI") (stage 501). If the employer requested FERI (stage 501), then processing moves to FIG. 6A.

Figure 6A:
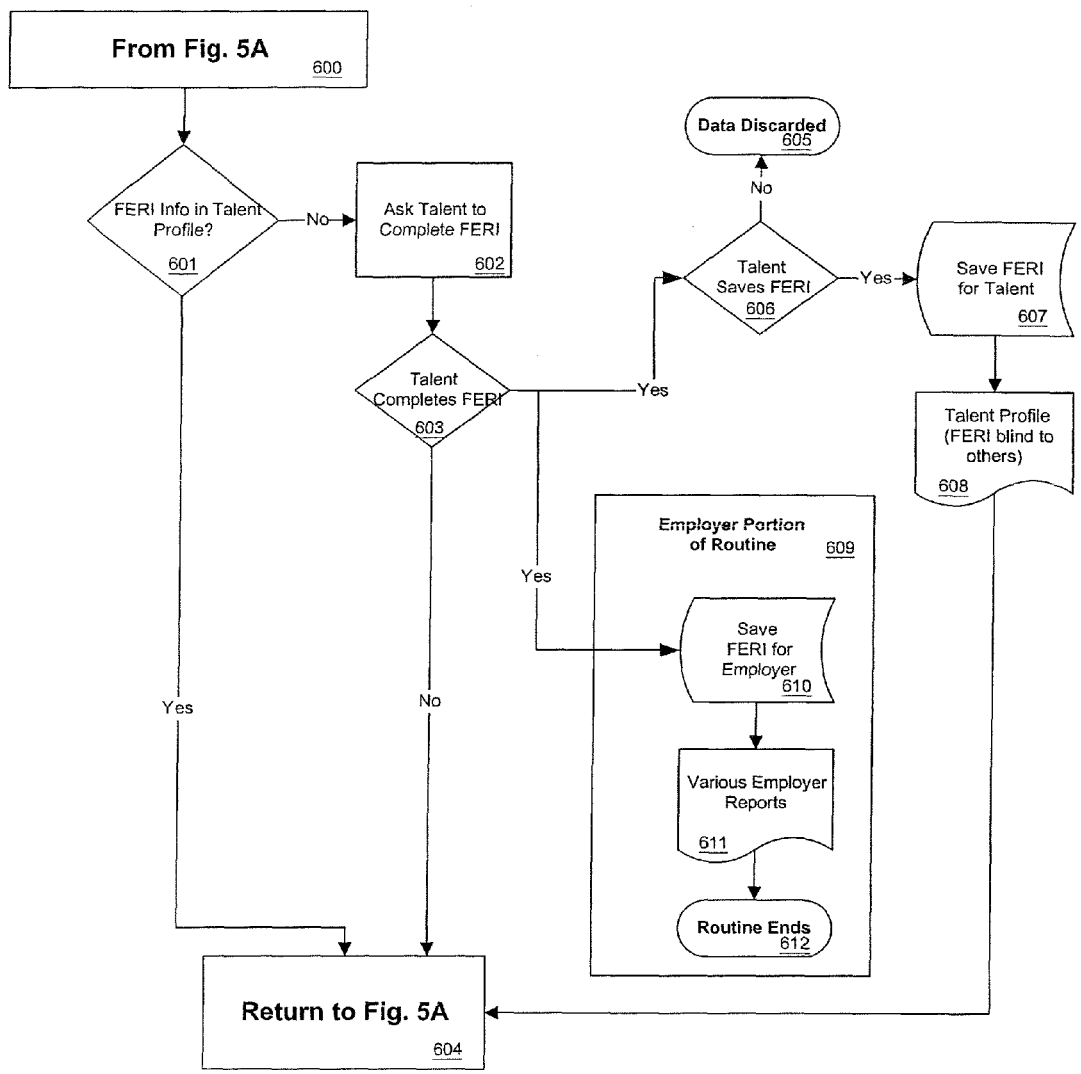
FIG. 6A is a flow diagram representing a talent-initiated process for collecting information pertaining to protected classes of employees, the process being performed in connection with talent interacting with a career site consistent with the present invention.

FIG. 6A is a flow diagram for obtaining FERI from talent on a voluntary basis. If the talent profile does not already include FERI (stage 601), then the talent is requested to voluntarily supply such information (stage 602). If the talent supplies FERI (stage 603), the employer may not use the information to discriminate in the employment process in any way, and the information is stored for the later use of the employer (stages 609, 610, 611, and 612).

In order to avoid FERI routine in processing future employment inquiries, the talent may elect to save his or her FERI in his or her talent profile (stages 606 and 607), in which case the FERI generally will not be visible to anyone except the particular talent (stage 608). If the talent elects not to save FERI data it will be discarded (stage 605). However, employers may use FERI in order to favor certain protected classes of talent. Regardless of whether the talent has supplied his or her FERI, the employment inquiry is processed to the next stage (stage 604, returning to stage 502).

Returning now, to FIG. 5A, if the employer has not requested that talent provide FERI, the employment inquiry is processed to the next stage (stage 503). Here, the career site determines whether the employer has indicated that the job listing selected by the talent is requires work authorization (stage 503), such as for certain positions and contracts with the U.S. government and its political subdivisions. If the job selected by the talent requires work authorization, then processing moves to FIG. 7A.

Figure 7A:
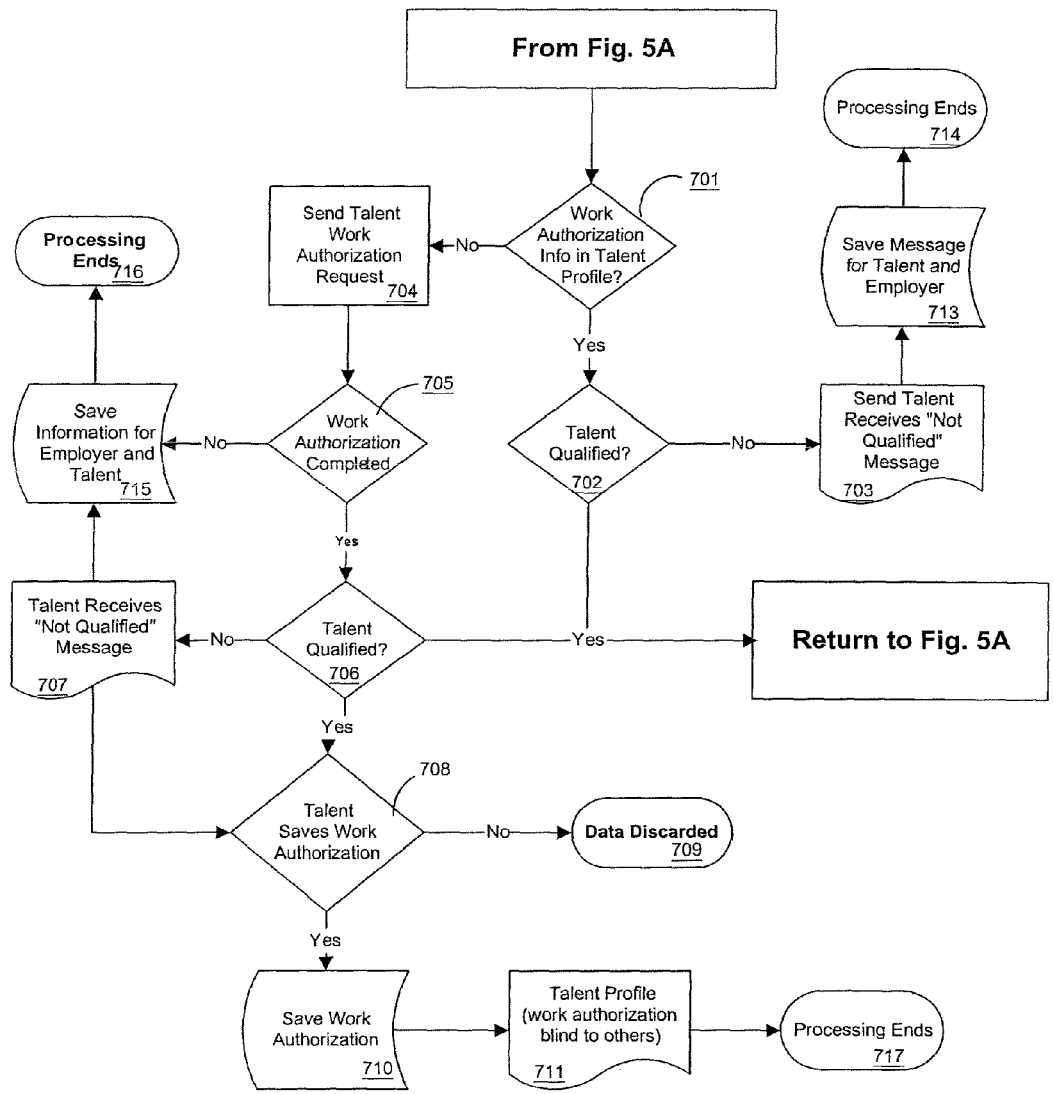
FIG. 7A is a flow diagram representing a talent-initiated process for determining the eligibility of talent to be employed in certain jobs requiring U.S. citizenship, the process being performed in connection with talent interacting with a career site consistent with the present invention.

FIG. 7A is a flow diagram illustrating exemplary procedures for obtaining work authorization representations. If the talent profile includes the required work authorization information (stage 701), and if the talent is qualified (stage 702), then the employment inquiry is processed to the next stage (returning to 504 of FIG. 5A). If the talent profile includes the required work authorization information (stage 701), and if the talent is not qualified (stage 702), then the employment inquiry is not processed any further, the talent receives a message that he or she is "not qualified" for the selected job listing (stage 703) and the processing of the employment inquiry ends (stages 713 and 714).

If the talent profile does not include the required work authorization information (stage 701), then the talent is asked to supply that information (stage 704). If the talent does not supply the required information (stage 705), then processing of the employment inquiry ends (stages 715 and 716). If the talent supplies the required information (stage 705), and if the talent is qualified (stage 706), then the employment inquiry is processed to the next stage (returning to stage 504 of FIG. 5A). If the talent supplies the required information (stage 705), and if the talent is not qualified (stage 706), then the talent receives a "not qualified" message (stage 707), and processing of the employment inquiry ends (stages 715 and 716).

Regardless of whether the talent is qualified or not qualified, the talent may save his or her work authorization information in his or her talent profile in order to avoid this routine in processing future employment inquiries for job listings that require work authorization information (stage 708), in which case the information becomes a part of the talent profile, but is not visible to anyone other than the particular talent (stages 710 and 711). Next processing ends (stage 717). If the talent does not elect to save his or her work authorization information, then any completed work authorization information is discarded and processing ends (stage 709).

Because it may reasonably be anticipated that job listings may be subject to other governmentally imposed restrictions or record keeping, FIG. 5A contemplates other routines for processing such requirements (stages 505 and 506).

The next stage (stage 507) is to check the employer's account to determine if its billing information is current. If the employer's billing information is not operative, then the employer receives a message to that effect (stage 512), and the employer's account becomes "inactive" (stage 513) because it no longer meets the minimum standards for an employer account.

In one embodiment, the employer is contacted by email on the occurrence of inactivation of its account. In another embodiment, the employer is notified of the inactivation when it logs in to the career site. If the employer updates its billing information (stage 514), then processing may resume (return to stage 507). If, after a predetermined period of time, the employer has not updated its billing information, it is assumed that the employer has declined the talent's inquiry. Whereupon, the talent receives a message stating that the employer declined but gave no reason for its decline (stage 515), and the session ends (stage 516).

Returning to stage 507, if the employer's billing information is current, then the talent's employment inquiry is submitted to the employer (stage 508). By submitting an employment inquiry, the talent granted permission to the career site to provide his or her contact information to an interested employer. The talent's employment inquiry consists of talent's "blind" talent profile (stage 509) and a brief survey (510) for use in the event that the employer declines the talent's employment inquiry. At this stage, the talent profile omits the talent's personally identifying information and the name and location of the talent's current employer (collectively, "contact information"), and is referred to as a "blind talent profile." Processing continues at FIG. 12 (stage 511).

In one embodiment, an employer may determine approximate current geographical information about a talent, based on the metro area identified in connection with talent's current residence. Further, an employer may obtain information about a talent based on the industry classification of the talent's current or most recent position. It is possible that some persons, including employers, may attempt to circumvent the career site's procedures. However, several reasons exist to dissuade employers and unauthenticated users from attempting to circumvent the procedures:

1. It is difficult to obtain contact information for a talent without using the career site's procedures to obtain the talent's consent to release contact information. The difficulty arises from the fact that the talent's (a) name; (b) street address; (c) phone number; (d) e-mail address; and (f) current employer's name and address are not publicly displayed when talent profiles are searched. Therefore, an employer's ability to contact a talent based on information in the talent profile is no better than if one were to surmise the existence of a talent employed by any identifiable employer.

2. With respect to searches conducted by unauthenticated users, neither talent's current or past employer's names are publicly displayed when talent profiles are searched.

3. The career site procedures are more efficient and cost effective compared to all other forms of recruiting. Only the isolated word-of-mouth referral of a qualified candidate could be considered to be more efficient. Therefore, there are economic reasons for employers to adhere to the career site's procedures.

4. By virtue of the fact that talent have posted their talent profiles with the career site, they are stating a preferred means of contact that employers with legitimate recruiting interest can be expected to honor.

5. Before conducting any searches, unauthenticated users must agree to the career site's terms and conditions of use.

6. Upon registering, employers agree not to circumvent or attempt to circumvent the career site's procedures when they establish their employer account with the career site.

7. Employers obtain important information in support of their recruiting and hiring practices by using the career site. The opportunity to collect such information could be irrevocably lost if an employer were to circumvent the career site's procedures.

Figure 12:
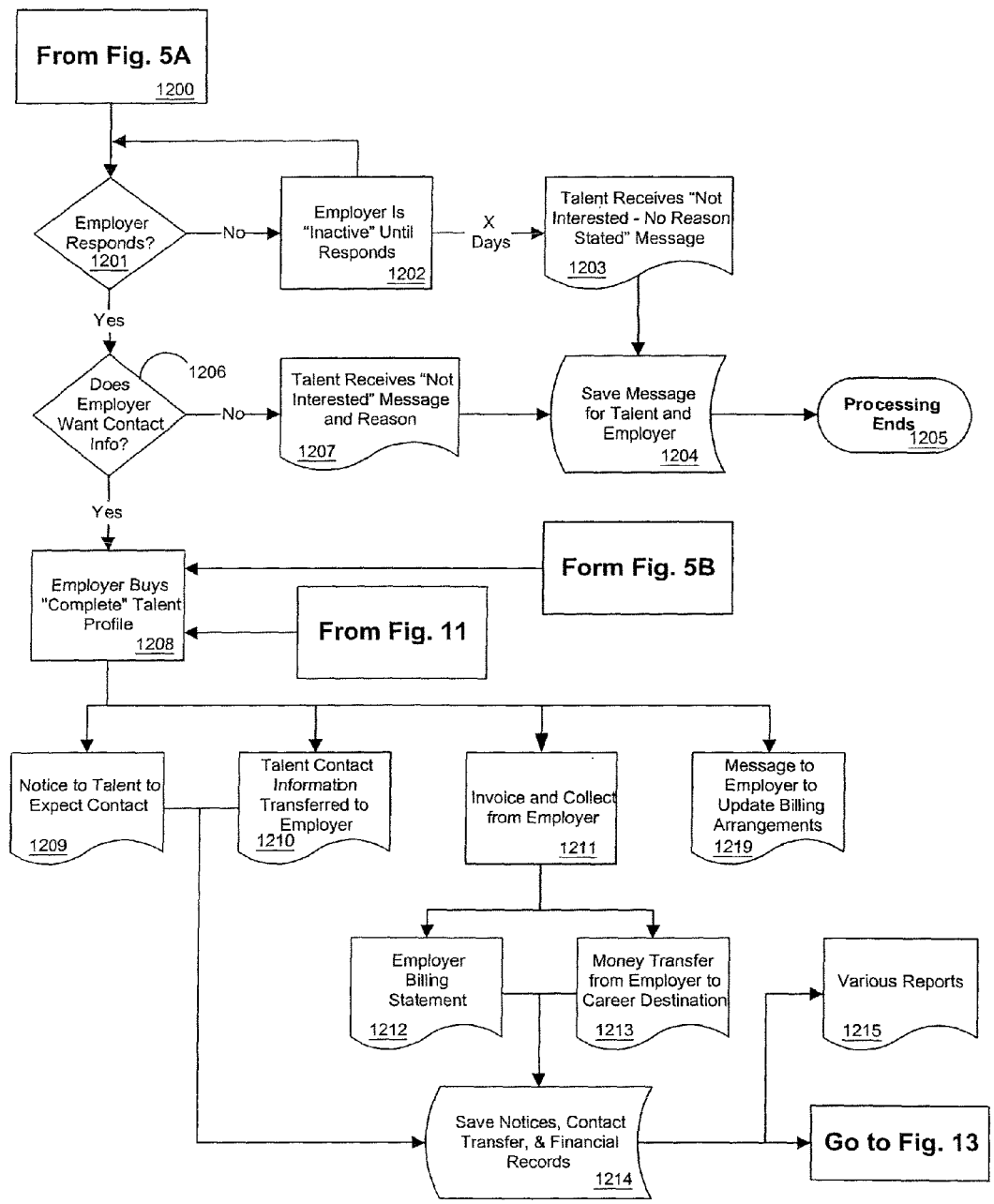
FIG. 12 is a flow diagram representing the purchase of talent contact information by an employer in a manner consistent with the present invention.

FIG. 12 is described in connection with the above description of FIG. 5A as indicated in stage 1200. If a talent's employment inquiry is successfully processed by the career site, and a blind talent profile and survey are forwarded to an employer by the career site, the employer must respond to the inquiry (stage 1201) the next time that the employer signs-in to the site. In one embodiment, if the employer does not respond to all messages from the career site that require response, then the employer's account is made "inactive" (stage 1202), meaning that the employer may not conduct transactions (such as submitting employment inquiries to talent, conducting full searches, editing account information and job listings, or purchasing talent contact information) on the site. In one embodiment, the employer is notified, for example, by E-mail upon the inactivation of the employer's account. In another embodiment, the employer discovers inactivation at the time it next logs in to the career site.

In one embodiment, after all messages have been answered, the employer's account is returned to "active" status. If the employer has not responded within a predetermined number of days, then the talent is sent a message to the effect that the employer is not interested in the talent, but gave no reason (stage 1203). This information is saved for the talent and the employer (stage 1204), and processing ends (stage 1205).

In one embodiment, if an employer repeatedly fails to respond to requests for interviews, then the employer's account is suspended or inactivated. In one embodiment, the account suspension or inactivation will expire after a predetermined period of time. In another embodiment, the account suspension or inactivation will not be removed until the employer takes some action, such as, for example contacting the career site operator.

If the employer responds (stage 1201), the employer indicates if it wants to contact the talent and answers the survey (stage 1206). If the answer is "no," the talent receives a message that the employer was not interested in talent, and the talent is provided with the reason given by the employer for employer's decision (stage 1207). This information is saved for the talent and the employer (stage 1204), and the processing ends (stage 1205).

If the employer is interested in interviewing the talent, then the processing enters the next phase, which commences at stage 1208. This next phase is discussed in the section entitled "Completing the Transaction."

VI. Employer-Initiated Processes

Figure 8:
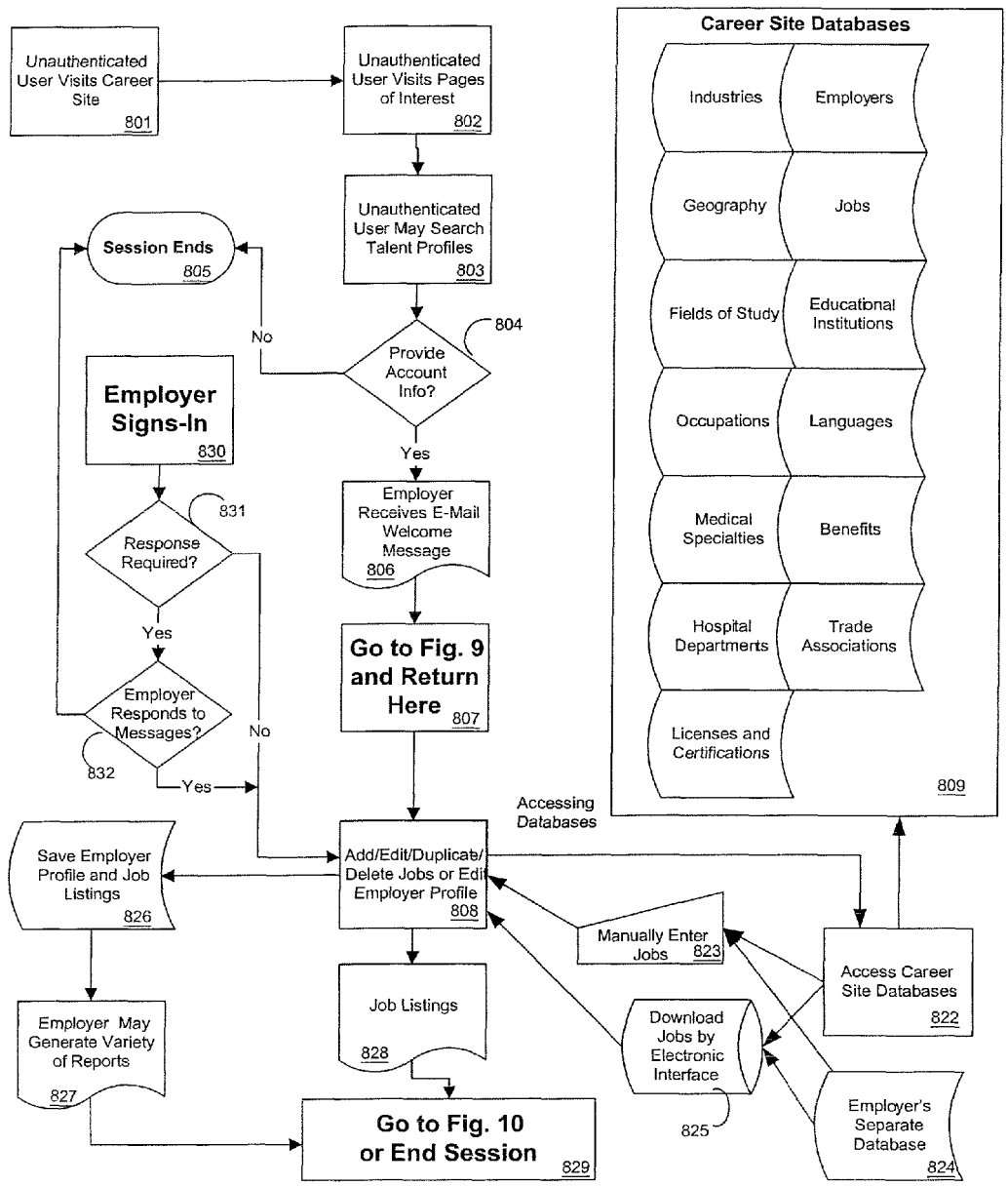
FIG. 8 is a flow diagram representing a process performed in connection with an unauthenticated user interacting with a career site consistent with the present invention, and an employer interacting with a career site consistent with the present invention.

FIG. 8 is a flow diagram representing a process performed in connection with an unauthenticated user and an employer (i.e., a user that has registered as an employer) interacting with a career site consistent with the present invention. First, an unauthenticated user visits the career site (stage 801). In one embodiment, the career site provides unauthenticated users with access to a web page. A user or employer could alternatively access an application in forms other than a web page, such as, for example by voice recognition. Next, the unauthenticated user visits pages of interest in the application (stage 802). The pages or content of interest may include searching talent profiles (stage 803), searching job listings, articles, advertisements, or other content in the career site. While accessing the site, a first-time user has an ongoing opportunity to register with the site as an employer (stage 804). Users must register as either "employer" or "talent." Refer to FIG. 3 at stage 304 for registration as talent. If a user decides not to register and has no more pages or content of interest, then the session ends.

Authentication is the process of identifying an individual, usually based on a username and password or credentials, however, in an alternative embodiment, other methods of authentication are employed without departing from the scope of the present invention, including digital certificates, token cards, and biometrics. An authenticated user is a user that has provided adequate credentials to an authentication system, based on a predetermined standard for adequacy of credentials.

In one embodiment, an unauthenticated user of a career site application may access only a subset of the available features of the career site application. Areas to which access is allowed to unauthenticated users in this embodiment include: (i) a home page associated with the career site; (ii) a talent section that provides information to talent about registering with the system and about how to use the system; (iii) an employer section that provides information to employers about registering with the system and how to use the system; (iv) "quick search" of the job description, talent profile, and employer databases; (v) a "storefront" section where the user may learn more about specific employers that are using the career site for recruiting purposes; (vi) an industry news section where users may access news articles pertaining to one or more industries or employers that the talent has identified, and/or in which talent has expressed interest as evidenced by talent's most recent job search and/or employment application; (vii) a section that describes commercially available reports prepared by the career site operator; (viii) an "affiliate" section that describes the career site's affiliate marketing programs; (ix) an "about us" section that provides information about the career site operator, including information such as, for example, contact information for the site operator; (x) a privacy statement regarding information that is collected; and (xi) terms of use of the career site.

In one embodiment, "quick search" is a function designed to search the career site's databases in a manner that is less specific than the "full search" function, which is capable of searching all data fields in the career site's databases, and which is restricted to authenticated users of the career site.

An unauthenticated user may not perform the functions of (i) "full search" function; (ii) create or modify an employer account; (iii) create or modify a talent profile; (iv) create or modify a job listing; (v) apply for a job; (vi) convey an employment inquiry to an employer; or (vii) create or modify storefronts.

In one embodiment, registering with the career site involves choosing to register as either "employer" or as "talent." This section of the patent application generally pertains only to users who have registered as "employer."

Registering as an employer involves providing several discrete pieces of information. In this embodiment, required information includes, for example, first name, last name, business address, e-mail address, telephone number, a unique user-ID and password, birth date to be used for identification purposes if the employer ever forgets the user-ID or password, and the answer to one question chosen by the employer from among several questions presented that is used for identification purposes if the employer ever forgets the user-ID or password. The discrete pieces of information required for registration may be expanded or contracted without departing from the scope of the present invention.

If the user elects to register with the site as an employer, the employer will receive a welcome message via e-mail (stage 806). The employer then also has full site access (stage 807, et seq.). Next the employer has an opportunity to complete an employer profile (stage 807, 808, and FIG. 9).

In one embodiment, an employer is encouraged to complete the employer profile, because it will increase the likelihood that talent will be motivated to contact the employer with an employment inquiry. In one embodiment, an employer is encouraged to complete the employer profile, because the employer may not submit requests for contact information to talent in the talent database unless the employer's profile includes the minimum required information.

Figure 9:
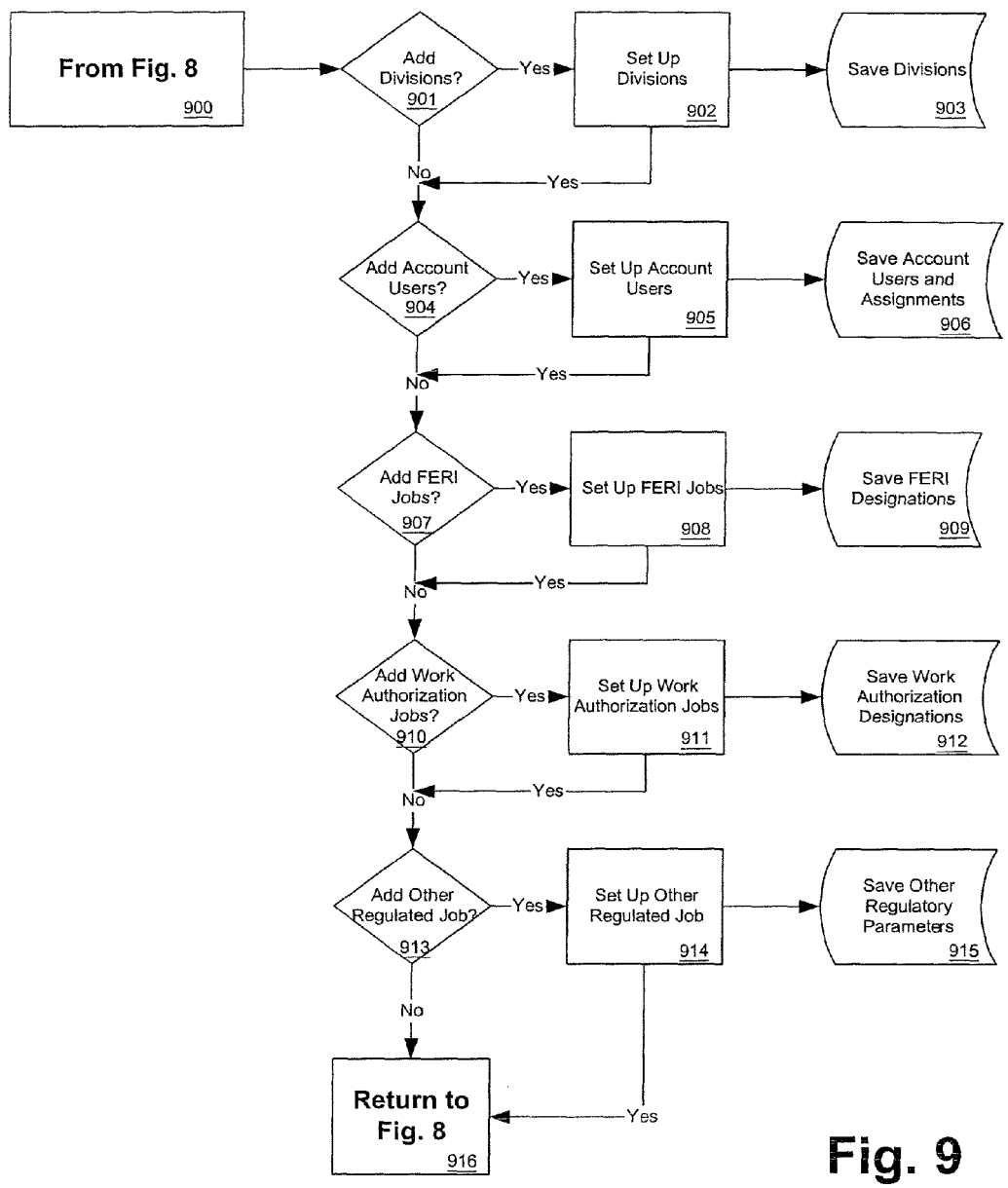
FIG. 9 is a flow diagram representing a series of processes performed in connection with an employer interacting with a career site consistent with the present invention.

In one embodiment, the minimum requirements for establishing an employer profile include (a) providing all required employer account information, such as, for example, the employer's account manager contact information, (b) billing information, and at least one job listing. FIG. 9, which is a flow diagram of the employer account set up process, illustrates how an employer may customize its employer profile by establishing, within the profile, (a) separate divisions (stages 901 to 903), (b) separate account users (stages 904 to 906), (c) jobs that require the collection of federal employment records information ("FERI") pertaining to race and gender (stages 907 to 909), (d) jobs that require the collection of work authorization information pertaining to certain government jobs and government contract jobs in the U.S. (stages 910 to 912), and (d) jobs that are subject to other forms of regulation (stages 913 to 915).

Returning to FIG. 8, in one embodiment, an employer interacting with the present invention may elect either to manually enter job information (stage 823), or to electronically download job data using an electronic interface (stage 825). In each case, an employer will access some or all of the career site's databases 809 (stage 822), and the employer's separate database(s) (stage 824). The employer's profile and job listings are stored in the career site's databases of employers and job listings (stage 826). The public portion of an employer's job listings is available for searches conducted by talent, employers, and unauthorized users. Confidential information is not available to anyone other than the particular employer. An employer may then generate a variety of reports (stage 827).

In one embodiment, an employer may list as many or all of its employment positions at no cost, because, unlike newspaper classified employment ads and existing on-line systems, there are no up-front fees for creating an employer account or listing a job. Fees are only charged and collected if the talent and the employer mutually agree to the release of the talent's contact information, or if the employer purchases other optional services or products from the career site.

Consistent with the present invention, employer profiles are received and stored in the employers database for any employer that wishes to store an employer profile in the system. Employer profiles are made available to the public for searching and browsing without any contact information, except that employer names may or may not be displayed to the public at the option of the career site operator.

Even employers that are not currently seeking talent may develop and maintain employer profiles including an extensive list of jobs. Unless an employer elects otherwise, all of the employer's jobs are continuously available for consideration by prospective employees, thereby enhancing the employer's ability to optimize the skills represented by his or her personnel. Thus, the present invention contemplates continuous recruiting by an employer for all of its jobs. It is anticipated that the typical employer will elect to display all of its jobs continuously. In the event that an employer does not want to continuously display one or more of its jobs, the employer may elect to make one or more jobs "invisible" to others until employer reverses that election.

In completing an employment profile, an employer is guided through a detailed, multi-step process during which the employer provides information, such as: (i) personal contact information; (ii) billing information; (iii) divisions; (iv) account users; (v) industry classification(s); (vi) job listings; (vii) qualifications and skills required for each job; (viii) occupational classifications; (ix) trade affiliations; (x) whether FERI is requested, such as, for example, for affirmative action programs; (xi) whether citizenship information is required for use in programs, such as government contracting programs; (xii) the location of jobs; and other relevant information. If an employer chooses not to complete an employer profile, he or she will not have full access to the site until the minimum requirements for an employer profile are satisfied. The minimum requirements for an employer profile include (i) the primary account information providing detailed information about the employer, including contact information for the account manager, (ii) the billing information, and (iii) at least one job listing.

If the employer elects to complete an employer profile, the results are stored for searching, analytical, and reporting purposes (stage 826). Based on the stored information, a fully disclosed employer profile including all job listings is available for inspection by the employer and its authorized users, and job listings without contact information are available for public inspection (stage 828).

After an employer has completed the minimum requirements for an employer profile, an employer may access any authenticated user area of the career site via direct sign-in (stage 830), including maintaining aspects of the employer profile pursuant to FIG. 8 and FIG. 9, and conducting full searches of the talent and employers databases. In one embodiment, employers may be restricted from searching the employers database. At stage 831 it is determined whether an employer response is required. If not the process continues to stage 808. If a response is required (stage 832), the session ends (stage 805) if no response is provided and continues at stage 808 if an appropriate response is presented at stage 832.

In one embodiment, once an employer registers and authenticates with the site, the employer may access a career site message repository that resembles an electronic mailbox.

The message repository contains information about the talent profiles for which employer has submitted requests for the release of contact information, including linked talent profile, the dates of employer inquiry and talent response, whether the talent has accepted or declined to release contact information, and the reason talent declined, if applicable and available. The message repository also contains information about talents' employment inquiry submissions to the employer, including linked talent profile, dates of talent inquiry and employer response, whether the employer has accepted or declined the inquiry, and the reason that the employer declined the talent's inquiry, if applicable.

Employers that are already registered may enter the career site by direct sign-in using the employer's previously selected user-ID and password. Next, employer is presented with all talent-initiated and certain employer-initiated inquiries (e.g., for example, the results of automatic searches) that have occurred since employer's last visit to the site or another time period determined by the career site operator. In one embodiment, before conducting any transactions on the career site (stage 1001), such as, for example, maintaining employer account, billing, division, user, FERI, work authorization information, other regulated job information, job listings, or searches, an employer is presented with a display of messages from the career site (stage 1022), some of which may require a response from the employer, such as, for example, if talent have made inquiries regarding the employer's job listing(s) and the employer must accept or decline the inquiry, or if the employer has not responded to the follow-up survey that is described in connection with FIG. 14. After responding, an employer may proceed to maintain its account and conduct searches as it wishes (stages 808 and 822).

Figure 10:
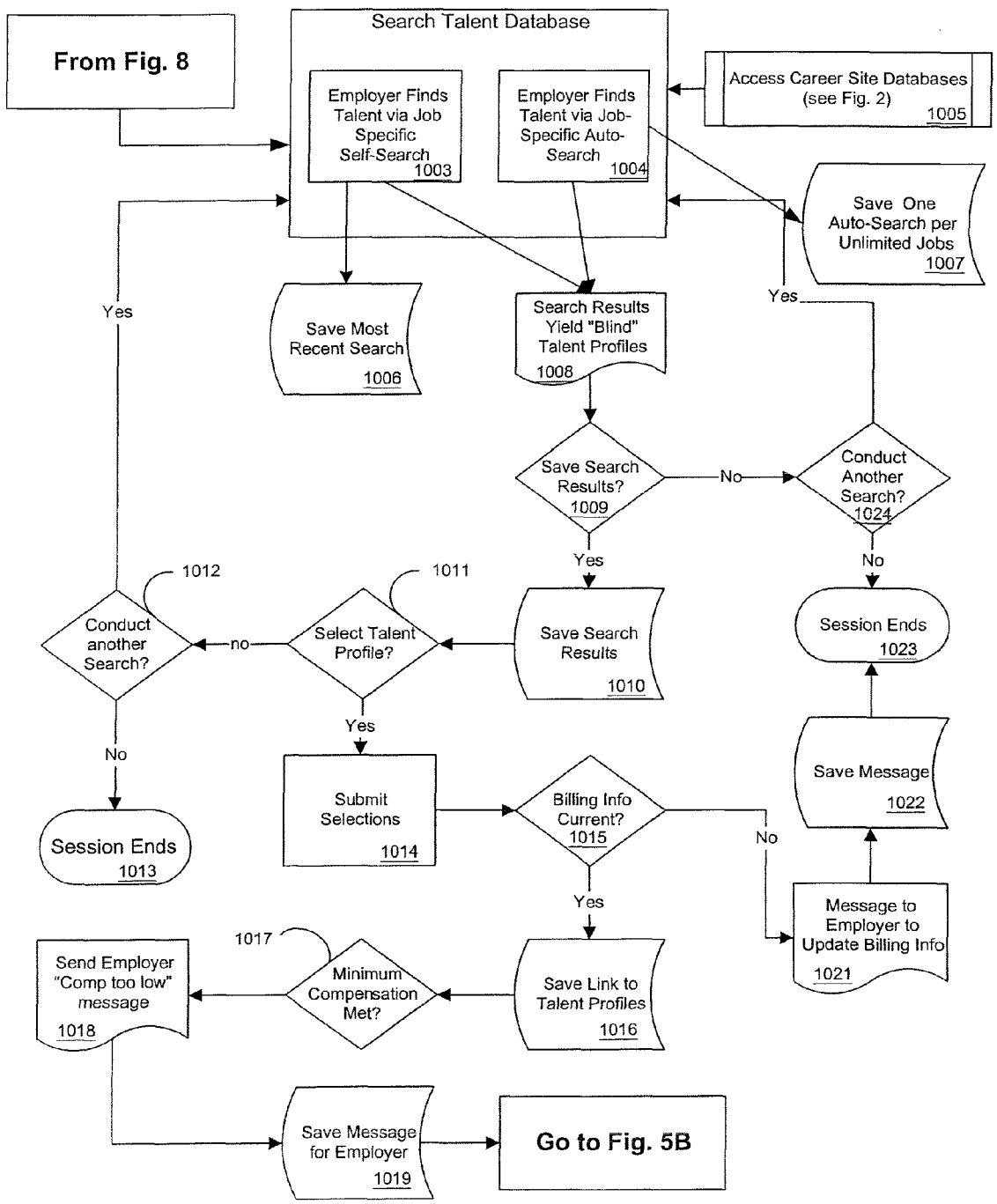
FIG. 10 is a flow diagram representing an employer-initiated process whereby an employer searches for and selects talent profiles for the purpose of establishing talent interest in the employer's employment opportunity using a career site in operated in a manner consistent with the present invention.

FIG. 10 is a flow diagram representing a process for conducting searches of talent profiles consistent with the present invention. To conduct a search, an employer identifies a talent profile by way of self-search (stage 1003) or may specify an automatic search (stage 1004). In performing a self-search, an employer uses a search form to perform individual, custom searches of the talent database. Automatic searches are conducted on a recurring basis, such as daily, by the career site operator based on the search parameters that the employer has specified for each of its job listings. To conduct a search, whether self-search or automatic search, employers must specify a geographic point of reference and at least one of several non-geographic search parameters, such as industry, occupation, license, language, etc.

In one embodiment, an employer may initiate a search by specifying the search either as (a) a domestic search as described earlier in this patent application, and by selecting a geographic point of reference such as a country, state, county, city, or zip code and at least one non-geographic search parameter; or (b) as a foreign search as described earlier in this patent application, and by selecting a country and at least one non-geographic search parameter. With respect to the geographic selection, an employer may indicate its selection from a drop-down list of choices corresponding to the level of geographic area of interest to employer. For example, if an employer is interested in searching for talent of a certain type within a country, then the employer will select a country from a predetermined list of countries and all talent profiles in that country that match the employer's other search parameters will be reported in order of a score (discussed below) calculated by the career site operator.

For domestic searches, an employer may optionally provide cumulatively more restrictive geographic search parameters by choosing from progressively smaller geographic subdivisions, such as: (i) state, province, or region within a particular country; (ii) county or parish within a particular state, province or region; and (iii) city, town, or village within a particular county or parish. In one embodiment, a pre-existing geographical database facilitates the collection of structured data by providing employers with an enumerated list of possible selections for each step. Specifically, if an employer wishes to specify a city, it selects a country from the list of possible countries, then selects a state, province, or region from a list of the same from within the selected country, and, finally, selects a city from a list of cities and towns within the selected state, province, or region. Some countries may not have state, provinces, regions, counties, or parishes, or the same may be unknown to the career site operator, in which event, the employer may select directly from the available list of cities, towns, or villages within the particular country. In one embodiment, employers may by-pass certain geographical subdivisions, such as counties or parishes within the states of the U.S. or within the states, provinces, or regions of other countries, and directly select a city, town, or village within a particular state, province, or region.

In one embodiment of domestic searches, if an employer elects to search for talent profiles by postal code, the employer selects a country from a list of countries. Next, the employer provides a postal code corresponding to the selected country, and the employer need identify no other geographic subdivision of the selected country, but must identify at least one non-geographic search parameter.

In one embodiment, a predetermined number of talent profiles will be reported to an employer based on the geographic area the employer selected, and the employer's other search parameter(s). At least one non-geographic search parameter is required.

In one embodiment, multiple non-geographic search parameters may be specified. In one embodiment, the group of search steps includes, accessing the career site databases (stage 1005), via different types of searches for example: (i) industry search; (ii) occupation search, including hospital department, if applicable; (iii) education search, including educational institution and multiple levels of education consisting of (a) the specific level of education, such as, for example, bachelor, master, or doctorate, (b) field of study, and (c) specialty, such as, for example, in the case of licensed health care professionals and others; (iv) licenses and certifications keyword search; (v) languages search, including searches of talents' level of fluency in reading, writing, and conversing; (vi) analytical skills search; (vii) communications skills search; (viii) mechanical skills search; (ix) prior employer search; and (x) other keyword search. In this embodiment, each additional search step may be specified as cumulative (i.e., A and B) or alternative (i.e., A or B). For example, an employer may formulate a search as follows: all talent profiles in a particular city displaying a predetermined level of education and a predetermined license. An employer may also formulate a search in the alternative: i.e. all talent profiles in a particular postal code requiring either a predetermined level of education or a predetermined certification.

In this embodiment, an optional industry search makes use of an underlying industry database to facilitate collection of structured data. In one embodiment, the industry database contains five tiers of industry specificity. An employer may specify only the first tier of industry specificity, resulting in a broad search. Alternatively, employer may specify an industry at a more detailed level, resulting in a more focused search. In this embodiment, an employer may also specify a number of years of experience in the specified industry. By specifying a number of years of experience, an employer may filter out those talent profiles with less industry experience than the employer specified.

If an employer elects to provide occupation search parameters, the employer is requested to provide an occupational division based on the DOT. To facilitate a more detailed search, an employer may also optionally provide occupational group, or occupational title. In one embodiment, employer may additionally provide a department, for example, in the case of searching hospital job descriptions. An employer may also search by specialty, for example, in the case of licensed health care professionals.

In connection with occupation search parameters, an employer may also specify a number of years of experience in the specified occupational division, group, or title. The number of years of experience may be used to filter out those talent profiles that display less occupational experience than employer specified.

In one embodiment, an employer may elect to search occupational categories, divisions, groups, or titles that are different from the occupational category, division, group, or title for which the employer is seeking talent, but that involve similar skill sets. Therefore, an employer's search for skills is not limited to talent with experience in a particular occupation. Instead, the employer may search any other occupation that it believes may suit its needs.

If an employer elects to provide education search parameters, it provides an educational level, i.e. general equivalency diploma (GED), high school, vocational school, college—associate, college—bachelor, college—master, or college—doctorate. An employer may further specify a field of study, i.e. "mathematics." An employer may also further specify a specialty, e.g. a medical specialty of "Plastic Surgery."

An employer may also elect to search for talent profiles using the component skills described by the DOT as constituting analytical skills, communications skills, and mechanical skills. In this embodiment, an employer may specify any number and combination of such skills to search for talent who have described their skills of the type specified by the employer. Therefore, an employer's search for skills is not limited to talent with experience in a particular occupation. Instead, the employer may base its search on a specified set of skills, thereby searching all other occupations for the specified skill set.

An employer may also elect to search for talent profiles evidencing specific language skills. In this embodiment, the employer (i) specifies one or more languages from the career site's languages database; (ii) chooses any number or combination of language-related skills (e.g., "writing," "reading," and "conversing") and (iii) specifies a fluency level (e.g., "fluent," "moderate," or "none"). In this embodiment, the employer may specify one or more languages, and search on either a cumulative basis (such as English and Chinese) or an alternative basis (such as Italian or French). In this embodiment, using "and" will result in a more limited search result, while using "or" will result in a broader search result.

An employer may also elect to provide a search step that searches talent profiles using a prior employer name. In this embodiment, talents' current employers' names are not searched. Additional keyword search steps include searching by at least one license or certification keyword, i.e. "professional engineer" or "certified nurse anesthetist." Other keyword search steps may be provided, corresponding to which the text of any searchable parameter of a talent profile will be matched for the purpose of the search.

In one embodiment, search results are provided in a structured format in which "blind" talent profiles (that is to say, without any talent contact information) are provided only if they satisfy all of the criteria as set forth in connection with employer-provided job search parameters. In one embodiment, for search reporting purposes, talent profiles are scored according to a best fit with the employer-specified parameters. In this embodiment, a low score is best. A talent profile receives a score of "1" if talent's current employment position is in the industry specified in the search. A talent profile receives a score of "2" if talent's first prior employment position corresponds to the specified industry and a score of "3" if talent's second prior employment position corresponds to the specified industry, and so on. In one embodiment, if none of talent's employment corresponds to the specified industry, the talent profile will not be reported to the employer. Similar scores may be assigned in relation to employer departments, such as in the case of hospital departments.

In one embodiment, additional scores are associated with a best fit between a talent's employment and an occupation specified in connection with the search. A score of "1" is assigned in the case that talent's current employment position is in the selected occupation. A score of "2" is assigned if the first prior employment position corresponds to the specified occupation, and so on. As disclosed in connection with fit between employment and industry, a lack of employment experience in the specified occupation will result in exclusion of the talent profile.

In one embodiment, an additional score is associated with whether the specified educational level is "achieved," i.e. talent has already graduated, or "expected," i.e. talent is expected to graduate in the near future. In this embodiment, a score of "1" is assigned to a talent profile in which the educational level is denoted "achieved" and a score of "2" is assigned to a talent profile in which educational level is denoted "expected." Similar scores may be provided in connection with academic major and medical specialty.

In one embodiment, if the employer specified a language search, a score of "1" is given if the reported talent profile reports "fluent" writing skills for the language specified by the employer, a score of "2" is given if "moderate" writing skills are reported, and a score of "3" the talent profile reports no writing skills in the specified language. The same scoring is applied to reading and conversing skills in the specified language.

In one embodiment of the language search feature, if an employer specifies cumulative language requirements, a talent profile will not be reported unless if evidences skills for each specified language. In another embodiment, if an employer specifies an alternative language requirement, a talent profile will be reported if it reports any one of the specified languages.

In order to calculate a final score for ranking talent profiles, component scores are added, and the talent profiles are ranked in ascending order. In this embodiment, talents' profile scores are not disclosed in the ranking of talent profiles. In this embodiment, talent profiles having the same score are ordered alphabetically by talent name. In this embodiment, talents' names are not disclosed. Other methods may be employed to order the presentation of talent profiles without departing from the scope of the present invention.

In one embodiment, if a search yields more than a predetermined number of talent profiles, such as for example 25, then no talent profiles are reported to the employer, and the employer is requested to provide a narrower search. In one embodiment, only a predetermined number of blind talent profiles are reported to the employer, and the employer is warned that the reported set of talent profiles exceeds the predetermined number, and is advised to narrow the search. The number of talent profiles reported to an employer by the career site operator may range from one talent profile to all matching talent profiles without departing from the scope of the present invention.

In one embodiment, search results are provided in a structured format, in which talent profiles are provided only if they satisfy all of the criteria as set forth in connection with employer-provided talent profile search parameters.

In one embodiment, for search reporting purposes, talent profiles are separated into two groups: (i) talent profiles that match the search criteria, and that are within the specified point of geographic reference, such as a city or postal code; and (ii) talent profiles that match the search criteria, and are outside of the specified point of geographic reference, but are within the MSA/PMSA and CMSA that encompasses the selected point of geographic reference. In connection with group (ii), a distance is optionally provided between the location of each talent and the employer-specified location in the search.

In one embodiment, an automatic search is performed based on employer specifications similar to that provided in connection with a self-search. In an automatic search, the career site performs an automatically recurring periodic search for each job listing against all talent profiles. In one embodiment, if an employer specifies an automatic search, the system will save one unique automatic search for each job listing (stage 1007). In this embodiment, search results are presented pursuant to each employer-specified search routine in the fashion previously described for self-searches. If, alternatively, the employer identified a talent profile via a self-search, in one embodiment the system may save only the most recent search (stage 1006). In alternative embodiments, a larger number of self-searches and automatic searches may be stored to facilitate repeating self-searches or to provide automatic search alternatives at later times.

An employer-initiated match is a match that occurs because of an initial action taken by employer. When an employer-initiated match occurs, it is because of one of several reasons including: (i) the employer has located a talent profile through self-search; and/or (ii) the employer has received notice of a match from the career site by way of an automatic search. As a result of a match, "blind" profiles are identified (stage 1008). An employer may save the search results (stage 1009 and stage 1010), or discard the results by conducting another search (stage 1024 and return to stage 1002) or end the session (stage 1023).

The employer may select one or more talent profiles from the search results to process as employment inquiries to talent (stage 1011), may conduct another search (stage 1012) or may end the session (stage 1013). If the employer wants to process its selection(s) as employment inquiries, it submits the selections to the career site operator (stage 1014). Upon the employer's submission of a employment inquiry to the career site, the employer has given its consent to the purchase of the talent's contact information assuming that the talent consents to the release of the information.

At this point, the career site operator checks the employer's account to determine that all billing information is current (stage 1015). If it is not, then the employer receives a message that its billing information must be updated (stage 1021), the message is saved (stage 1022) and the session ends (stage 1023) until the employer has updated its billing information. An employer's account becomes "inactive" if its billing information is determined to be not current, because current billing information is required in order to satisfy the minimum requirements for an employer account.

If the employer saved the search results (stage 1009), then the same may be accessed for submission to the career site operator after the employer has updated its billing information. If not, the search results are lost. If the employer's billing information is current (stage 1015), links to the selected talent profiles are saved (stage 1016), and processing continues.

The next step is to determine whether the maximum compensation that the employer is willing to pay is greater than the minimum compensation specified by the talent (stage 1017). In one embodiment, talent profiles that match the employer's skill requirements are reported to the employer for consideration, but will not be forwarded to the talent unless the employer adjusts its maximum pay scale to a level that exceeds the amount required by the talent. If an employer selects a talent profile that requires greater compensation that the employer has defined for its job listing, the employer receives a message that the compensation it is offering is less than the talent requires; therefore, a request to disclose contact information will not be forwarded to the selected talent (stage 1018).

If the employer chooses, it may redefine the maximum compensation defined in its job listing, and resubmit its employment inquiry. In one embodiment, the minimum compensation that the talent requires is not reported to employers for this purpose, although it is possible that an employer could ascertain the information through a process of trial and error. If the maximum compensation the employer has specified for its job listing exceeds the talent's minimum compensation requirement, then the process proceeds to FIG. 5B.

Figure 5B:
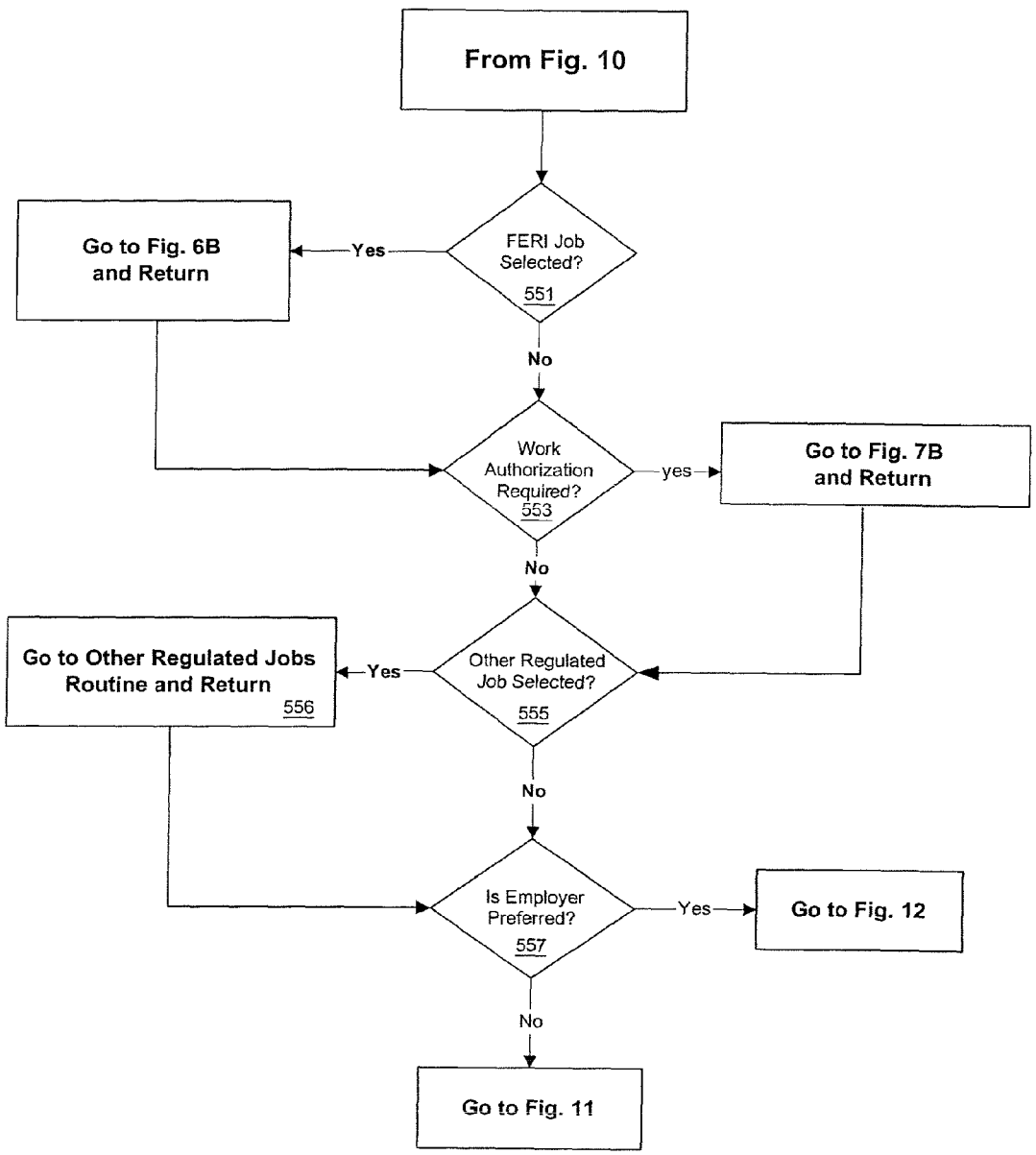
FIG. 5B is a flow diagram representing a series of employer-initiated processes for gathering governmentally regulated information about a talent in a manner consistent with the present invention.

FIG. 5B is a flow diagram representing a series of processes for requesting and obtaining (i) federal employment records information ("FERI"), i.e., race and gender information (stage 551), which is represented in greater detail at FIG. 6B, described below; (ii) work authorization information (U.S. citizenship for certain jobs lawfully requiring the same) (stage 553), which is represented in greater detail at FIG. 7B described below; and (iii) other regulatory parameters that may arise in the future (stage 555). If the job listing has no FERI (stage 551), work authorization (stage 553), or other regulatory (stage 555) requirements, then the job listing is sent to the selected talent for consideration (stage 557).

In one embodiment, a talent may specify any number of employers as "preferred," which means that the talent has given advance consent to release his or her confidential contact information to those employers. If the talent specified the particular employer as preferred, then processing proceeds to FIG. 12. FIG. 12 was previously discussed in connection with talent-initiated processes and is discussed from the perspective of employer-initiated processes below. If the talent did not specify the employer as preferred, then processing proceeds to FIG. 11.

If the job listing is not subject to FERI (stage 551), then processing advances to the work authorization stage (stage 553). If the job listing is subject to FERI, then processing transfers to FIG. 6B, which is a flow diagram for the process of requesting and obtaining FERI.

Figure 6B:
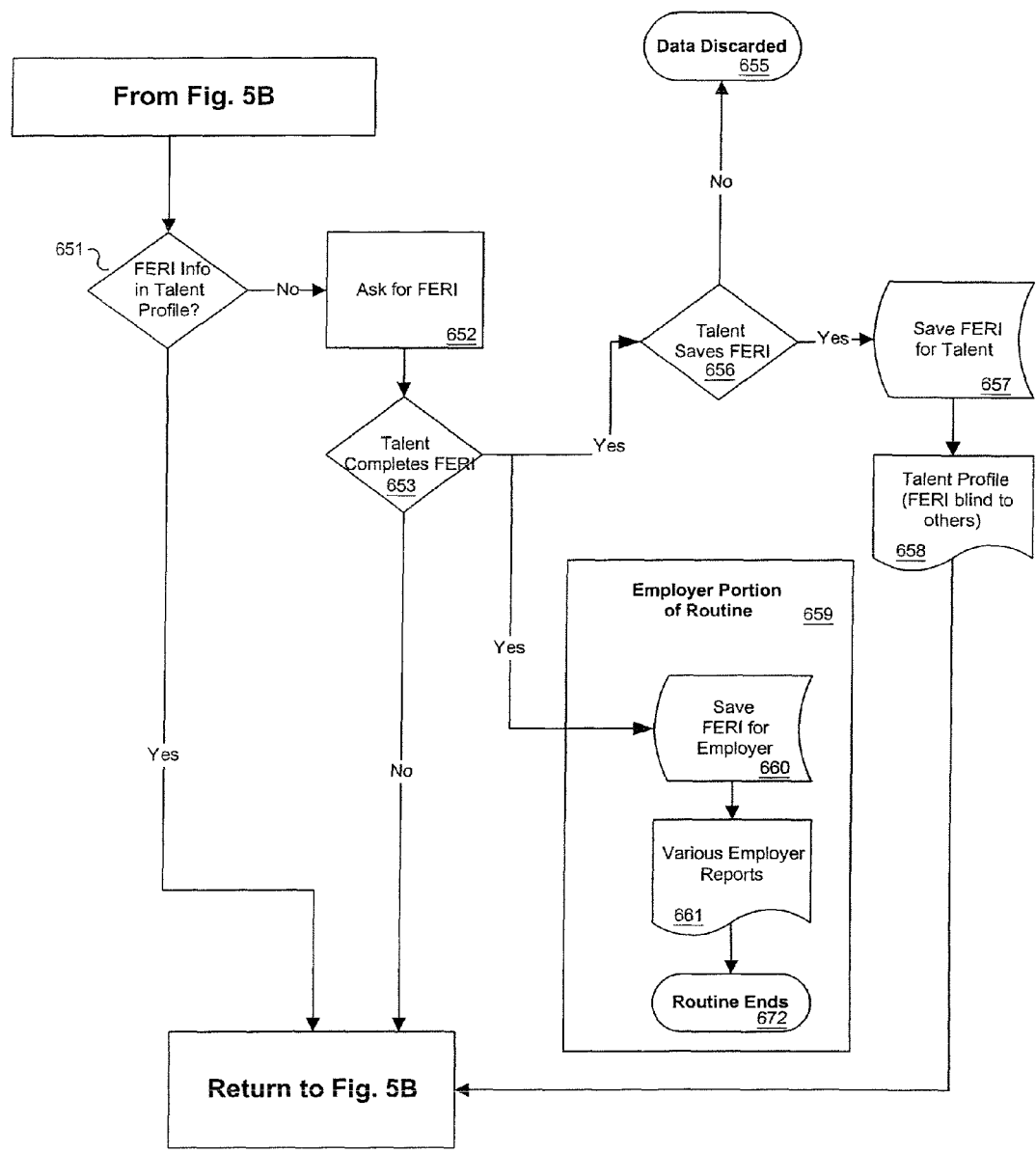
FIG. 6B is a flow diagram representing an employer-initiated process for collecting information pertaining to protected classes of employees, the process being performed in connection with talent interacting with a career site consistent with the present invention.

At FIG. 6B, first, the talent profile is checked to determine if the talent has already saved his or her FERI (stage 661). If the answer is "yes," then processing returns to FIG. 5B, whereupon processing advances to the work authorization stage (stage 553). If the answer is "no," then information about the employment opportunity is presented to the talent, who is asked to complete the optional FERI page of his or her talent profile (stage 652), and is presented with an electronic link to that page. If the talent does not complete the FERI page (stage 653), then processing again returns to FIG. 5B at stage 553, and the transaction may still go forward because the disclosure of FERI by talent is entirely optional. If the talent does complete the FERI page, then that information is saved for the benefit of the employer's employment reporting obligations (stage 659). In this section, FERI information is saved on behalf of an employer (stage 660). In connection with this information various reports are generated (stage 661). The reports include information about numbers of candidates in particular groups and may be used for statistical purposes and to show compliance with applicable governmental regulations. Next the routine ends (stage 672).

If the talent provides FERI, the talent is given an opportunity to save his or her FERI (stage 656 and 657), which allows the talent to avoid this processing routine in the future. If the talent saves his or her FERI, then that information is not publicly presented on his or her talent profile (stage 658), but may be disclosed to employers as part of the employment process. In the event of disclosure to employers as part of the employment process, employers may not use the information to unlawfully discriminate in any way. At this point, processing again returns to FIG. 5B.

Next, the career site determines whether the employer's job listing indicates a work authorization requirement, such as for certain positions and contracts with the U.S. government and its political subdivisions (stage 553). If the answer is "no," then processing advances to consider other regulatory parameters (stage 555). If the answer is "yes," then processing transfers to FIG. 7B, which represents a process for requesting and obtaining work authorization information.

Figure 7B:
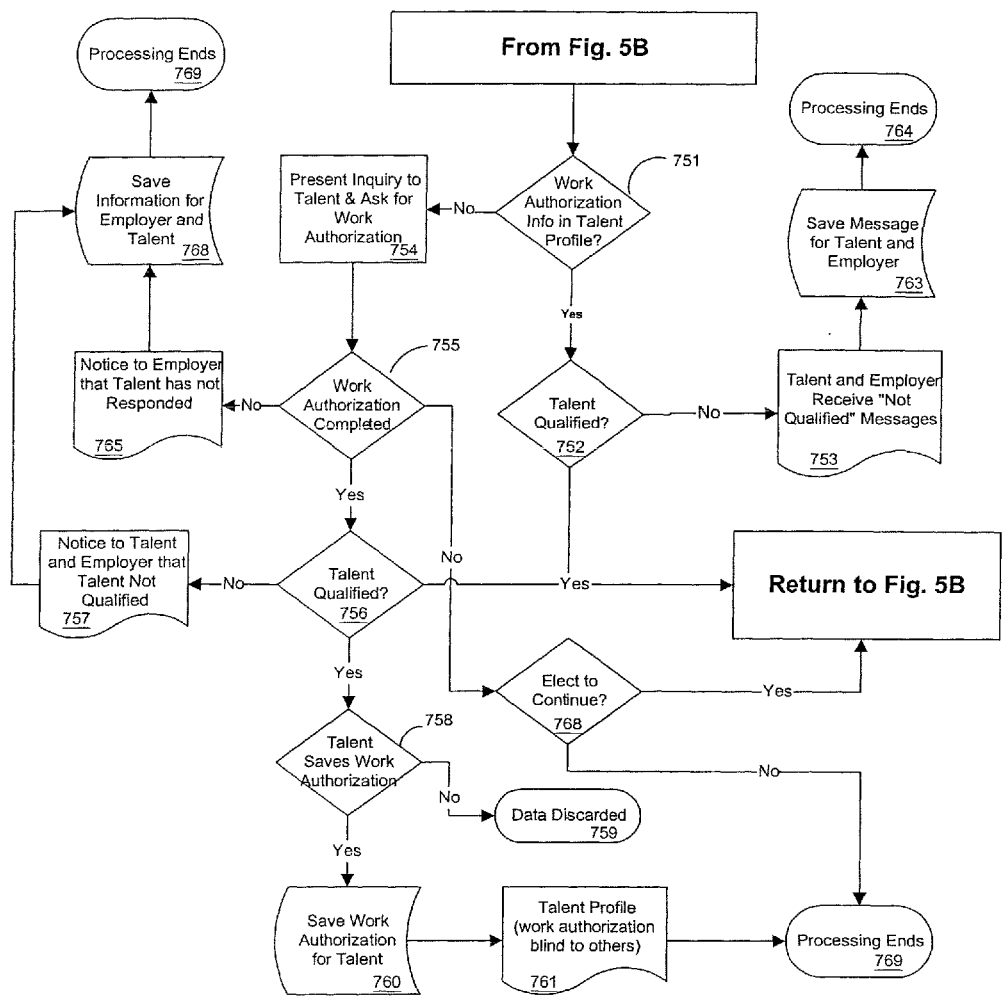
FIG. 7B is a flow diagram representing an employer-initiated process for determining the eligibility of talent to be employed in certain jobs requiring U.S. citizenship, the process being performed in connection with talent interacting with a career site consistent with the present invention.

At FIG. 7B, the career site determines whether the talent profile selected by the employer includes a completed work authorization section (stage 751). If the employer profile includes the required work authorization information, the career site determines if the talent is qualified for the particular job (stage 752). If the answer is "no," then the talent and employer receive messages that the talent is not qualified because of the work authorization limitation (stage 753), the information is stored for both employer and talent (stage 763), and processing ends (stage 764). If the career site determines that the talent qualifies for the job (stage 752), then processing returns to FIG. 5B at stage 555.

If the talent profile does not include work authorization information (stage 751), then the talent is presented with a request to supply the work authorization information and an electronic link to the work authorization page of his or her talent profile (stage 754). If the talent declines to complete the work authorization (stage 755), then the employer is notified of the talent's denial (stage 765), the talent's denial is saved for both the employer and the talent (stage 768), and processing ends (stage 769). However, the employer is given an option of continuing the recruiting process (stage 768) because the employer could obtain the work authorization information after interviewing the talent with the talent's consent. If the employer elects to continue, then the process returns to FIG. 5B. If the employer does not elect to continue, then the process ends (stage 769).

Returning to stage 755, if the talent completes the work authorization request but is not qualified (stage 756), then both the talent and the employer are notified of that fact (stage 757), the notice is saved for both the employer and the talent (stage 768), and the process ends (stage 769). If the talent is qualified for the job (at stage 756), processing proceeds back to FIG. 5B.

In one embodiment, regardless of whether the talent is qualified for employment in jobs requiring U.S. citizenship, the talent may elect to save his or her work authorization information in his or her talent profile (stages 758, 760, and 761), whereupon this portion of the routine ends (stage 769). If the talent does not elect to save his or her work authorization information in his or her talent profile, then the data is discarded (stage 759).

Returning to FIG. 5B, because it may reasonably be anticipated that job listings may be subject to other governmentally imposed restrictions or record keeping, exemplary processes of FIG. 5B contemplate other routines for processing such requirements (stages 555 and 556).

After the FERI, work authorization, and other regulatory parameters have been processed, the career site determines if the employer is "preferred" (stage 557), as previously discussed. If the talent specified the particular employer as preferred, then processing proceeds to FIG. 12. If the talent did not specify the employer as preferred, then processing proceeds to FIG. 11.

Figure 11:
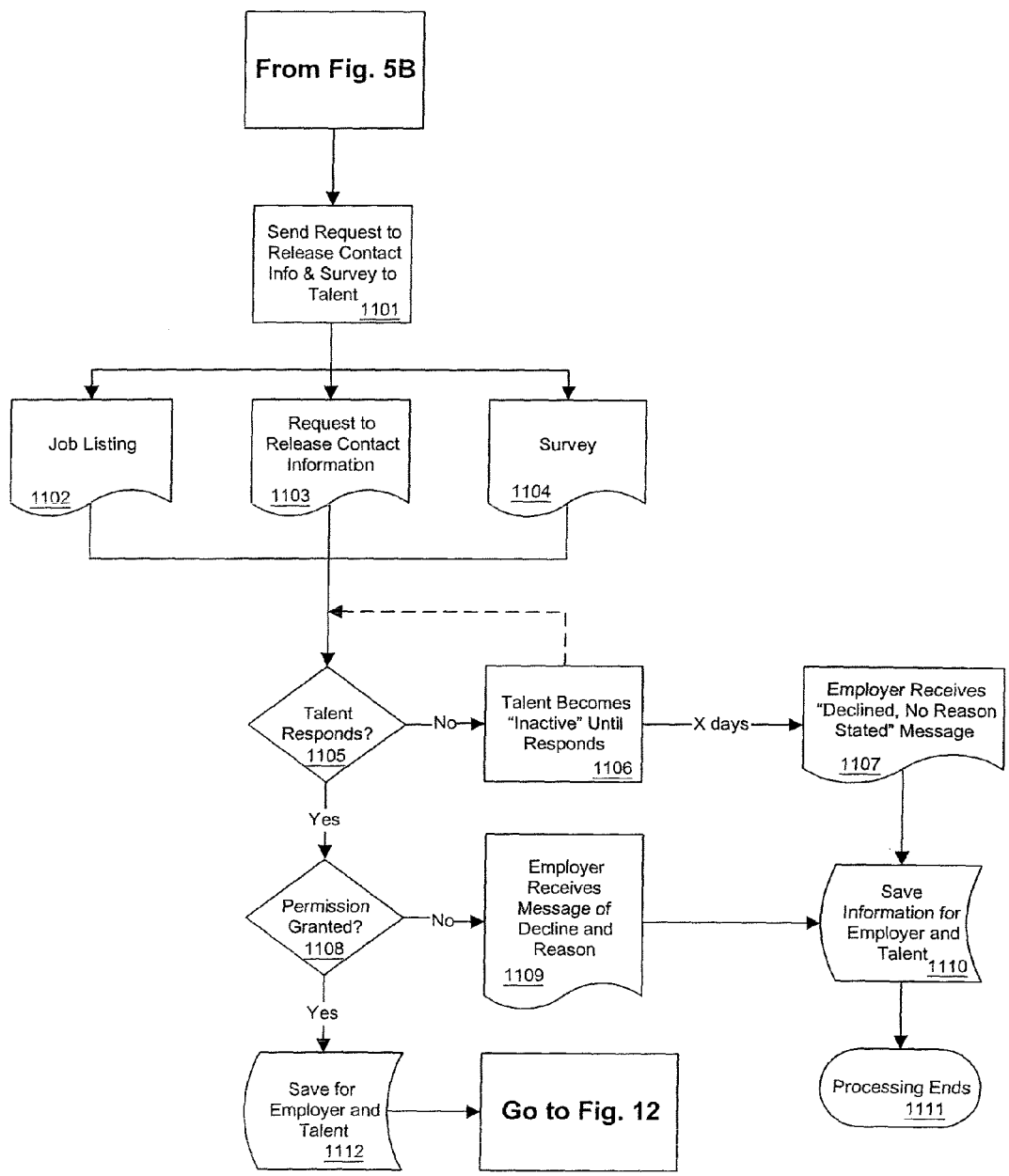
FIG. 11 is a flow diagram representing an employer-initiated process for determining whether talent is interested in the employer's employment opportunity in a manner consistent with the present invention.

Turning to FIG. 11, if the talent did not list the employer as preferred, then the employment opportunity is submitted to the talent for his or her consideration (stage 1101). The inquiry consists of the particular Job Listing (stage 1102), a Request to Release Contact Information (stage 1103), and a brief survey for use in the event that the talent declines the opportunity (stage 1104). The inquiry sent to the talent may be effected by a variety of means, including displaying a message to the talent upon sign-in, via e-mail, regular mail, or some combination of means. The information supplied to the talent may include the name of the employer and the city, state/province, and country of the employer but omits any personally identifying information for the employer and its personnel, and omits the employer's address, phone number, and e-mail address.

In one embodiment, if the information provided to the talent includes the name and geographic location of the employer, the talent may determine the address and phone number of the employer from sources outside of the career site, and attempt to contact the employer directly instead of using the services of the career site. However, a number of factors make such a circumstance unlikely. First, by using the career site, employers have stated a preference for using the site's procedures. Second, the easiest way for the talent to pursue the opportunity presented by the employer is for the talent to utilize the process adopted by the employer, i.e., the career site. Third, employers contractually agree that they will not circumvent the career site system. Fourth, if the career site system were circumvented, important records of the employer's recruiting and hiring process would not be created to be available to the employer and the talent in the future.

In one embodiment, upon receiving an employment inquiry, a talent is asked to respond (stage 1105). If the talent does not immediately respond, then he or she becomes "inactive," meaning that he or she cannot apply for jobs or receive new opportunities from employers (stage 1106). Upon each sign-in, the talent is prompted to respond to outstanding messages (FIG. 3 at stage 324). If the talent has not responded within a predetermined number of days after the date of the employer-initiated inquiry, then the employer receives a message from the career site to the effect that the talent has declined the employer's inquiry, but that no reason was given (stage 1107), and the message is saved for the employer and the talent and the process ends (stages 1110 and 1111).

If the talent does respond, such response will be to either grant or decline permission to release his or her contact information (stage 1108). A decline response requires the answer to a brief survey requesting the reason for declining (stage 1109). Possible reasons may include, for example, the geographic location of the employer, the nature of the job, or talent's personal circumstances, among others. Again, the response is saved for the employer and the talent (stage 1110). If the talent grants permission to release his or her contact information, then that action is saved for the employer and the talent (stage 1112). Processing then continues at FIG. 12.

VII. Completing the Transaction

After the talent and the employer have reached mutual consent to the release of talent's contact information, an employer becomes obligated to purchase the "compete" talent profile (stage 1208) that includes the talent's contact information. At such time, the career site sends a notice to the talent to expect contact from the employer (stage 1209), the talent contact information is released to the employer (stage 1210), and the career site invoices and collects its fee from the employer (stages 1211, 1212, and 1213). These transactions are saved for the talent, the employer, and the career site (stage 1214) so that various reports may be prepared (stage 1215). In one embodiment, some reports relate to aggregate information gathered during the operation of the career site and may be used to identify employment trends. After talent contact information is purchased, processing advances to FIG. 13.

Returning to stage 1208, for an employer that purchases a complete talent profile there are several payment options, including, for example: (i) by credit card; (ii) by prepaid account in which an amount of money is pre-deposited with a career site operator; and (iii) by periodic invoice. In connection with a prepaid account, as an employer purchases talent profiles, fees are deducted from the corresponding account, and periodically, the employer is notified that it is time to replenish the account. Talent contact information may not be purchased if there is insufficient money in an employer's prepaid account to effect the transaction(s). In connection with the periodic invoice, employers must have met the career site's established credit criteria. For such employers, a monthly statement will be sent for payment on pre-established terms.

Figure 13:
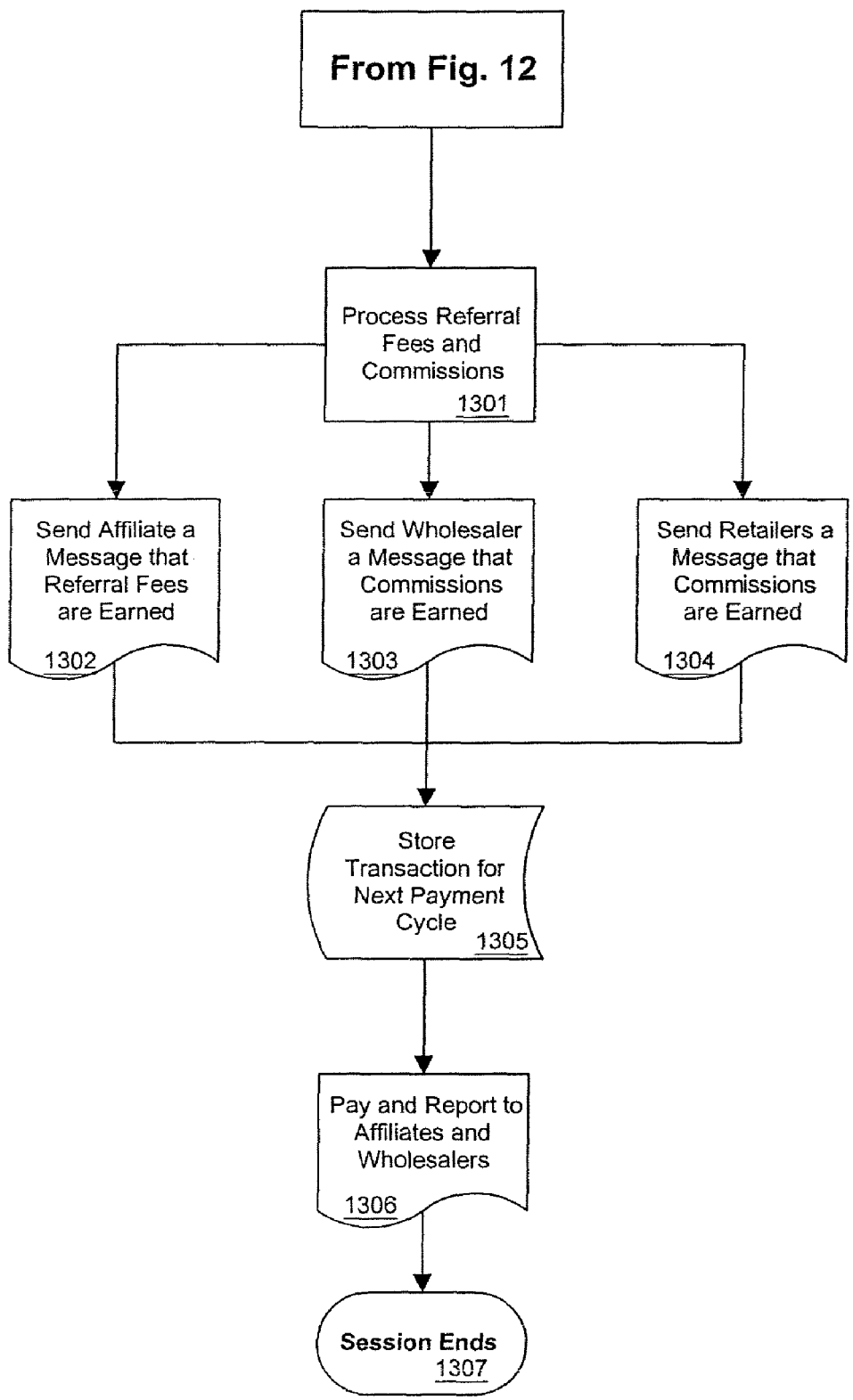
FIG. 13 is a flow diagram representing the payment of referral fees and commissions for a career site operated in a manner consistent with the present invention.

FIG. 13 is a flow diagram representing a procedure of the career site for paying referral fees and commissions that may be payable with respect to completed transactions. In one embodiment, through an affiliate program, referral fees are paid as further described in FIG. 15, FIGS. 16, 17, and 18. First, referral fees and commissions are processed (stage 1301). Next, affiliates, wholesalers, and retailers of career site marketing services are sent a message regarding earned referral fees, as appropriate (stages 1302, 1303, and 1304). Next, transactions are stored for processing in the next payment cycle (stage 1305). Finally, payment is made to affiliates, wholesalers, and retailers and the session ends (stages 1306 and 1307).

VIII. Trade Associations

Figure 15:
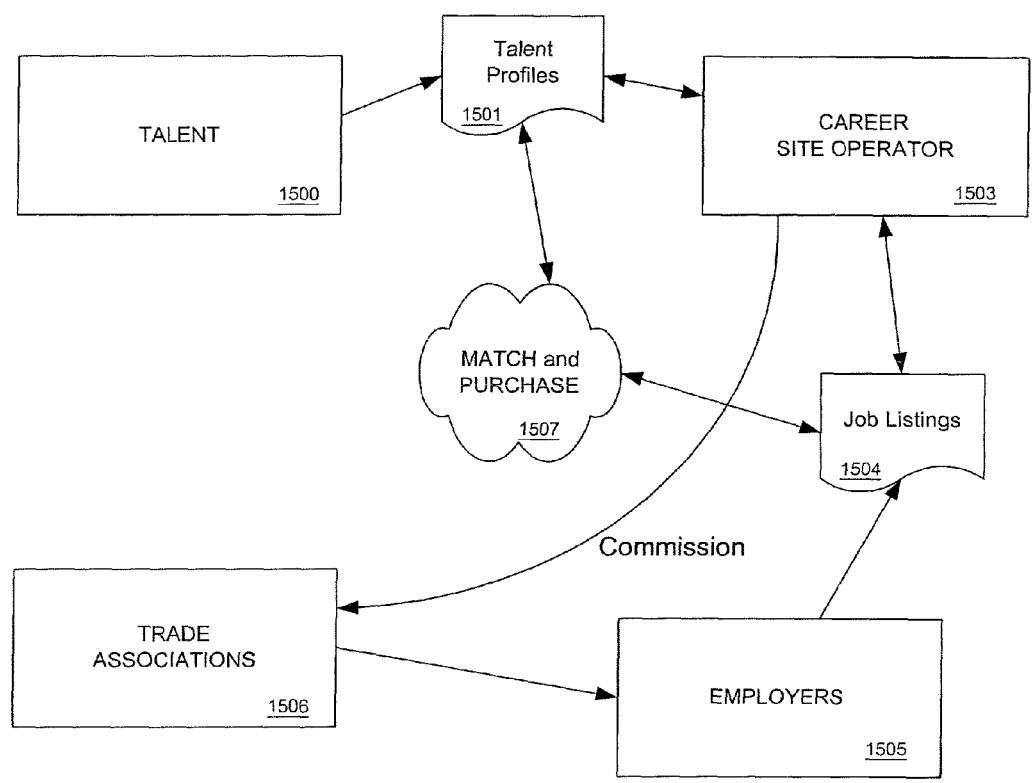
FIG. 15 is a schematic block diagram representing the relationship of trade associations to talent, employers and a career site in a system consistent with one embodiment of the present invention.

Affiliate organizations in good standing such as trade associations may earn referral fees by referring employers to the career site (see FIG. 13 and FIG. 15). FIG. 15 is a block diagram representing interrelationships between market participants in a system consistent with another embodiment of the present invention, including a marketing program directed to employers. Each time a complete talent profile 1501 is completed by talent 1500 and purchased by a referred employer 1505, a referral fee is paid to the affiliate trade association 1506 by career site operator 1503. In this embodiment, transactions are effected in part by employers using trade associations database 222 to identify trade associations to which they (or their divisions) belong. In this embodiment, if the trade association identified by the employer has become a career site "affiliate" then the trade association 1506 will receive a referral fee for each "complete" talent profile 1501 purchased 1507 by such employers 1505 based on job listings 1504 provided by employers 1505.

Trade associations 1506 become approved associations by (i) agreeing to a list of responsibilities, (ii) encouraging member employers to submit job listings, and (iii) providing the career site with a list of its employer-members. In exchange for promoting the career site and the career site operator 1503, the trade association 1506 receives a referral fee whenever a match occurs between a talent profile and a job listing, and the career site is paid. A match occurs when (a) talent agrees to release his or her contact information to an employer, and (b) the employer agrees to purchase that talent's contact information.

In one embodiment, trade associations receive a percentage or fixed referral fee on the revenues that the career site operator earns when talent and employer mutually agree to contact each other regarding employment. The referral fee is paid with respect to all of the employer's job listings, provided that the employer has listed the trade association in the trade affiliations section of its profile. A trade association will continue to receive the referral described as long as it maintains good standing.

In this embodiment, good standing requires several actions on the part of an affiliated association, including (i) publicly endorsing the career site operator; (ii) consenting to the use of its name in connection with career site advertisements; (iii) promoting career site to its members as part of its member employment program; (iv) advertising, with a minimum specified-size ad, the career site in each issue of its member newsletter at no cost to the career site; (v) listing all of its jobs on the career site; and (vi) linking the association's web site to the career site.

IX. Educational Institutions, Professional Associations, and Labor Unions

Figure 16:
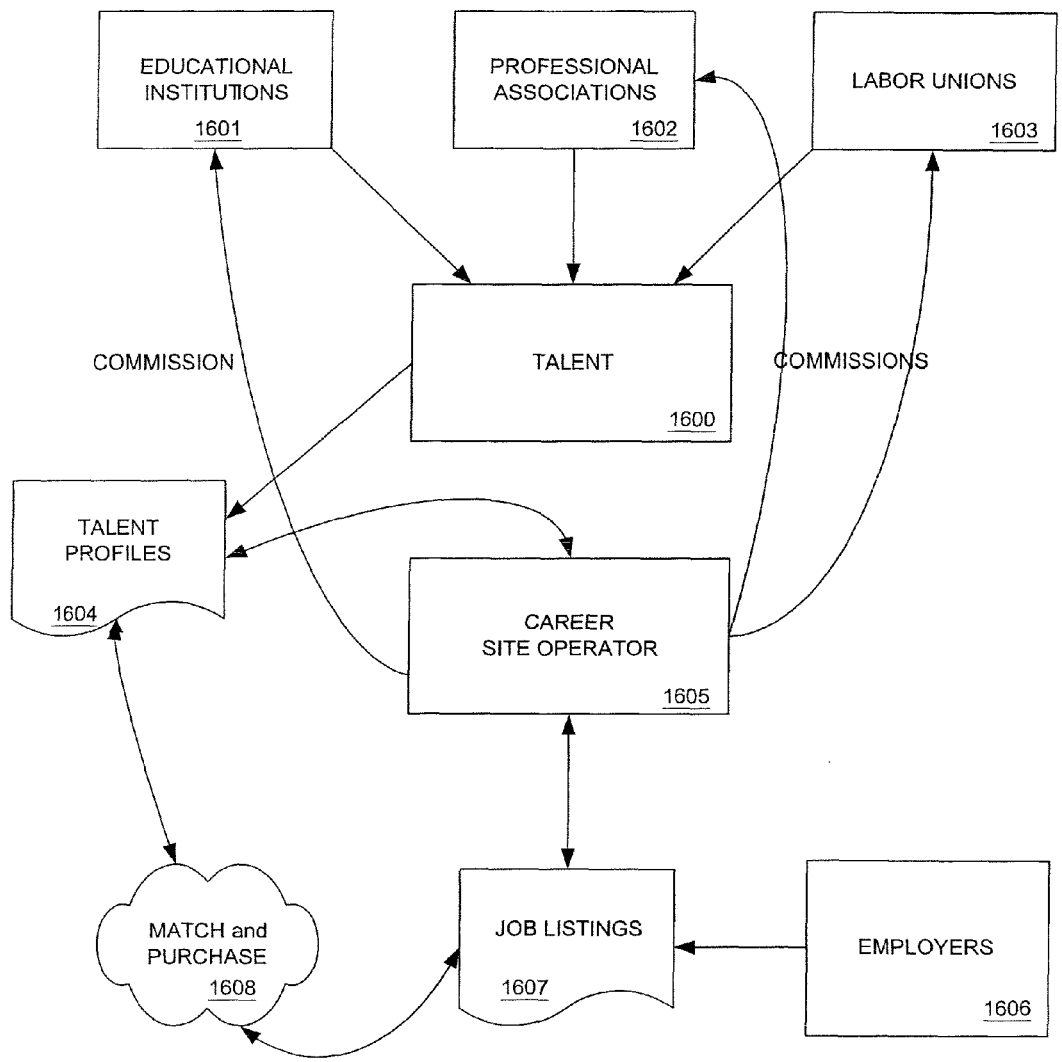
FIG. 16 is schematic a block diagram representing the relationship of educational institutions, professional associations, and labor unions to talent, employers and a career site in a system consistent with another embodiment of the present invention.

Affiliate organizations in good standing such as educational institutions, professional associations, and labor (or trade) unions may earn referral fees by referring talent to the career site (see FIG. 13 and FIG. 16). Each time a referred complete talent profile 1604 is purchased by an employer 1606 and the career site is paid, a referral fee is paid to the affiliate educational institution 1601 and/or professional association 1602 and/or labor union 1603. In this embodiment, the transactions are effected in part by talent 1600 using educational institutions database 215 and professional associations and labor unions database 223 to precisely identify educational institutions 1601 that they have attended and professional associations 1602 and/or labor unions 1603 to which they belong. In this embodiment, if the educational institution and/or professional association and/or labor union identified by the talent has become a career site "affiliate" then the educational institution 1601 and/or professional association 1602 and/or labor union 1603 will received a referral fee each time the talent's "complete" talent profile is purchased.

FIG. 16 is a block diagram representing interrelationships between market participants in a system consistent with another embodiment of the present invention, including a marketing program directed to talent. Educational institution 1601 participates by working with talent 1600 to contact and provide information to career site operator 1605. Job listings 1607 are provided to career site operator 1605 by employers 1606, and when a match and purchase occur 1608, a referral fee is paid to an appropriate educational institution 1601 and/or professional association 1602 and/or labor union 1603.

In one embodiment, educational institutions 1601 receive a percentage or fixed fee on the revenues that the career site earns when talent and employer mutually agree to contact regarding employment 1608. Talent 1603 must have listed the educational institution 1601 in his or her education history associated with the talent profile 1604. An educational institution 1601 will continue to receive the referral fee as long as it is in good standing.

Educational institutions 1601 maintain good standing by taking several actions, including (i) publicly endorsing the career site operator; (ii) consenting to the use of its name in connection with career site advertisements; (iii) promoting career site to its students and graduates as part of its student employment program; (iv) advertising, with a minimum specified-size ad, the career site in each issue of its alumni newsletter at no cost to the career site; (v) listing all of its jobs on the career site; and (vi) linking the educational institution's web site to the career site. In one embodiment affiliates enter into an exclusive marketing relationship with the career site, meaning that the affiliate will not participate in an affiliate program with another career site.

In one embodiment, professional associations 1602 and labor unions 1603 may receive a percentage or fixed referral fee on the revenues that a career site earns when talent 1600 and employer 1606 mutually agree to contact regarding employment 1608. Talent 1600 must have listed the professional association 1602 and/or labor union 1603 in his or her special skills and affiliations section, associated with the talent profile. A professional association 1602 or labor union 1603 will continue to receive the referral fee as long as it is in good standing.

Professional associations 1602 and labor unions 1603 maintain good standing by taking several actions, including (i) publicly endorsing the career site operator; (ii) consenting to the use of its name in connection with career site advertisements; (iii) promoting career site to its members as part of its member employment program; (iv) advertising, with a minimum specified-size ad, the career site in each issue of its member newsletter at no cost to the career site; (v) listing all of its jobs on the career site; and (vi) linking the professional association's or labor union's web site to the career site.

X. Wholesalers

Figure 17:
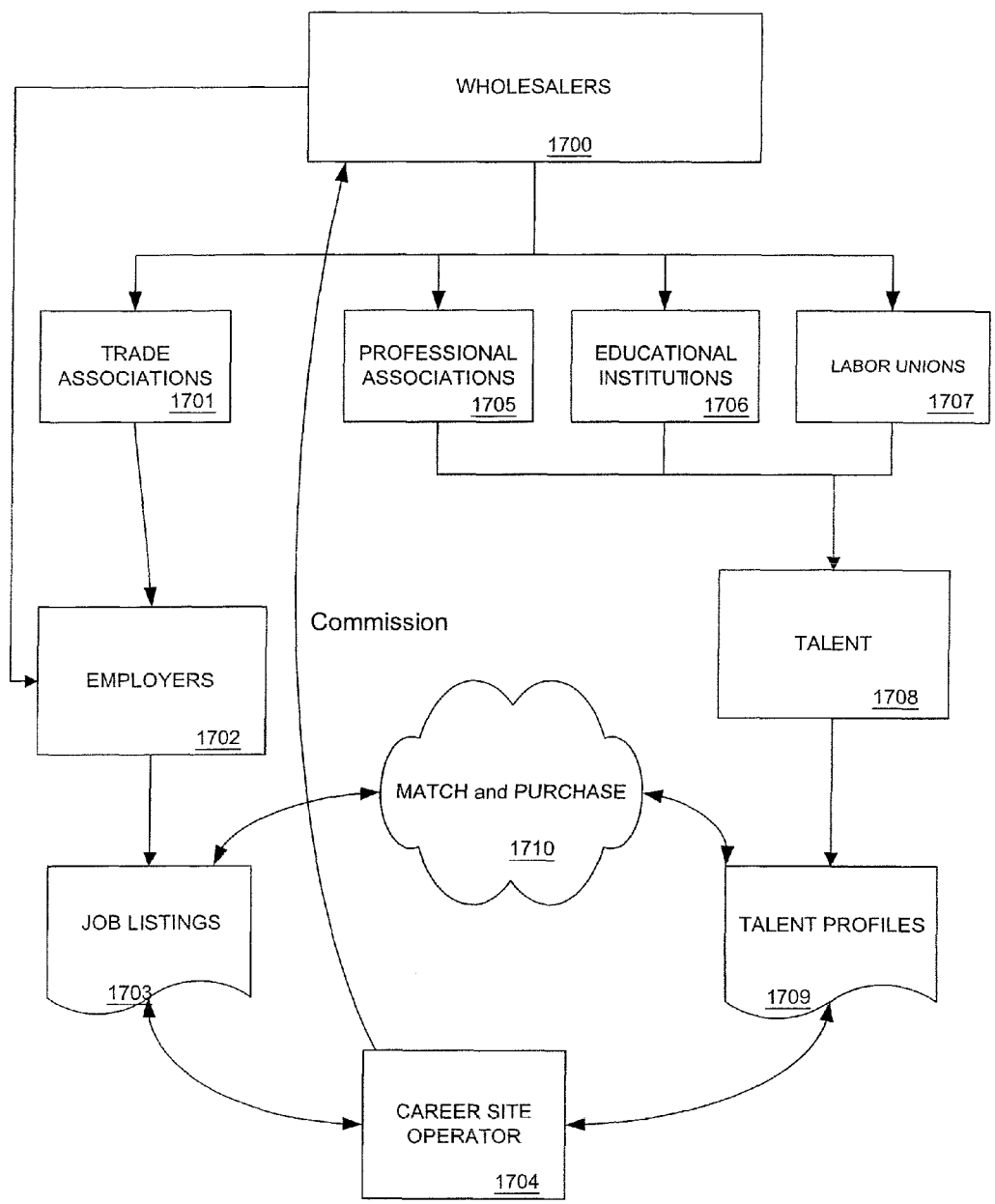
FIG. 17 is a schematic block diagram representing the relationship of wholesalers to trade associations, professional associations, educational institutions, labor unions, employers, talent, and a career site in a system consistent with yet another embodiment of the present invention.

In one embodiment, through a wholesaler program, wholesalers in good standing may earn commissions as further described in FIG. 13 and FIG. 17. A wholesaler earns a commission (a) if it is responsible for establishing an employer account, in which case a commission is paid each time the employer purchases a complete talent profile and the career site is paid, and/or (b) if it is responsible for recruiting as an affiliate a trade association, professional association, or educational institution, in which case a commission is paid each time the affiliate is paid a referral fee. In this embodiment, the transactions are effected in part by talent 1708 using educational institutions database 215 and professional associations and labor unions database 223 to precisely identify educational institutions 1706 that they have attended and professional associations 1705 and/or labor unions 1707 to which they belong, and by employers using trade associations database 222 to precisely identify trade associations 1701 to which they belong. In this embodiment, if the trade association, professional association, educational institution, or labor union, identified by the talent and/or employer has become a career site "affiliate" through the efforts of the wholesaler 1700, then the wholesaler 1700 will paid a commission each time such trade association 1701, professional association 1705, educational institution 1706, or labor union 1707 receives a referral fee.

FIG. 17 is a block diagram representing interrelationships between market participants in a system consistent with yet another embodiment of the present invention, including wholesale marketing of a career site. Wholesalers 1700 work in conjunction with trade associations 1701, professional associations 1705, educational institutions 1706, and labor unions 1707. Trade associations 1701 provide marketing that results in employers 1702 listing jobs 1703 on the career site 1704. Professional associations 1705, educational institutions 1706, and labor unions 1707 provide marketing directed at members and students becoming talent 1708 who post talent profiles 1708 to the career site 1704. When a match 1710 occurs, commissions are paid to the responsible wholesaler 1700 at the time that referral fees are paid to the career site-affiliated trade association 1701, professional association 1705, educational institution 1706, and/or labor union 1707

In one embodiment, wholesalers 1700 are selected from a group of public accounting firms, payroll processing firms, human resource consulting firms, human resource software developers, and other designated entities. In this embodiment, wholesalers 1700 receive percentage commission on the revenues a career site realizes when talent 1708 and employers 1702 mutually agree to contact each other regarding employment 1710. The commission is paid with respect to an employer's entire job listings, provided that the employer 1702 account was assigned to wholesaler 1700 at the time the employer 1702 account was established.

In one embodiment, wholesalers 1700 receive commissions as a wholesaler so long as it and the trade associations 1701, professional associations 1705, educational institutions 1706, and labor unions for which it is responsible remain in good standing. The requirements for trade associations 1701, professional associations 1705, educational institutions 1706, and labor unions 1707 remaining in good standing were discussed previously. Wholesalers 1700 maintain good standing by taking several actions, including (i) publicly endorsing the career site operator; (ii) consenting to the use of its name in connection with career site advertisements; (iii) using best efforts to promote the career site to employers for the purpose of listing all of their jobs on the career site; (iv) assisting employers (for fees to be paid by employers) with technical aspects of automatically listing all of the employer's jobs on the career site; (v) listing all of its jobs on the career site; and (vi) linking the wholesaler's web site to the career site.

XI. Retailers

Figure 18:
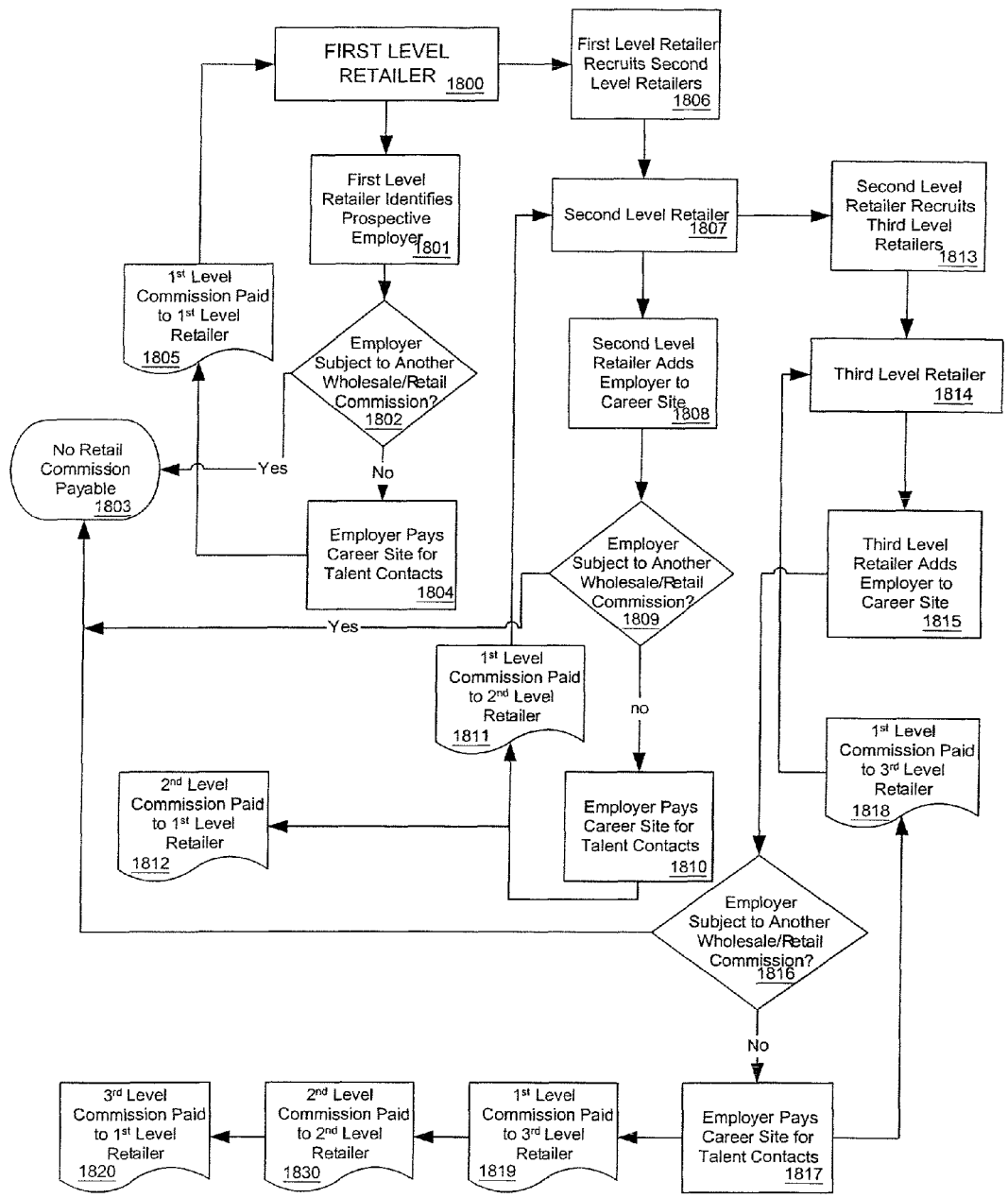
FIG. 18 is a flow diagram representing the relationship of multiple levels of retailers with a career site in a system consistent with a further embodiment of the present invention.

In one embodiment, through a retailer program, retailers in good standing may earn commissions as further described in FIG. 13 and FIG. 18. FIG. 18 is a flow diagram representing the relationship of multiple levels of retailers with a career site in a system consistent with a further embodiment of the present invention. A first-level retailer 1800 earns a commission (a) if it is responsible for establishing an employer account with the career site, in which case a commission is paid each time the employer purchases a complete talent profile, or (b) if it is responsible for recruiting another retailer, consistent with the terms and conditions of the career site, in which case a commission is paid each time the other retailer is paid a referral fee. Alternative retailer processes may be employed using one or more levels consistent with local law.

A first-level retailer identifies a prospective employer (stage 1801). Next, it is determined whether the identified employer is subject to a preexisting wholesale or retail commission (stage 1802). If so, then no retail commission is payable in the case of the identified employer (stage 1803). Returning to stage 1802, if the employer is not subject to another commission, then when the employer pays the career site for talent contacts (stage 1804), a first level commission is paid to the first-level retailer (stage 1805). A first-level retailer may also recruit (stage 1806) second-level retailers 1807. Next, second level retailers add employers to the career site (stage 1808), and it is determined whether the added employers are subject to another commission (stage 1809). As described in connection with first-level retailers, if a particular employer is already subject to a commission, no retail commission is payable (stage 1803). On the other hand, if at stage 1809, it is determined that a particular employer is not subject to commissions, and the employer pays the career site for talent contacts (stage 1810), then the second-level retailer is paid a first-level commission (stage 1811) and a second-level commission is paid to the first-level retailer (stage 1812).

Further, second-level retailer 1807 may recruit (stage 1813) a third-level retailer 1814. The third-level retailer adds employers to the career site (stage 1815). If the employer is subject to another commission, no retail commission is payable (stage 1803). However, if the added employer is not subject to another commission (stage 1816) and the added employer pays the career site for talent contacts (stage 1817), then a first-level commission is paid to the third-level retailer (stage 1819), a second-level commission is paid to the second-level retailer (stage 1830) and a third-level commission is paid to the first-level retailer (stage 1820).

Finally, additional retail levels may be added to the system consistent with local law.

XII. Commerically Available Reports

Data generated with activities carried out in connection with the invention may contain commercially valuable information based on aggregated information. In one embodiment, reports are marketed that indicate industry trends such as salary trends, including which industries are hiring, which industries are not hiring and which geographical areas are hiring and which are not.

XIII. Storefronts

Employers may rent "storefronts" which are sections of the career site devoted to the particular employer. Employers who rent storefronts have broad discretion with respect to the information that they may present, but may not present personally identifying information, or information intended to circumvent the procedures of the career site, or information that is unlawful.

XIV. Follow-Up Process

Figure 14:
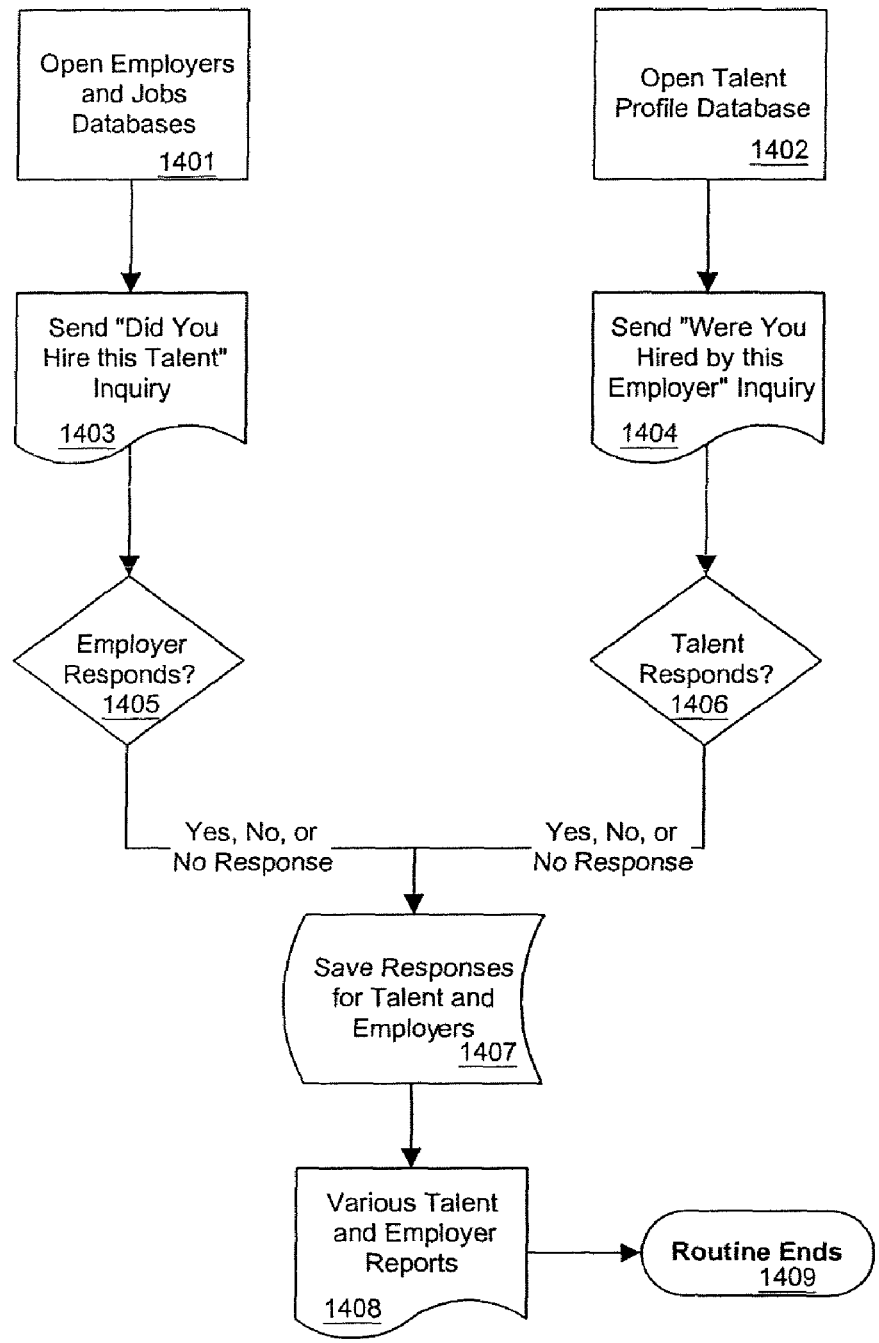
FIG. 14 is a flow diagram representing a procedure whereby additional information about talents' and employers' employment decisions is gathered subsequent to the release of talent contact information to a prospective employer in a manner consistent with the present invention.

FIG. 14 is a flow diagram of a process whereby the career site initiates contact with talent and employers with respect to matches that have occurred between talent and employers, and the parties have agreed to the exchange of contact information, i.e., a purchase has occurred. In one embodiment, employers database 210, jobs database 211, and talent profiles database 205 are opened on a periodic basis, such as, for example 60 days after the date of the match (stages 1401 and 1402). The employers who purchased talent contact information are asked whether they hired the particular talent (stage 1403). The talent, whose contact information was purchased, are asked whether they were hired by the particular employer (stage 1404). Any responses (stages 1405 and 1406) are saved (stage 1407), and various talent and employer reports may be prepared (stage 1408), and the routine ends (stage 1409).

XV. Enterprise Databases

Methods, systems, and distributed networks consistent with the present invention are capable of facilitating transmission and processing of job description information directly from enterprise human resources and other applications, such as, for example, enterprise database systems from PeopleSoft, Inc. and SAP AG. Similarly, trade or professional associations, educational institutions or other entities may have sufficient consent and data to provide talent profile information for its members or students. This information may be exchanged in various ways as will be apparent to one of ordinary skill in the art.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of-equivalents thereof are intended to be embraced therein.

The invention claimed is:

1. A method of searching a plurality of candidate profiles having respective candidate attributes and threshold requirements by a computer system having at least one computer comprising at least one processor and storage medium within a computer network, said method comprising:
   storing candidate attributes received from a candidate in a structured format on said at least one storage medium in communication with said at least one computer;
   receiving by said at least one computer from a prospective employer at least one threshold requirement selected from said candidate profiles;
   identifying at least one candidate profile by said computer system based on at least one search parameter received from said prospective employer;
   comparing said at least one search parameter with said candidate attributes by said computer system;
   determining by said computer system whether at least one of said identified candidate profiles matching said at least one search parameter meets said threshold requirement, and;
   communicating to said prospective employer said at least one determined candidate profile.

2. The method as set forth in claim 1, wherein said at least one search parameter is associated with at least one job description.

3. The method as set forth in claim 1, wherein said at least one search parameter comprises data structured according to an occupational classification system.

4. The method as set forth in claim 1, wherein said at least one search parameter comprises data structured according to an industry classification system.

5. The method as set forth in claim 1, wherein said at least one determined candidate profile is ranked according to the extent it is compatible with said at least one search parameter.

6. The method of claim 5, wherein said computer system generates a listing of said at least one determined candidate profile based upon said ranking.

7. The method as set forth in claim 1, further comprising receiving from said prospective employer a request for an interview with a candidate associated with said at least one determined candidate profile;
   transmitting said request for said interview to said candidate over said computer network; and
   receiving a request-acceptance indication from said candidate over said computer network.

8. The method of claim 1 further comprising permitting said prospective employer to modify said at least one search parameter.

9. The method of claim 1 wherein said search is automatically performed by said computer system based on said at least one search parameter.

10. The method as set forth in claim 1, wherein said at least one candidate profile comprises data structured according to an occupational classification system.

11. The method as set forth in claim 1, wherein said at least one candidate profile comprises data structured according to an industry classification system.

12. A method of searching a plurality of candidate profiles having respective candidate threshold requirements and being stored in a computer system having at least one computer comprising a processor within a computer network, said method comprising:
- receiving a request for a search associated with a specific job description received from a prospective employer;
- identifying at least one candidate profile by said computer system based on at least one search parameter;
- comparing said job description with at least one of said candidate threshold requirements by said computer system having at least one computer comprising said processor;
- determining by said computer system whether said job description matches said at least one candidate threshold requirement, and;
- communicating to said prospective employer said at least one indentified candidate profile based upon said search parameters.

13. The method as set forth in claim 12, wherein said at least one candidate profile is ranked according to its relative extent of compatibility with said job description.

14. The method as set forth in claim 13, wherein said computer system generates a listing of said at least one candidate profile based upon said ranking.

15. The method as set forth in claim 12, wherein said at least one candidate threshold requirement is received by said employer and electronically stored on said storage medium, said at least one threshold requirement comprising data structured according to an occupational classification system.

16. The method as set forth in claim 12, wherein said at least one candidate threshold requirement comprises data structured according to an industry classification system.

17. The method of claim 12, further comprising receiving from said prospective employer a request for an interview with at least one candidate associated with said at least one identified candidate profile;
- transmitting said request for said interview to said at least one candidate over said computer network; and
- receiving a request-acceptance indication from said at least one candidate over said computer network.

18. The method of claim 12 further comprising permitting said prospective employer to modify said at least one job description in response to said threshold determination.

19. The method of claim 12 wherein said search is automatically performed by said computer system based on said at least one search parameter.

20. The method of claim 12 wherein said at least one threshold requirement is provided by said candidate.

21. The method as set forth in claim 12, wherein said at least one candidate profile comprises data structured according to an occupational classification system.

22. The method as set forth in claim 12, wherein said at least one candidate profile comprises data structured according to an industry classification system.

23. A method of searching a plurality of job descriptions having respective employer threshold requirements and being stored in a computer system having at least one computer comprising at least one processor and storage medium within a computer network, said method comprising:
- identifying at least one job description by said computer system based upon at least one search parameter, said at least one search parameter received by said computer system;
- storing attributes of at least one candidate profile associated with a candidate in said computer system;
- comparing said candidate profile with said at least one employer threshold requirement of said identified job description by said computer;
- determining whether said candidate profile matches said identified job description based on said at least one employer threshold requirement, and;
- communicating said identified job description to said candidate.

24. The method of claim 23 further comprising the steps of:
- receiving a request for interview with at least one employer from said candidate through said computer network;
- transmitting said request through said computer network to said at least one employer; and,
- receiving a request-acceptance indication from said at least one employer over said computer network.

25. The method of claim 23 further including the step of permitting said candidate to modify said at least one search parameter.

26. The method of claim 23 wherein said at least one job description is ranked by said computer system indicating a relative maximum compensation associated with said at least one job description.

27. The method of claim 26 wherein said computer system generates a listing of said at least one job description arranged based upon said ranking.

28. The method of claim 23 wherein said search is automatically performed by said computer system based on said at least one search parameter.

29. The method of claim 23 wherein said at least one threshold requirement is provided by said employer.

30. The method as set forth in claim 23, wherein said at least one search parameter comprises data structured according to an occupational classification system.

31. The method as set forth in claim 23, wherein said at least one search parameter comprises data sructured according to an industry classification system.

32. The method as set forth in claim 23, wherein said at least one candidate profile comprises data structured according to an occupational classification system.

33. The method as set forth in claim 23, where said at least one candidate profile comprises data structured according to an industry classification system.

* * * * *

UNITED STATES PATENT AND TRADEMARK OFFICE
CERTIFICATE OF CORRECTION

PATENT NO. : 8,374,901 B2  
APPLICATION NO. : 12/846635  
DATED : February 12, 2013  
INVENTOR(S) : Marc Vianello Page 1 of 1

It is certified that error appears in the above-identified patent and that said Letters Patent is hereby corrected as shown below:

On the Title Page:

Item 62, Related U.S. Application Data, change "12/059,728" to --12/059,721--

In the Specifications:

Column 1, line 8, change "12/059,728" to --12/059,721--

Signed and Sealed this
Twenty-first Day of May, 2013

Teresa Stanek Rea
*Acting Director of the United States Patent and Trademark Office*